(12) United States Patent
Song et al.

(10) Patent No.: US 6,313,889 B1
(45) Date of Patent: Nov. 6, 2001

(54) MATRIX-TYPE DISPLAY DEVICE CAPABLE OF BEING REPAIRED IN PIXEL UNIT

(75) Inventors: Jun-Ho Song; Yong-guk Pae; Woon-yong Park; Kyung-seop Kim, all of Kyungki-do; Jung-hee Lee, Seoul; Shi-yual Kim, Kyungki-do; Kyung-nam Lee, Kyungki-do; Dong-gyu Kim, Kyungki-do, all of (KR)

(73) Assignee: Samsung Electronics Co., Ltd., Suwon (TW)

( * ) Notice: Subject to any disclaimer, the term of this patent is extended or adjusted under 35 U.S.C. 154(b) by 0 days.

(21) Appl. No.: 08/742,916

(22) Filed: Nov. 1, 1996

Related U.S. Application Data

(60) Continuation-in-part of application No. 08/511,989, filed on Aug. 7, 1995, now Pat. No. 5,648,826, which is a division of application No. 08/205,299, filed on Feb. 3, 1994, now Pat. No. 5,532,853.

(30) Foreign Application Priority Data

Mar. 4, 1993 (KR) .................................................. 93-3209

(51) Int. Cl.$^7$ ........................ G02F 1/1333; G02F 1/1343; G02F 1/13
(52) U.S. Cl. ............................... 349/54; 349/38; 349/192
(58) Field of Search ................................ 349/55, 39, 139, 349/54, 42, 147, 148, 38, 192; 257/209

(56) References Cited

U.S. PATENT DOCUMENTS

| | | | |
|---|---|---|---|
| 4,368,523 | * | 1/1983 | Kawate .................................... 349/54 |
| 4,820,222 | * | 4/1989 | Holmberg et al. .................... 349/143 |
| 4,938,567 | * | 7/1990 | Chartier ................................ 349/147 |
| 5,062,690 | * | 11/1991 | Whetten ................................ 349/55 |
| 5,517,341 | * | 5/1996 | Kim et al. .............................. 359/59 |
| 5,532,853 | * | 7/1996 | Song et al. ............................ 359/87 |
| 5,648,826 | * | 7/1997 | Song et al. ............................ 349/49 |
| 5,715,025 | * | 2/1998 | Ogurtsov et al. ...................... 349/42 |

* cited by examiner

Primary Examiner—Walter J. Malinowski
(74) Attorney, Agent, or Firm—Jones Volentine, L.L.C.

(57) ABSTRACT

A matrix-type display device having a repair layout, particularly, a matrix-type display device which can be repaired in a pixel unit, is provided. Two or more of signal lines such as scanning signal lines, displaying signal lines and auxiliary signal lines and a pixel electrode are overlapped via an insulating layer, so that a defect such as the disconnection of the displaying signal lines and scanning signal lines, the short of the pixel electrode and signal line, and the loss of electrode of a switching element, can be repaired. Here, the layout of the auxiliary gate line and dual gate line can be modified.

18 Claims, 35 Drawing Sheets

FIG. 27A
FIG. 27B
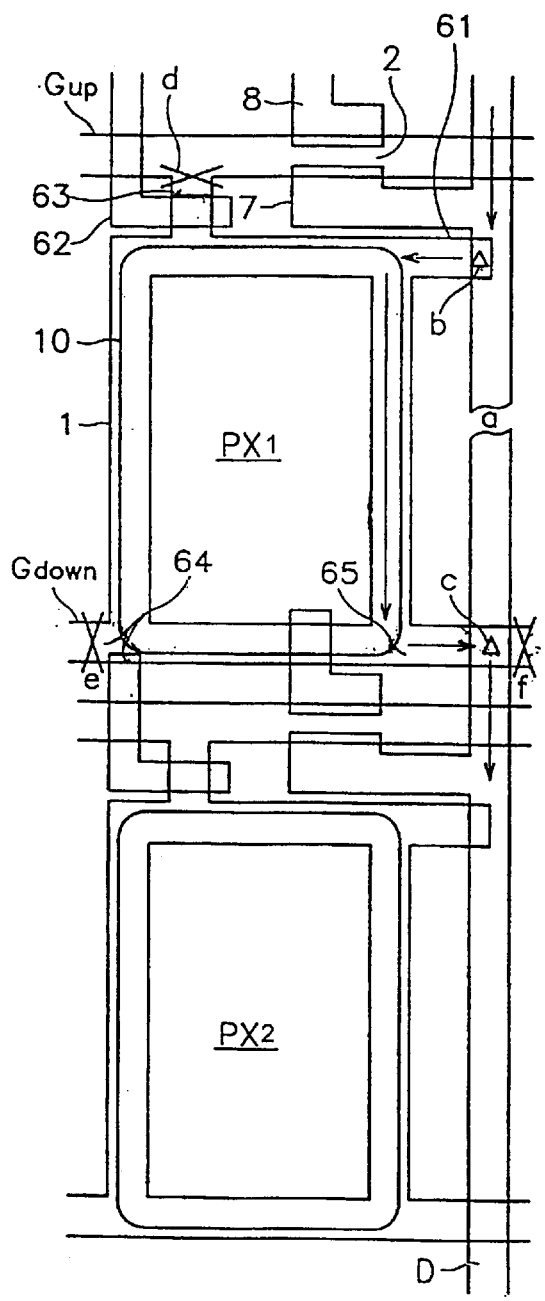
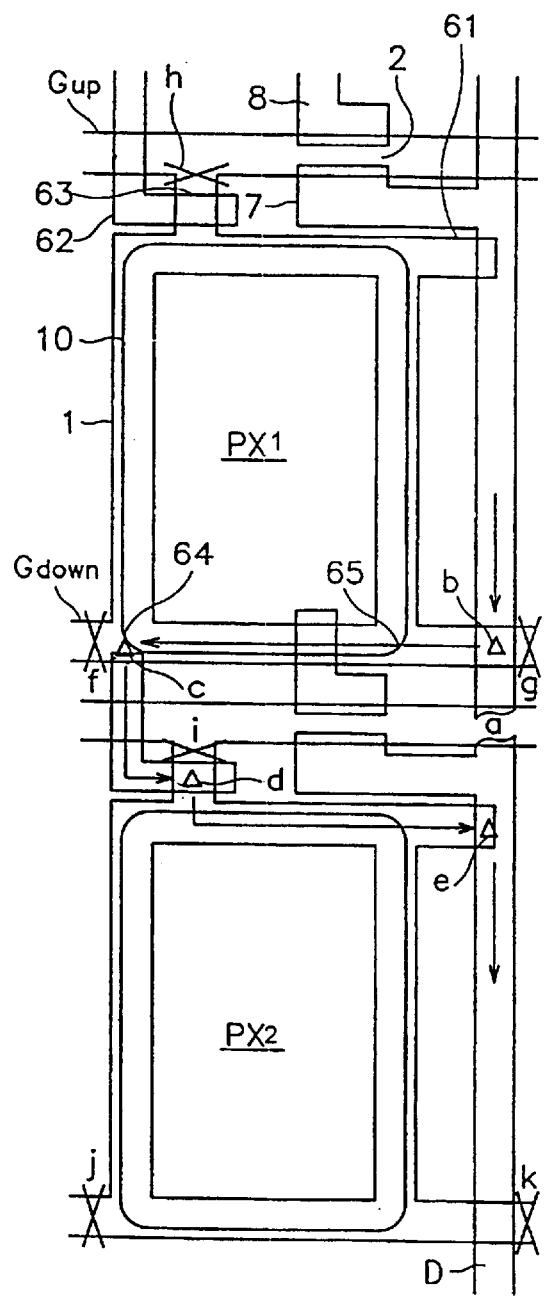

MATRIX-TYPE DISPLAY DEVICE CAPABLE OF BEING REPAIRED IN PIXEL UNIT

This application is a continuation-in-part of application Ser. No. 08/511,989, filed Aug. 7, 1995, now U.S. Pat. No. 5,648,826, which was a division of application Ser. No. 08/205,299, filed Feb. 3, 1994, now U.S. Pat. No. 5,532,853.

BACKGROUND OF THE INVENTION

The present invention relates to a matrix-type display device, and more particularly, to a matrix-type display which can be repaired in a pixel unit.

As an interface between a person and a computer, there are provided various flat panel display devices such as liquid crystal display (LCD), plasma display panel (PDP), electroluminesence (EL) and field emission display (FPD), instead of a conventional cathode ray tube (CRT). These flat panel display devices adopt a matrix-type wiring layout in which horizontal and vertical signal lines cross at right angles. This matrix-type wiring layout will be described with reference to the appended drawings.

FIG. 1 is a plan view showing the layout of a matrix-type display device.

As shown in FIG. 1, in the conventional matrix-type display device, a plurality of scanning signal lines $G_1$, $G_2$, . . . , $G_m$ are parallel formed in the horizontal direction and a plurality of displaying signal lines $D_1$, $D_2$, $D_3$, $D_4$, . . . , $D_{2n-1}$ and $D_{2n}$ are formed in the vertical direction, which crosses with the scanning signal lines while an insulating layer is interposed therebetween.

Each end of the scanning signal lines $G_1$, $G_2$, . . . , $G_m$ has input pads $GP_1$, $GP_2$, . . . , $GP_m$ to which signals are input, and each end of the displaying signals lines $D_1$, $D_2$, $D_3$, $D_4$, . . . , $D_{2n-1}$ and $D_{2n}$ also has input pads $DP_1$, $DP_2$, $DP_3$, $DP_4$, . . . , $DP_{2n-1}$ and $DP_{2n}$. Here, the input pads of the displaying signal lines $D_1$, $D_3$, . . . and $D_{2n-1}$ are formed at upper part of the matrix wiring layout, and the displaying signal lines $D_2$, $D_4$, . . . and $D_{2n}$ have the input pads which are formed at bottom part of the wiring layout.

On the other hand, a pixel (PX) is formed in each space formed by the cross of the scanning signal lines $G_1$, $G_2$, . . . , $G_m$ and the displaying signal lines $D_1$, $D_2$, $D_3$, $D_4$, . . . , $D_{2n-1}$ and $D_{2n}$, with a matrix arrangement. Here, the layout of the pixel may vary according to the type of the display device.

The LCD as one of the flat panel display devices which have been highlighted recently adopts an electro-optical effect of a liquid crystal material. The driving mode of the LCD is roughly classified into a simple matrix type and an active matrix type.

According to the active matrix type LCD, a switching clement having a non-linear characteristic is appended to each pixel with the matrix arrangement to control the operation of each pixel. Here, a thin film transistor (TFT) of three-terminals type is generally used as the switching element and a thin film diode (TFD) such as a metal insulator metal (MIM) of two-terminals type may be used for the switching element.

Especially, the LCD adopting a TFT as the switching element is comprised of a TFT, a pixel electrode, a TFT substrate on which scanning signal lines or gate lines for supplying a scanning signal or a switching signal and displaying signal lines or data lines for supplying a displaying signal or an image signal are formed, an opposing substrate on which a common electrode is formed, and a liquid crystal material which is injected between the TFT substrate and the opposing substrate.

Hereinafter, the pixel layout of the TFT-LCD will be described with reference to FIG. 2.

FIG. 2 is a diagram showing a conventional TFT-LCD. Each pixel (PX) includes a TFT formed on a lower substrate (TFT substrate), a liquid crystal capacitor ($C_{lc}$) comprised of a pixel electrode 10 as a lower substrate, a common electrode (CE) as an opposing upper substrate and a liquid crystal material filled between two electrodes, and a storage capacitor ($C_{st}$) formed on the lower substrate. Here, the storage capacitor ($C_{st}$) stores a signal applied to the pixel PX for a predetermined time lapse. On the other hand, the pixel PX is connected to a data line and a gate line via the TFT. For example, three terminals of the TFT are connected to the data line, the gate line and the pixel electrode 10, respectively. However, in FIG. 2, the TFT for switching a corresponding pixel (PX) exists outside the pixel, that is, a terminal of the TFT is connected to a pixel electrode of the adjacent pixel to drive the adjacent pixel. On the contrary, a TFT for driving a pixel may be formed in the corresponding pixel.

The display operation of the LCD is as follows. A predetermined voltage or a periodic voltage is applied to the common electrode CE, and a voltage is applied to the pixel electrode 10 via the TFT. Consequently, the display operation is performed by the electro-optical effect of the liquid crystal material composing the liquid crystal capacitor $C_{lc}$.

Referring to FIGS. 3 and 4, the plan layout and the vertical layout of the TFT substrate corresponding to the lower substrate of the LCD having the layout as shown in FIGS. 1 and 2 will be described.

FIG. 3 is a plan view showing the layout of the TFT substrate corresponding to the lower substrate of the LCD shown in FIG. 2. Here, the gate line has an layout of a closed curve enclosing the pixel electrode. FIG. 4 is a sectional view of a portion cut along a line A—A shown in FIG. 3. Here, the regions represented by $PX_i$ (i=1, 2, 3, 4), having a rectangular-like form, correspond to the lower portion of a pixel. For convenience' sake, let's call the rectangular-like regions including the gate line and the data line as "pixel" or "pixel region." Also, let's call a set of pixels formed in the horizontal direction and a set of pixels formed in the vertical direction as "pixel row" and "pixel column", respectively.

As shown in FIGS. 3 and 4, the upper and lower gate lines $G_{up}$ and $G_{down}$ are formed on a transparent insulating substrate above and below a pixel row. The lower gate line $G_{down}$ extends straight in the horizontal direction. The upper gate line $G_{up}$ is comprised of a first horizontal portion $G_{h1}$ which is the longest portion thereof, a first vertical portion $G_{v1}$ extending downward from the end of the first horizontal portion $G_{h1}$, a second horizontal portion $G_{h2}$ extending in the horizontal direction from the end of the first vertical portion $G_{v1}$, and a second vertical portion $G_{v2}$ extending upward from the end of the second horizontal portion $G_{h2}$. This layout of the upper gate line $G_{up}$ is duplicated with respect to each pixel. Generally, the above dual layout of the gate line called a dual gate line layout.

The first horizontal portion $G_{h1}$ of the upper gate line $G_{up}$ and the lower gate line $G_{down}$ are connected by a left auxiliary gate line 1a, and the second vertical portion $G_{v2}$ of the upper gate line $G_{up}$ is lengthened downward to form a right auxiliary gate line 1b reaching the lower gate line $G_{down}$.

A data line D is vertically formed between each pixel column and crosses with the first horizontal portion $G_{h1}$ of the upper gate line $G_{up}$ and the lower gate line $G_{down}$ via an gate insulating layer 4 (see FIG. 4).

The upper and lower gate lines $G_{up}$ and $G_{down}$ and a pair of left and right auxiliary gate lines 1a and 1b form a closed curve as a black matrix. In the region defined by the closed curve, there is formed the pixel electrode 10 with which the gate lines $G_{up}$ and $G_{down}$ and the auxiliary gate lines 1a and 1b are overlapped while the gate insulating layer 4 (see FIG. 4) and a protection layer 9 (see FIG. 4) which will be described later are interposed between the pixel electrode 10 and gate lines $G_{up}$ and $G_{down}$ and the auxiliary gate lines 1a and 1b. Here, the overlapped portion plays as the storage capacitor $C_{st}$ (see FIG. 2). This storage capacitor formed in a closed curve is called "ring capacitor." Also, only the upper and lower gate lines $G_{up}$ and $G_{down}$ and the auxiliary gate lines 1a and 1b forming the ring capacitor may call a ring capacitor for short. Here, a ring capacitor means the latter.

It is preferable that the gate lines $G_{up}$ and $G_{down}$ and the auxiliary gate lines 1a and 1b have the above layout of a closed curve to surround the pixel electrode since a signal can be transferred even if the part of the gate lines $G_{up}$ and $G_{down}$ and the auxiliary gate lines 1a and 1b are disconnected.

On the other hand, a TFT is formed on the second vertical portion $G_{v2}$ of the upper gate line $G_{up}$, which will be described in detail with reference to FIGS. 3 and 4.

First, a part of the second vertical portion $G_{v2}$ becomes a gate electrode 2 of the TFT. When the gate lines $G_{up}$ and $G_{down}$ are made of material which enables anode oxidation, such as aluminum, the remaining portion other than a gate pad (not shown) electrically connecting the gate lines $G_{up}$ and $G_{down}$ with the outside is anode-oxidized in general. Thus, a gate oxide layer 3 which is anode-oxidized exists on the gate electrode 2. The gate insulating layer 4 is formed on the whole surface of the gate oxide layer 3 excluding the gate pad.

A semiconductor layer 5 is formed covering the gate electrode 2 while the gate insulating layer 4 is interposed therebetween. The semiconductor layer 5 is also formed on the gate lines $G_{up}$ and $G_{down}$ to prevent a short between the gate lines $G_{up}$ and $G_{down}$ and the data line D. Generally, the semiconductor layer 5 is made of amorphous silicon or polysilicon.

A contact layer 6 for improving an ohmic contact between the semiconductor layer 5 and a metal is formed on the semiconductor layer 5, which is generally made of $n^+$ amorphous silicon doped with $n^+$ impurities of a high concentration. In FIG. 3, the pattern of the contact layer 6 is formed on a portion in which the semiconductor layer 5 is overlapped with a source electrode 7 and a drain electrode.

The source electrode 7 as a branch of the data line D and the drain electrode 8 being separated from the source electrode 7 are formed on the contact layer 6. Since the source electrode 7 locates near a cross point between the upper gate line $G_{up}$ and the data line D, the source electrode 7 may be overlapped with the second vertical portion $G_{v2}$ of the upper gate line $G_{up}$ as shown in FIG. 3. One end of the drain electrode 8 opposite to the source electrode 7 while the gate electrode 2 is interposed therebetween, and the other end of the drain electrode 8 is connected to the pixel electrode 10 of the upper pixel in the same pixel column while being overlapped with the lower gate line $G_{down}$ of the upper pixel. For example, as shown in FIG. 3, the drain electrode 8 of the pixel PX2 is connected to the pixel electrode 10 of the pixel PX1 which is the upper pixel of the same pixel column, while being overlapped with the lower gate line $G_{down}$ located beneath the pixel electrode 10 of the pixel PX1.

A protection layer 9 is covered on the resultant surface in which the source electrode 7 and the drain electrode 8 are formed, excluding on the contact portion between the drain electrode 8 and the pixel electrode 10 and a pad (not shown), and the pixel electrode 10 made of a transparent conductive material is formed on the protection layer 9.

In the pixel layout shown in FIG. 3, a TFT (including a gate electrode, a source electrode and a drain electrode) formed in a pixel region does not drive the pixel of the pixel region. However, for the convenience' sake, the TFT will be called "the TFT of the pixel" through the whole specification.

In this flat panel display device, particularly, in the TFT substrate for the LCD, there are wirings such as gate and data lines for supplying a signal to the pixel as described above. These wirings may be easily disconnected or shorted by a topographical characteristic of the region through which the wiring passes or by the subsequent heating and etching processes. If the wiring is disconnected or shorted, a signal required for the pixel cannot be properly applied. As a result, the displaying function cannot be performed smoothly.

On the other hand, in the case of the LCD having the gate lines' layout including the up, lower gate lines $G_{up}$, $G_{down}$ and auxiliary gate lines 1a and 1b, the disconnection of the gate lines $G_{up}$, $G_{down}$, 1a and 1b can be easily repaired. If the data line D is disconnected, an image signal cannot be transferred to a portion following the shorted point. Also, if the pixel electrode 10 and the gate lines $C_{up}$, $G_{down}$, 1a and 1b are shorted, and the gate electrode 2 is lost or damaged, it is impossible to repair the drawback.

To solve the above problem, many trials have been performed. According to a solution from many trials, a repair line is formed in a closed curve around a screen having the pixels to cross the gate line and the data line while a gate insulating layer is interposed between the gate and data lines and the repair line, so that the repair line can replace the disconnected wiring if a specific wiring is disconnected.

Then, the conventional matrix-type display device in which a repair line is formed in a closed curve around a screen will be described in detail with reference to FIG. 5.

As shown in FIG. 5, a repair line RL made of a conductive material is formed in a closed curve around a region in which a plurality of pixels formed by crossing a plurality of linear scanning signal lines $G_1, G_2, \ldots, G_m$ which are parallel each other in the horizontal direction and a plurality of linear displaying signal lines $D_1, D_2, D_3, D_4, \ldots, D_{2n-1}$ and $D_{2n}$ which crosses the linear scanning signal lines at a right angle are formed. The repair line RL crosses each of scanning signal lines $G_1, G_2, \ldots, G_m$ once at the one side of the scanning signal lines and each of displaying signal lines $D_1, D_2, D_3, D_4, \ldots, D_{2n-1}$ and $D_{2n}$ twice at the upper and lower sides. Here, the repair line RL, the scanning signal lines $G_1, C_2, \ldots, G_m$ and the displaying signal lines $D_1, D_2, D_3, D_4, \ldots, D_{2n-1}$ and $D_{2n}$ are formed while an insulating layer is interposed therebetween, so that each cross portion formed therebetween is used as a capacitor.

Hereinafter, the operation of the matrix-type display device will be described in detail.

A switching signal is applied to the pixel electrode 10 in sequence via the plural scanning signal lines $G_1, G_2, \ldots, G_m$ formed in the horizontal direction. Then, according to the above appliance, an image signal is applied to the corresponding pixel electrode 10 via the displaying signal lines $D_1, D_2, D_3, D_4, \ldots, D_{2n-1}$ and $D_{2n}$.

On the other hand, as shown in FIG. 5, supposing that a displaying signal line $D_3$ is disconnected. Here, the disconnection occurs at a point represented by a mark "≈." In this case, an image signal applied via the displaying signal line $D_3$ reaches to just the disconnect point. That is, the image signal does not reach to a displaying signal line portion following the disconnect point.

Hereinafter, let's consider a method for making a signal reach the displaying signal line portion following the disconnect point using the repair line RL. For this purpose, the upper and lower cross points between the displaying signal line $D_3$ and the repair line RL, represented by a rectangle, are shorted using a laser. When the pixel connected to the displaying signal line $D_3$ following the disconnect point is opened, a signal from the input pad $DP_3$ passes the shorted upper cross point and then moves from the cross portions to a left path $P_1$ or a right path $P_2$ of the displaying signal line $D_3$ along the repair line RL connected to the displaying signal line $D_3$. However, since the path $P_2$ is longer than the path $P_1$ and crosses with more displaying signal lines compared with the path $P_1$, the signal movement along the path $P_2$ is inefficient. Thus, it is required to move the signal along only the path $P_1$ while blocking the signal movement along the path $P_2$. For blocking the signal movement along the path $P_2$, two points on the path $P_2$, which are near the short points represented by the rectangles and represented by a mark "x", are cut. As a result, the signal can be applied to the displaying signal line $D_3$ following the disconnect point via the path $P_1$ of the repair line RL.

On the other hand, the signal applied via the path $P_1$ should pass cross points a and a' each formed between the displaying signal lines $D_1$ and $D_2$ and the repair line RL. However, as described above, the cross points a and a' function as a capacitor which distorts the image signal moving along the repair line RL. Particularly, the number of the displaying and scanning signal lines increases as the size of the screen increase. Consequently, the number of the cross points existing on the path along which the signal moves also increases. That is, the number of the capacitors increases and the overall static capacitance also increases. Also, since the length of the repair line RL increases, resistance increases. Due to the above reasons, the signal moving along the repair line RL may be further distorted by a RC time delay.

Also, the number of the displaying signal lines $D_1$, $D_2$, $D_3$, $D_4$, ..., $D_{2n-1}$ and $D_{2n}$ which can be repaired using the repair line RL is limited due to limitations of space.

SUMMARY OF THE INVENTION

To solve the above problems, it is an object of the present invention to provide a matrix-type display device by which nearly all disconnection of signal lines is effectively repaired while preventing the increase of the processing number, the decrease of an aperture ratio and a RC time delay, and the defects caused from a short between pixel electrodes and signal lines and a loss in an electrode of a switching element can be repaired.

It is another object of the present invention to provide a method for repairing disconnection of a data line of the matrix-type display device.

As an aspect of the first object, there is provided a matrix-type display device in which a plurality of pixel regions are arranged in a matrix-type, comprising: upper and lower first signal lines stretching in the horizontal direction to form upper and lower boundaries of the each pixel region; left and right auxiliary signal lines connecting the upper and lower first signal lines to form left and right boundaries of the each pixel region; a second signal line stretching in the vertical direction between pixel regions, crossing the upper and lower first signal lines while being insulated from the upper and lower first signal lines; a pixel electrode formed in the each pixel region and comprised of transparent conductive material; a switching element having a first terminal connected to the lower first signal line, a second terminal connected to the pixel electrode, and a third terminal connected to the second signal line; and a first connect means stretching from the upper first signal line to a lower first signal line of an adjacent upper pixel; a second connect means stretching from the right auxiliary signal line to a left auxiliary signal line of an adjacent left pixel; and a third connect means stretching from the lower first signal line and a lower first signal line of a pixel being adjacent in the horizontal direction.

Here, it is preferable that the upper and lower first signal lines and the right and left auxiliary signal lines cross each other along the periphery of the pixel electrode via an insulation layer to form a capacitance electrode.

Also, it is preferable that cutting portions which prevent the pixel electrode from being overlapped with the right and left auxiliary signal lines are formed in the upper and lower directions of the second connect means.

As another aspect of the first object, there is provided a matrix-type display device in which a plurality of pixel regions are arranged in a matrix-type, comprising: upper and lower first signal lines stretching in the horizontal direction to form upper and lower boundaries of the each pixel region; a second signal line stretching in the vertical direction between pixel regions, crossing the upper and lower first signal lines while being insulated from the upper and lower first signal lines; left and right auxiliary signal lines formed in parallel to the second signal line, adjacent to the second signal line, to form left and right boundaries of the each pixel region, having at least three cross points with the second signal line together with upper and lower first signal lines; a pixel electrode formed in the each pixel region and comprised of transparent conductive material; and a switching element having a first terminal connected to the upper first signal line, a second terminal connected to the pixel electrode, and a third terminal connected to the second signal line.

Here, it is preferable that the auxiliary signal lines are connected to the upper first signal line or the lower first signal line, and the upper and lower first signal lines and the auxiliary signal lines are used as a capacitance electrode.

Also, it is preferable that the matrix-type display device further comprises connect means which is formed by stacking the upper first signal line and a lower first signal line of the upper pixel while interposing an insulation layer therebetween, and connect means which is formed by stacking the auxiliary signal lines and auxiliary signal lines of an upper pixel while interposing an insulation layer therebetween.

In addition, it is preferable that the connect means is made of the same material as the pixel electrode or the third terminal, and the auxiliary signal lines are made of an opaque metal layer to block the periphery of the pixel electrode from light.

As an aspect of the second object, there is provided a method of repairing disconnection of a data line in a matrix-type display device in which a plurality of pixel regions are arranged in a matrix-type and which includes: a first signal line stretching in the horizontal direction to form a boundary of the each pixel region, for applying a gate signal; a second signal line stretching in the vertical direction between pixel regions, crossing the first signal line while being insulated from the first signal line, for applying a data signal; a pixel electrode formed in the each pixel region and comprised of transparent conductive material; a switching element having a first terminal connected to the first signal line, a second terminal connected to the second signal line, and a third terminal connected to the pixel electrode; and an auxiliary signal line extended from a branch of the first signal line, being adjacent to the second signal line, wherein the first signal line and the auxiliary signal line have at least two cross points or overlapping points with the second signal line, the repairing method in which the adjacent cross points or the overlapping points are shorted using a laser when the second signal line is disconnected, and the auxiliary signal line is separated from the second signal line. Here, it is preferable that the first signal line is comprised of two signal lines to form upper and lower boundaries of the each pixel region, and the auxiliary signal lines are partially overlapped with the pixel electrode to be used as an auxiliary capacitance electrode.

As another aspect of the second object, there is provided a method of repairing disconnection of a data line in a matrix-type display device in which a plurality of pixel regions are arranged in a matrix-type and which includes: upper and lower first signal lines stretching in the horizontal direction to form upper and lower boundaries of the each pixel region, for applying a gate signal; a second signal line stretching in the vertical direction between pixel regions, crossing the upper and lower first signal lines while being insulated from the upper and lower first signal lines, for applying a data signal; a pixel electrode formed in the each pixel region and comprised of transparent conductive material; a switching element having a first terminal connected to the upper first signal line, a second terminal connected to the second signal line, and a third terminal connected to the pixel electrode; and an auxiliary capacitance electrode partially overlapped with the pixel electrode, wherein the auxiliary capacitance electrode has at least two cross points or overlapping points with the second signal line, the repairing method in which the adjacent cross points or the overlapping points are shorted using a laser when the second signal line is disconnected, and the auxiliary capacitance electrode is separated to form a bypass of the data line.

BRIEF DESCRIPTION OF THE DRAWINGS

The above objects and advantages of the present invention will become more apparent by describing in detail preferred embodiments thereof with reference to the attached drawings in which:

FIGS. 27A to 27D are diagrams illustrating a method of repairing a defect of the LCD shown in FIG. 26;

DETAILED DESCRIPTION OF THE INVENTION

Referring to FIGS. 6A to 15, a basic concept of the present invention and the operation thereof will be described. Here, since a main purpose of the present invention is to repair a second signal line or a data line, the conventional dual gate line layout and ring capacitor layout both can be adopted as it is. However, one of these two layouts may be adopted according to a requirement and modifications. Some examples of the layout will be suggested below.

As a first type, the dual gate line layout and the ring capacitor layout are both adopted.

As a second type, only the dual gate line layout is adopted. Here, the auxiliary gate lines 1a and 1b of FIG. 3 are omitted.

As a third type, only the ring capacitor layout is adopted. Here, the lower gate line $G_{down}$ which does not form the ring capacitor is omitted from the layout of FIG. 3. Here, it is unnecessary to classify the auxiliary gate lines 1a and 1b and the remaining lower gate line $G_{down}$.

As a fourth type, there is an layout in which only the lower gate line $G_{down}$ forming the ring capacitor is omitted. In this case, it is unnecessary to classify the auxiliary gate lines 1a and 1b and the remaining the lower gate line $G_{down}$. However, the remaining lower gate line $G_{down}$ does not function as the electrode of a storage capacitor and a black matrix.

Figure 1:
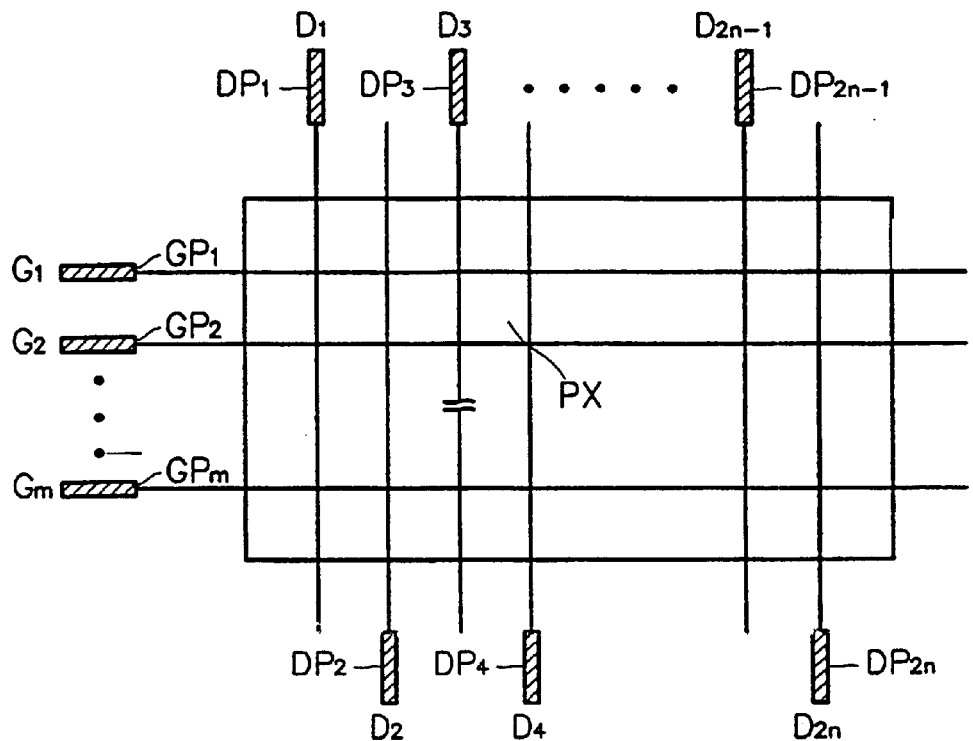
FIG. 1 is a plan view showing the layout of a matrix-type display device.
Figure 2:
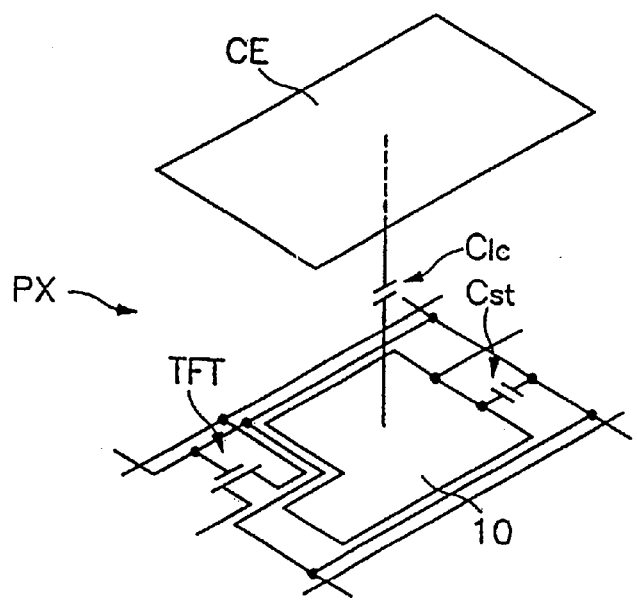
FIG. 2 is a pixel portion of a conventional TFT-LCD.
Figure 3:
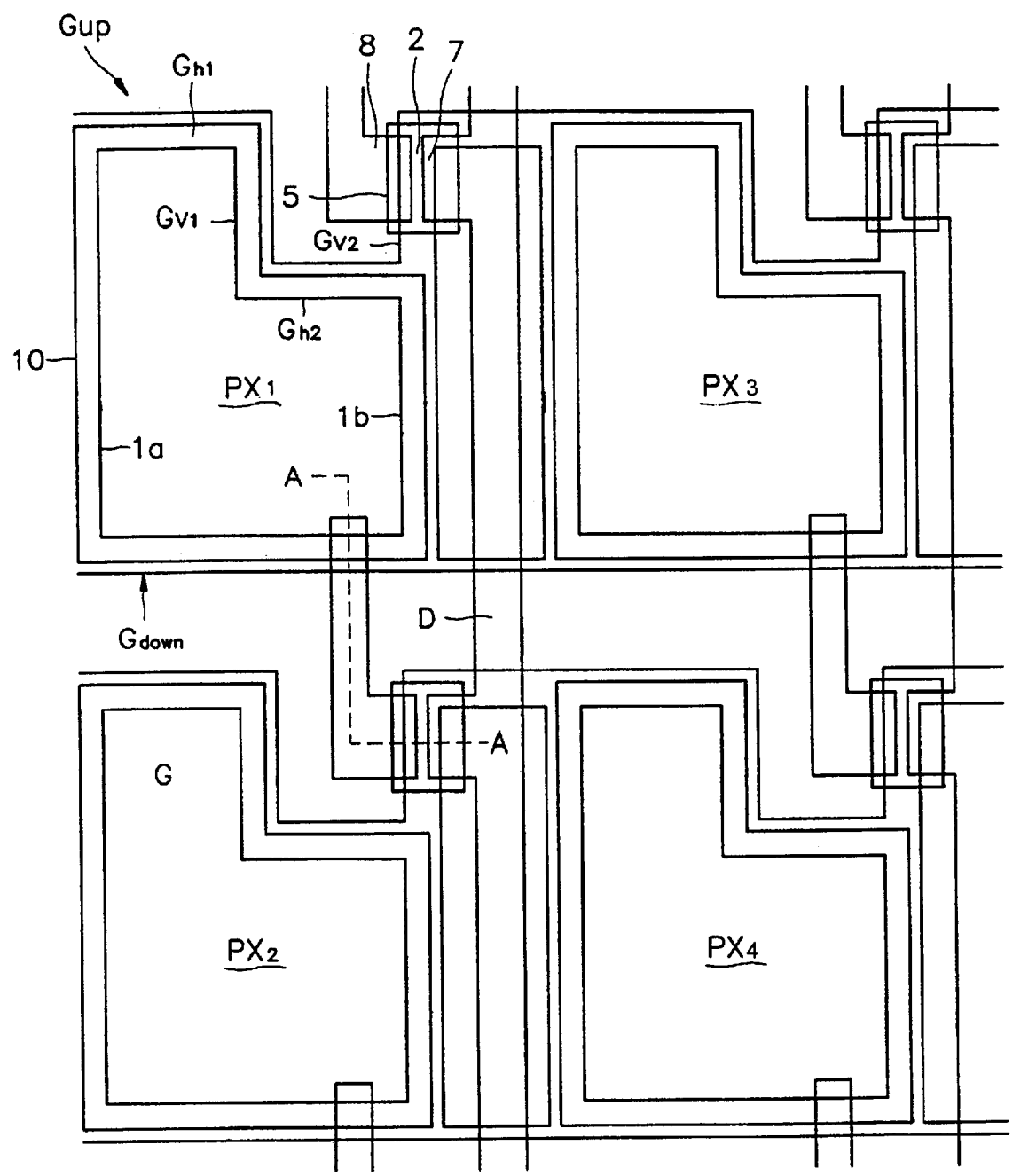
FIG. 3 is a layout plan of the TFT substrate of the LCD shown in FIG. 2.

As a fifth type, the lower gate line $G_{down}$ may be completely omitted from the layout of FIG. 3. In this case, it is impossible to repair the disconnection of the gate lines $G_{up}$ and $G_{down}$. Here, it is known that the auxiliary gate lines function as a capacitor or a black matrix.

As a sixth type, one of the auxiliary gate lines 1a and 1b may be omitted from the layout of FIG. 3, or one or both of the auxiliary gate lines 1a and 1b may be separated from one or both of the upper and lower gate lines $G_{up}$ and $G_{down}$. The auxiliary gate lines 1a and 1b are connected to one of the upper and lower gate lines $G_{up}$ and $G_{down}$ the auxiliary gate lines 1a and 1b function as the electrode of a capacitor as well as a black matrix. However, the auxiliary gate lines 1a and 1b are separated from both gate lines $G_{up}$ and $D_{down}$, the auxiliary gate lines 1a and 1b function as only a black matrix. This sixth example may coexist with the above five examples.

First, supposing that a second signal line D and a upper first signal line $G_{up}$ are connected via a capacitor $C_R$. Here, FIG. 6A corresponds to the first type in which the dual gate line layout and the ring capacitor layout are both adopted, and FIG. 6B corresponds to the second type in which the auxiliary signal lines 1a and 1b are omitted (herein one of the auxiliary signal lines may be omitted like the sixth type). Also, FIG. 6C corresponds to the fourth type in which the lower first signal line $G_{down}$ forming the ring capacitor is only omitted, so that both auxiliary signal lines 1a and 1b are required to transfer a signal from the first signal line.

Figure 6A:
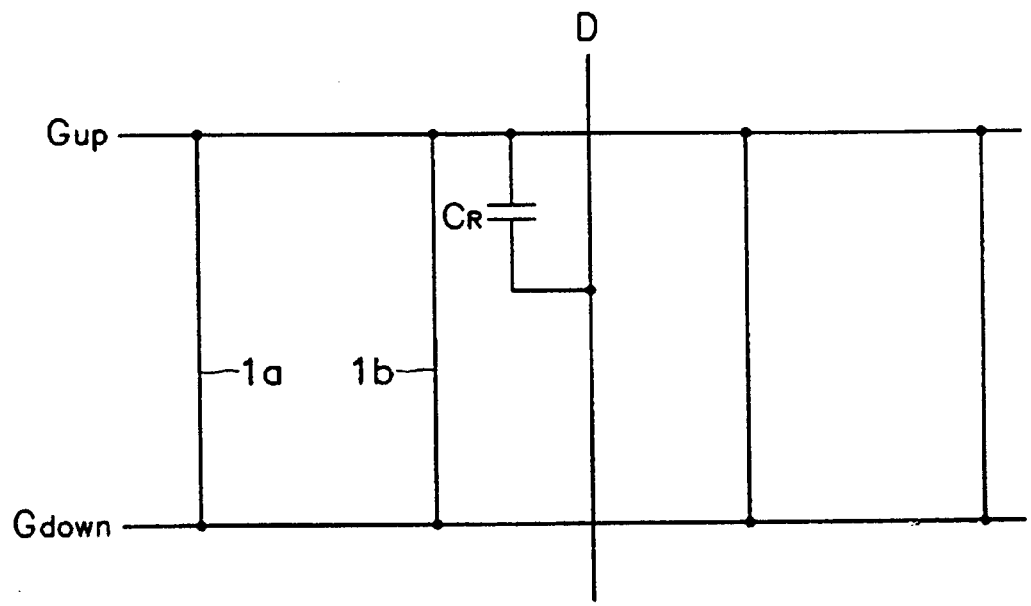
FIGS. 6A to 6C are schematic diagrams showing a first embodiment of a repairing means according to the present invention.

A method of repairing the layout shown in FIG. 6A will be described.

Figure 7:
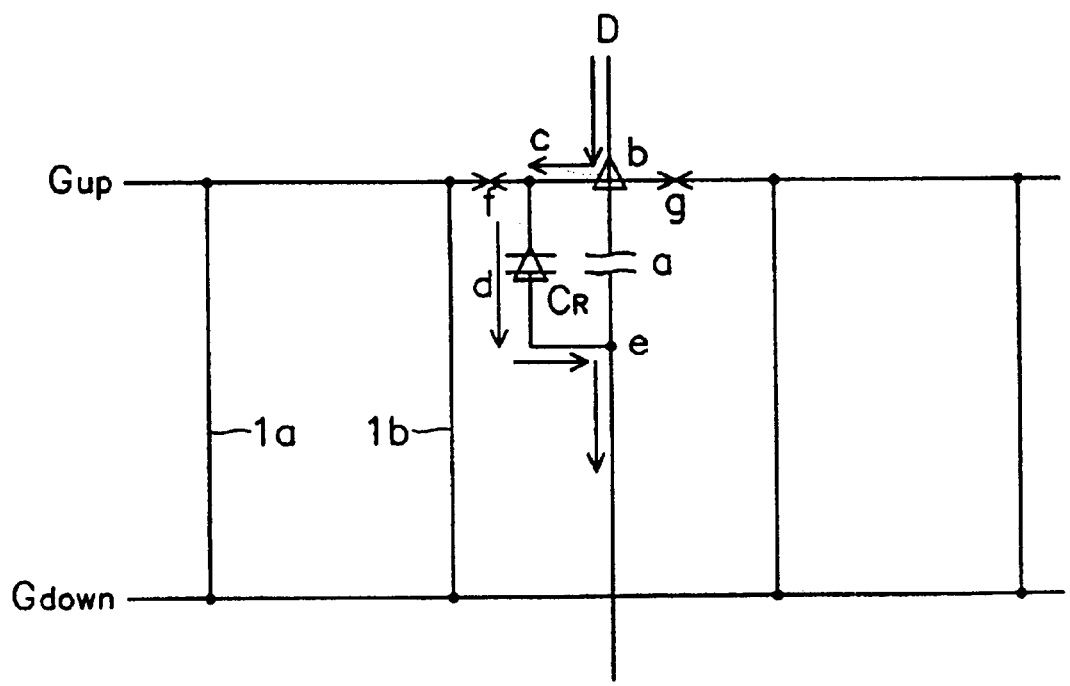
FIG. 7 is a schematic diagram illustrating a method of repairing the data line shorted in the layout shown in FIG. 6A.

As shown in FIG. 7, when the second signal line D placed between a cross point of the upper first signal line $G_{up}$ and the second signal line D and a connect point e of the capacitor $C_R$ and the second signal line D is disconnected (a), the second signal line D and the upper first signal line $G_{up}$ are shorted (b) and then both terminals of the capacitor $C_R$ are shorted (d). Thereafter, the upper first signal line $G_{up}$ of the outer sides of the connect point c between the upper first signal line $G_{up}$ and the capacitor $C_R$ and short point b is disconnected respectively (f and g). As a result, the signal flowing along the second signal line D flows again the second signal line D around the disconnect point a via the upper first signal line $G_{up}$ and the shorted capacitor $C_R$.

However, the above repairing is useful only when the second signal line D placed between a cross point of the upper first signal line $G_1$ and the second signal line D and a connect point e of the capacitor $C_R$ and the second signal line D is disconnected (a).

Figure 6B:
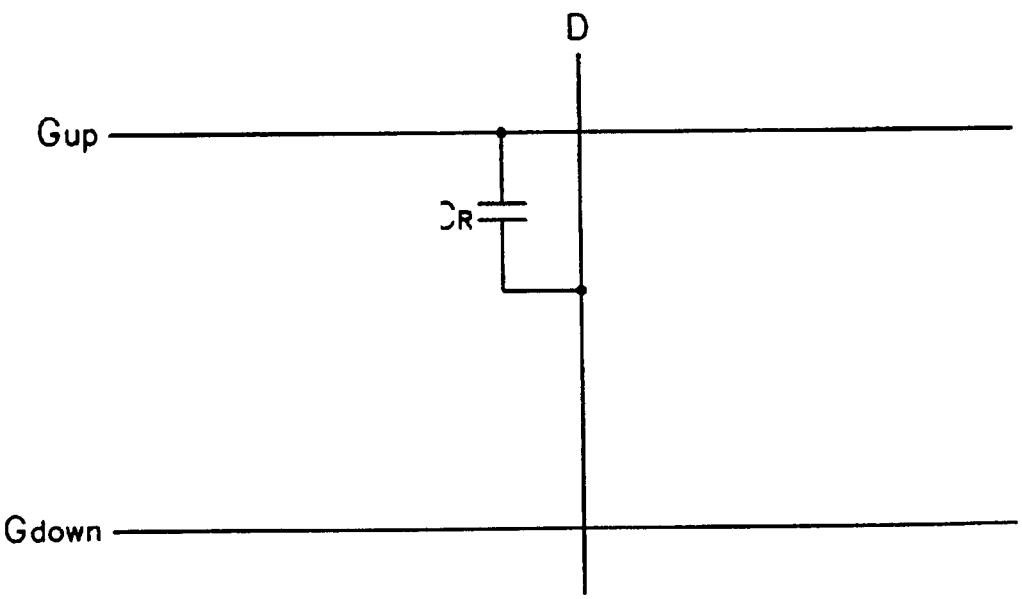
Figure 6C:
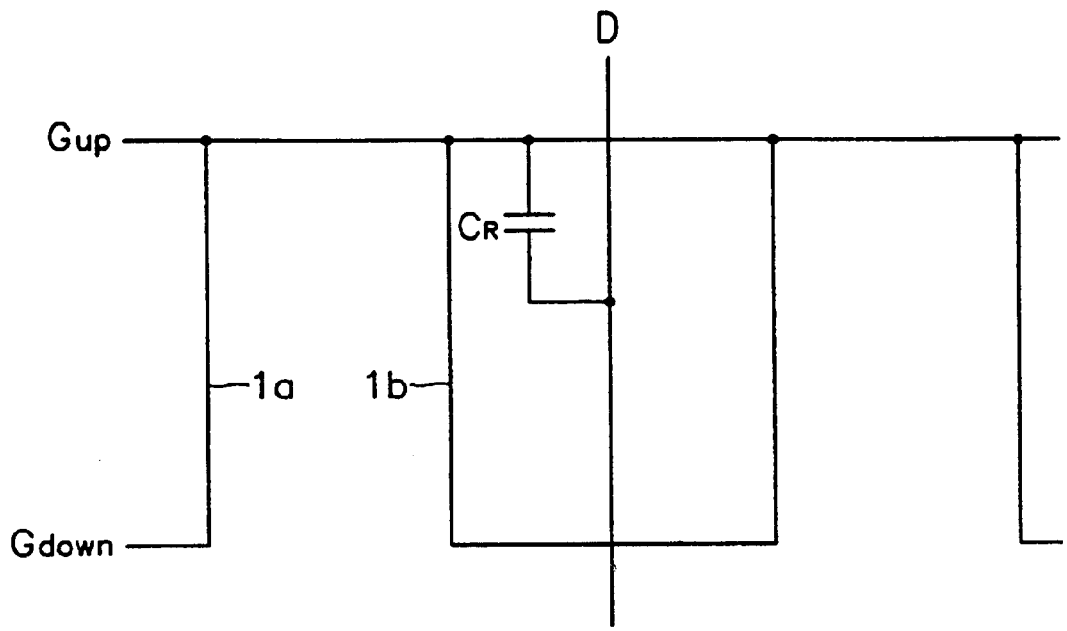

The cases shown in FIGS. 6B and 6C can be repaired by the above method. However, in the case of FIG. 6C, both auxiliary signal line 1a and 1b are required for transferring the signal to the upper and lower first signal lines $G_{up}$ and $G_{down}$.

Also, when the second signal line D and the lower first signal line $G_{down}$ are connected via a capacitor, the above repairing methods can be applicable.

Figure 8:
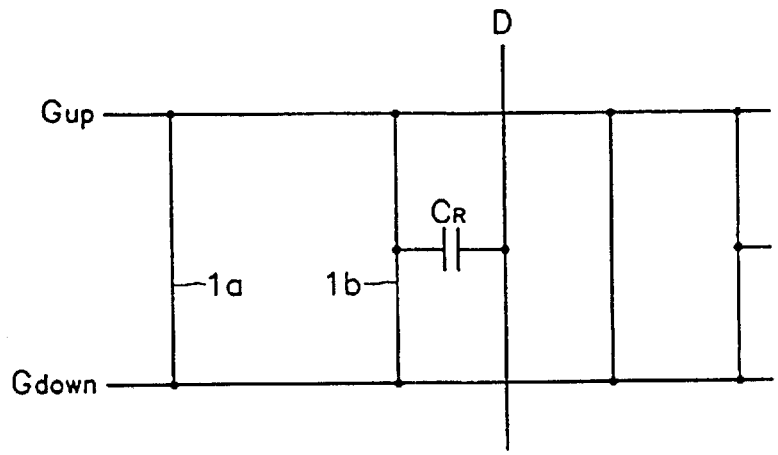
FIG. 8 is a schematic diagram showing a second embodiment of the repairing means according to the present invention.

Next, it is assumed that a second signal line D and an auxiliary signal line 1b are connected via a capacitor $C_R$, as shown in FIG. 8. Here, another auxiliary signal line 1a which is not connected to the second signal line D via a capacitor $C_R$ may be omitted.

A method of repairing the above case shown in FIG. 8 will be described.

Figure 9A:
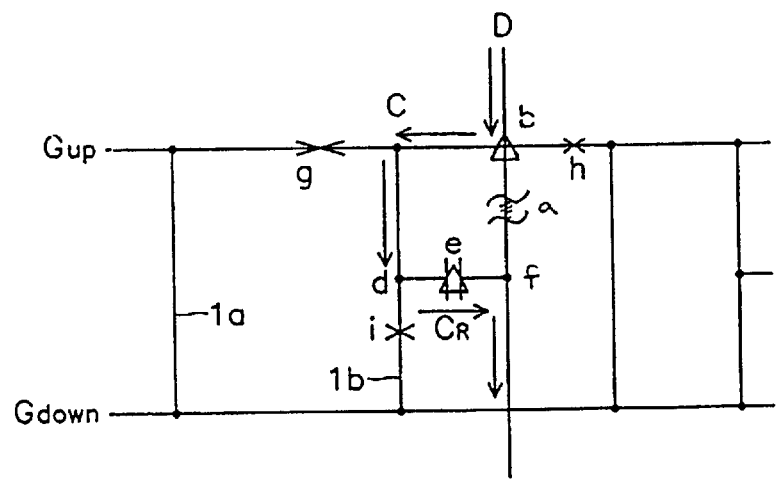
FIGS. 9A and 9B are schematic diagrams illustrating a method of repairing the data line shorted in the layout shown in FIG. 8.

As shown in FIG. 9A, when the second signal line D placed between a cross point (b) of the upper first signal line $G_{up}$ and the second signal line D and a connect point f of the capacitor $C_R$ and the second signal line D is disconnected (a), the second signal line D and the upper first signal line $G_{up}$ are shorted (b) and then both terminals of the capacitor $C_R$ are shorted (e). Thereafter, the upper first signal line $G_{up}$ of the outer sides of the connect point c between the upper first signal line $G_{up}$ and the capacitor $C_R$ and short point b is disconnected respectively (g and h). Also, the auxiliary signal line 1b beneath a connect point d of the auxiliary signal line 1b and the capacitor $C_R$ is disconnected (i). As a result, the signal flowing along the second signal line D flows again the second signal line D around the disconnect point a via the upper first signal line $G_{up}$, the auxiliary signal line 1b and the shorted capacitor $C_R$.

Figure 9B:
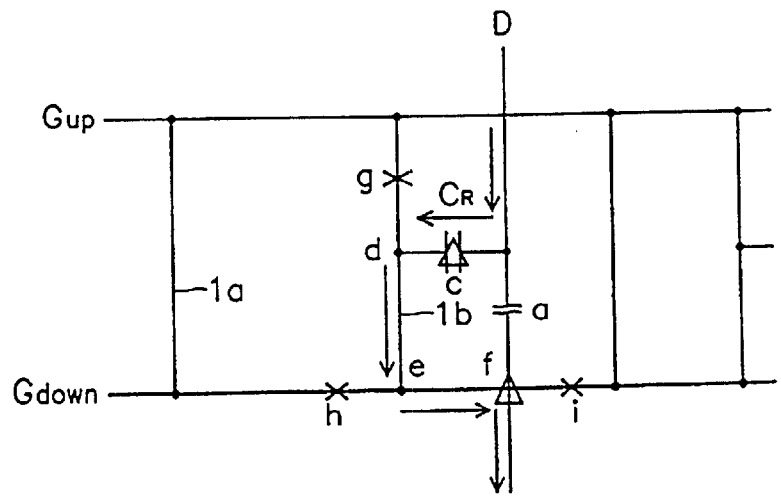

Also, when the second signal line D placed between a connect point (b) of the capacitor $C_R$ and the second signal line D and a cross point f of a lower first signal line $G_{down}$ and the second signal line D is disconnected (a) as shown in FIG. 9B, both terminals of the capacitor $C_R$ are shorted (c) and then the second signal line D and the lower first signal line $G_{down}$ are shorted (f). Thereafter, the auxiliary signal line 1b above a connect point d of the auxiliary signal line 1b and the capacitor $C_R$ is disconnected (g) and the lower first signal line $G_{down}$ of the outer sides of the connect point e between the lower first signal line $G_{down}$ and the auxiliary signal line 1b and the short point f is disconnected respectively (h and i). As a result, the signal flowing along the second signal line D flows again the second signal line D around the disconnect point a via the shorted capacitor $C_R$, the auxiliary signal line 1b and the lower first signal line $G_{down}$.

In the above case, all disconnection of the second signal line between the cross point of the upper first signal line and the second signal line and the cross point of the lower first signal line and the second signal line can be repaired. Also, since the signal can be transferred to the upper first signal line $G_{up}$ and the lower first signal line $G_{down}$ even if there is no the auxiliary signal line 1a which is not connected to the second signal line D via the capacitor $C_R$, the auxiliary signal line 1a may be omitted.

Figure 10A:
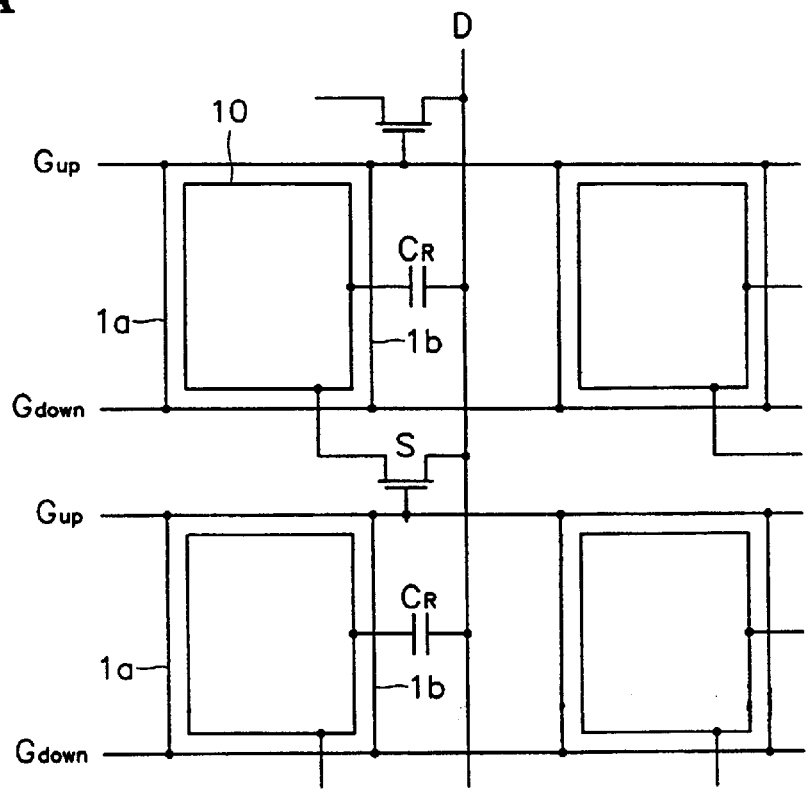
FIGS. 10A to 10C are schematic diagrams showing a third embodiment of the repairing means according to the present invention.
Figure 10B:
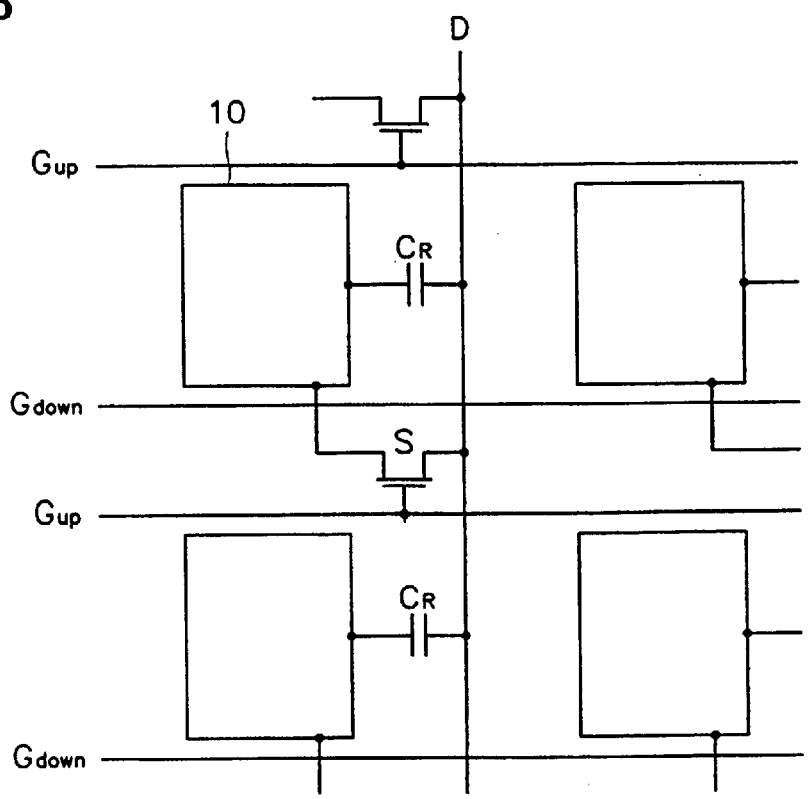
Figure 10C:
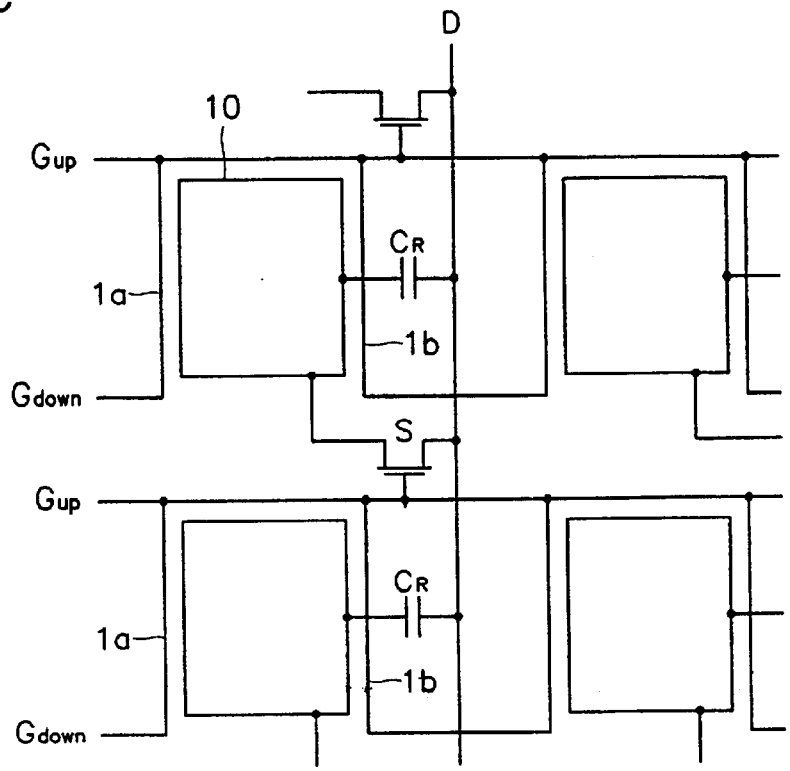

Next, as shown in FIGS. 10A and 11B, supposing that a second signal line D and a pixel electrode 10 are connected via a capacitor $C_R$. As described above, the pixel electrode 10 is connected to a terminal of a switching element S and the remaining two terminals of the switching element S are connected to an upper first signal line $G_{up}$ of next row of same column and the second signal line D, respectively. Here, there are three cases as shown in FIGS. 10A to 10C. In FIG. 10A, as the first type, the dual gate line layout and the ring capacitor layout are both adopted. FIG. 10B shows the second type adopting only the dual gate line layout, where one of the auxiliary signal lines 1a and 1b may be omitted as the sixth type. Also, FIG. 10C shows a layout in which the lower first signal line forming the ring capacitor is omitted.

Then, a method of repairing the case shown in FIG. 10A will be described.

Figure 11:
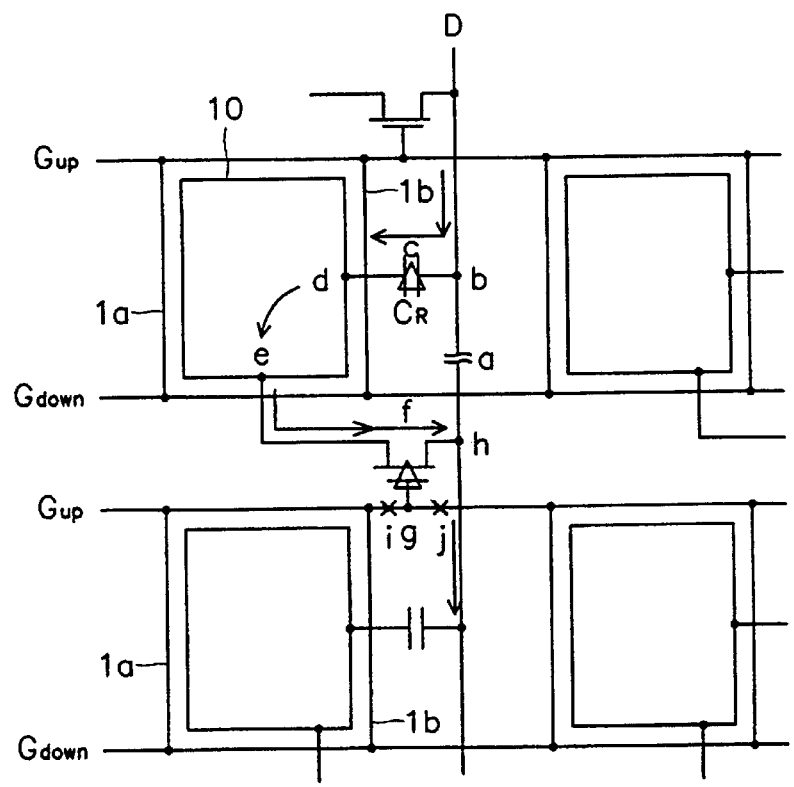
FIG. 11 is a schematic diagram illustrating a method of repairing the data line shown in the layout shown in FIG. 10A.

As shown in FIG. 11, when the second signal line D placed between a connect point of the second signal line D and the capacitor $C_R$ and a connect point h of a terminal of the switching element S and the second signal line D is disconnected (a), both terminals of the capacitor $C_R$ are shorted (c) and three terminals of the switching element S are shorted (f) Then, the upper first signal line $G_{up}$ of the outer sides of a connect point g between the switching element S and the upper first signal line $G_{up}$ is disconnected respectively (i and j). As a result, the signal flowing along the second signal line D flows again the second signal line D around the disconnect point a via the shorted capacitor $C_R$, the pixel electrode 10 and the shorted switching element S.

However, this repairing method can be applied to only the case in which the second signal line D placed between the connect point b of the second signal line D and the capacitor $C_R$ and the connect point h of the second signal line D and a terminal of the switching element S is disconnected (a).

The cases shown in FIGS. 10B and 10C can be repaired using the same method described above.

Hereinafter, there will be described the sixth type in which the layout of the auxiliary signal lines arc modified.

Figure 12A:
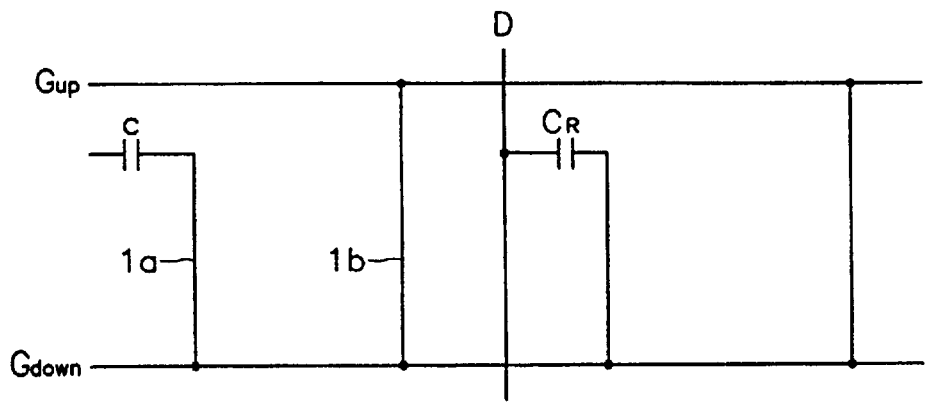
FIGS. 12A to 12B are schematic diagrams showing a fourth embodiment of the repairing means according to the present invention.
Figure 12B:
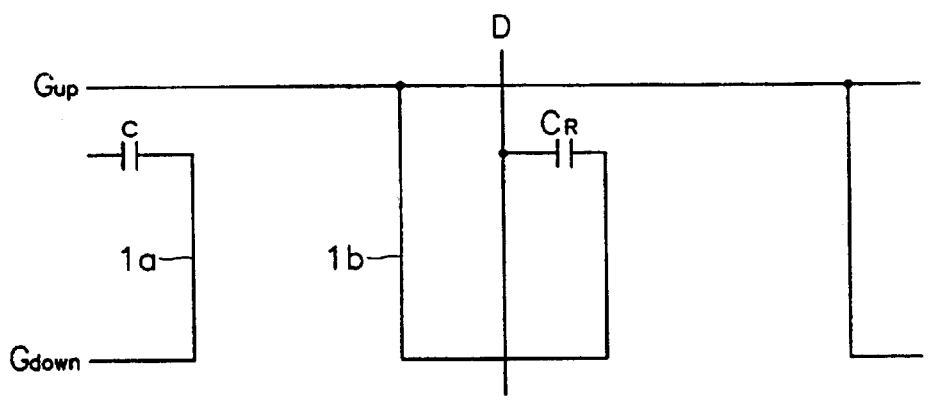

First, as shown in FIGS. 12A and 12B, supposing that an end of an auxiliary signal line 1a is separated from an upper first signal line $G_{up}$ and a second signal line D and a lower first signal line $G_{down}$ are connected via a capacitor $C_R$. Here, FIGS. 12A and 12B show layouts combined with the first and fourth types, respectively, wherein the remaining auxiliary signal line 1b which is not separated from the upper first signal line $G_{up}$ may be omitted.

Then, a method of repairing the case shown in FIG. 12A will be described.

Figure 13:
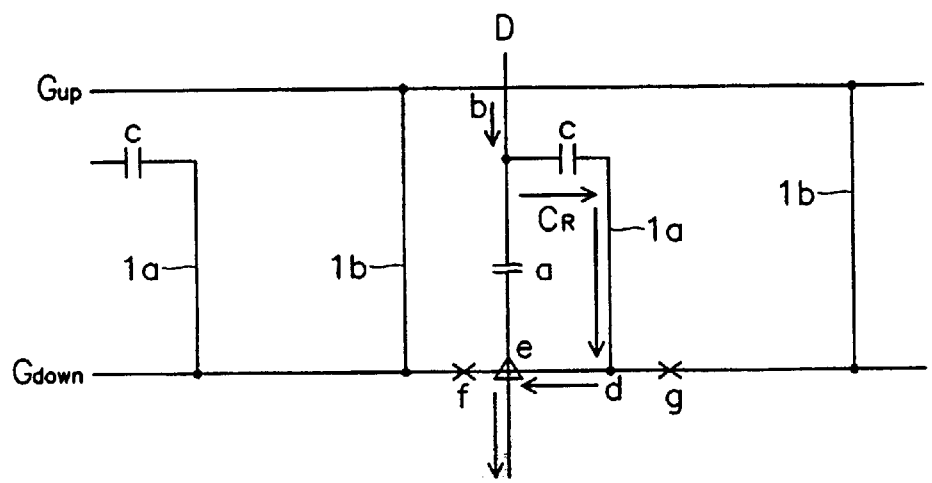
FIG. 13 is a schematic diagram illustrating a method of repairing the data line shorted in the layout shown in FIG. 12A.

As shown in FIG. 13, when the second signal line D placed between a connect point b of the second signal line D and the capacitor $C_R$ and a cross point of the second signal line D and the lower first signal line $G_{down}$ is disconnected (a), both terminals of the capacitor $C_R$ are shorted (c) and then the second signal line D and the lower first signal line $G_{down}$ are shorted (e). Then, the lower first signal line $G_{down}$ located at the outer sides of a connect point d between the lower first signal line $G_{down}$ and the capacitor $C_R$ and the short point e is disconnected respectively (f and g). As a result, the signal flowing along the second signal line D flows again the second signal line D around the disconnect point a via the shorted capacitor $C_R$ and the lower first signal line $G_{down}$.

However, this repairing method can be applied to only the case in which the second signal line D placed between the connect point b of the second signal line D and the capacitor $C_R$ and the cross point of the second signal line D and the lower first signal line $G_{down}$ is disconnected (a).

The case shown in FIG. 12B can be repaired using the same method described above.

On the other hand, a case in which one end of the auxiliary signal line 1a is separated from the lower first signal line $G_{down}$ and the second signal line D and the upper first signal line $G_{up}$ are connected via the capacitor $C_R$ can be repaired using the method similar with the above method.

Next, supposing that both ends of an auxiliary signal line 1a are connected to a second signal line D via capacitors $C_{R1}$ and $C_{R2}$ respectively. In this case, various modifications are possible since the repairing can be performed using only one auxiliary signal line 1a. That is, there are examples as shown in FIGS. 4A to 4D where each layout is obtained by combining the first, third, fourth and fifty types to a basic modified layout in which the auxiliary signal line 1a is separated from the upper and lower first signal lines $G_{up}$ and $G_{down}$.

Besides the above modifications, many modifications may be considered as follows: a layout in which the remaining auxiliary signal line 1b is omitted, a layout in which one of the upper and lower first signal lines $G_{up}$ and $G_{down}$ is omitted, and layouts in which the auxiliary signal line 1a is connected to the upper first signal line $G_{up}$ and/or the lower first signal line $G_{down}$ in the layouts shown in FIGS. 14A to 14D.

Figure 14A:
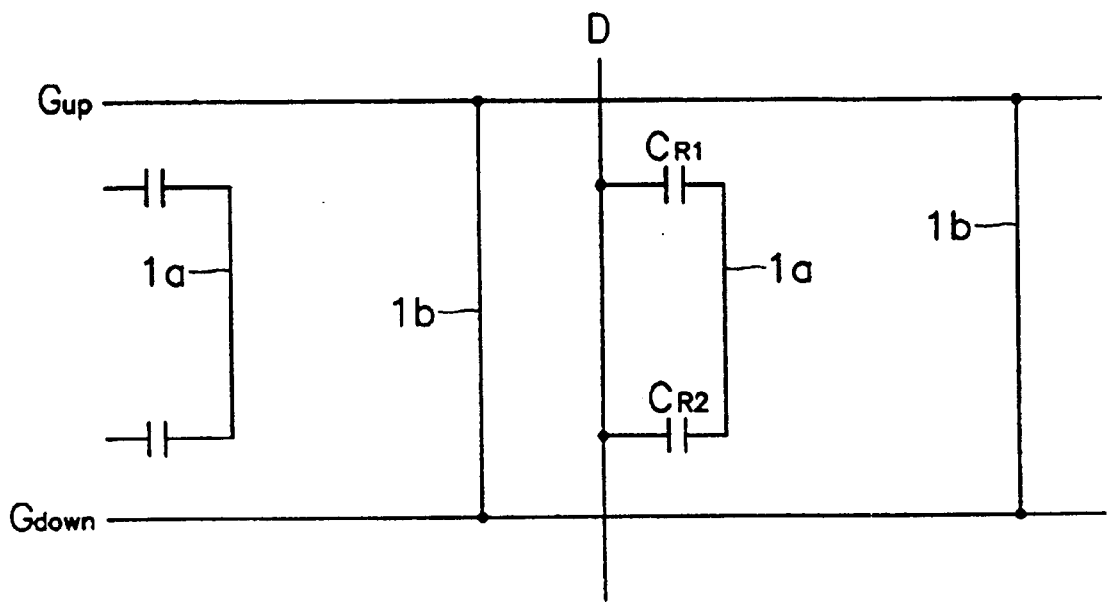
FIGS. 14A to 14D are schematic diagrams showing a fifth embodiment of the repairing means according to the present invention.

The above various modifications may be repaired using different methods, however, a method of repairing only the case shown in FIG. 14A, as an example, will be described.

Figure 15:
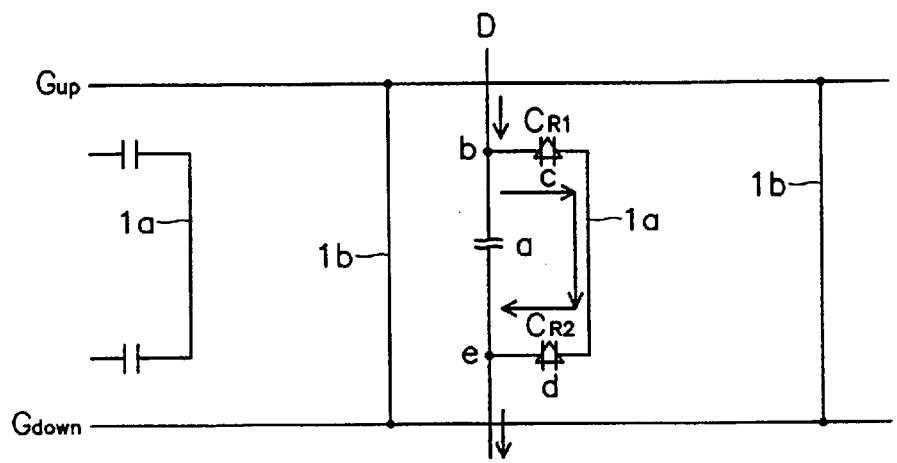
FIG. 15 is a schematic diagram illustrating a method of repairing the data line shorted in the layout shown in FIG. 14A.

As shown in FIG. 15, when the second signal line D placed between a connect point b of the second signal line D and a capacitor $C_{R1}$ and a connect point e of the second signal line D and a capacitor $C_{R2}$ is disconnected (a), both terminals of two capacitors $C_{R1}$ and $C_{R2}$ are shorted (c and d). As a result, the signal flowing along the second signal line D flows again the second signal line D around the disconnect point a via the shorted capacitors $C_{R1}$ and $C_{R2}$.

However, this repairing method can be applied to only the case in which the second signal line D placed between the connect point b of the second signal line D and the capacitor $C_{R1}$ and the connect point e of the second signal line D and the capacitor $C_{R2}$ is disconnected (a).

Figure 14B:
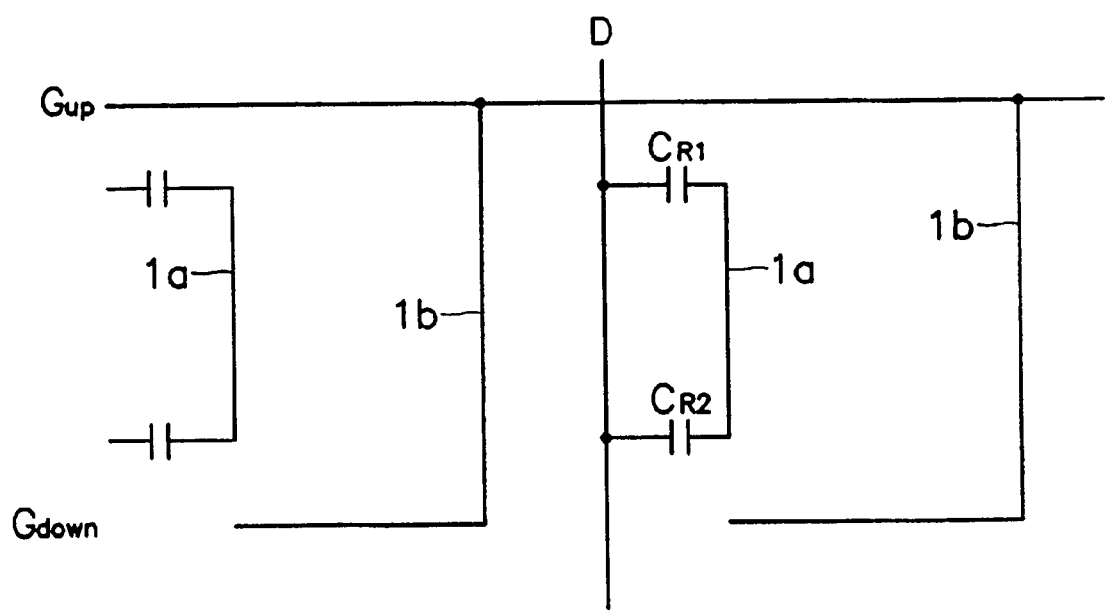
Figure 14C:
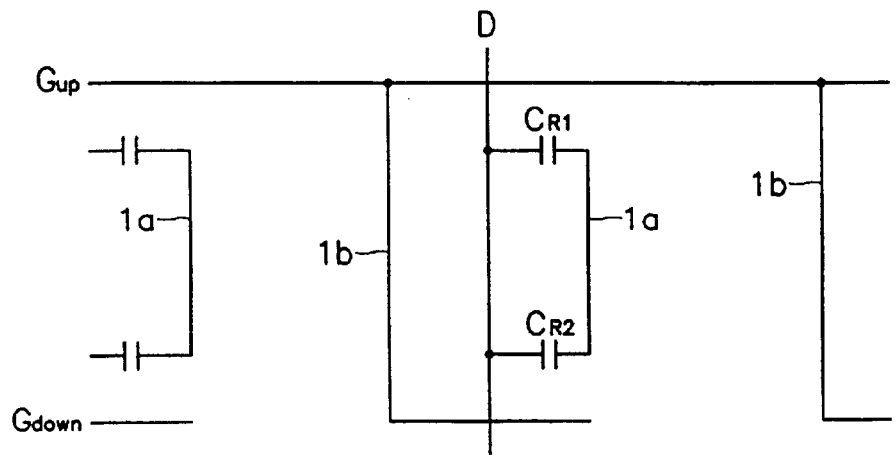
Figure 14D:
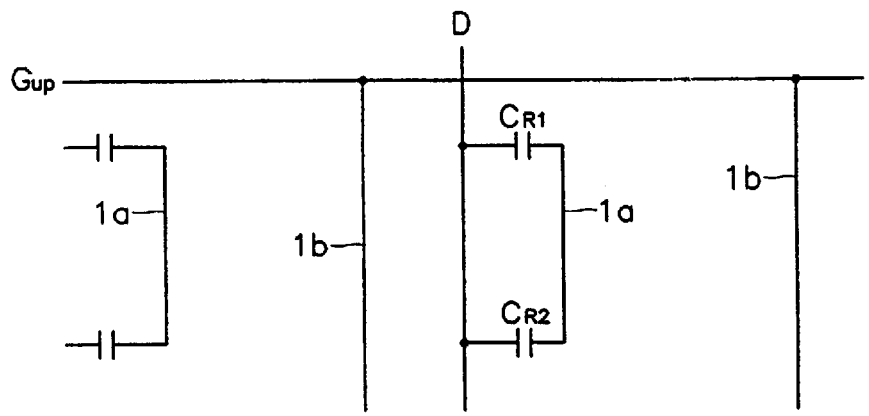

The cases shown in FIGS. 14B to 14D can be repaired using the same method described above.

On the other hand, there may be provided the following embodiments by combining the above described basic layouts, modifying the same or adding another layout to the above layouts, where all disconnection of the second signal line can be repaired. Here, as a layout to be added, it may be considered that a layout in which two points of the second signal line intended to be connected each other are connected via a capacitor.

Hereinafter, the preferred embodiments of a matrix-type display device according to the present invention which adopt the repairing means based on the basic concept of the present invention described above will be described with reference to FIGS. 16 to 27D.

First, the first embodiment of the matrix type display device in accordance with the present invention is based on the basic layouts shown in FIGS. 6A to 6C and 10A to 10C, where the defect of a data line is repaired using a means for connecting the data line to an upper gate line and a means for connecting the upper gate line to a pixel electrode. In order to connect the data line and the upper gate line via an insulator, a branch from the data line may extend to the upper gate line or a branch from the upper gate line may extend to the data line. However, if the branch from the upper gate line extends to the data line, the upper gate line and another gate line opposing the data line may be shorted.

Thus, it is preferable to make a branch from the data line. Also, in order to connect the upper gate line and the pixel electrode via an insulator, the pixel electrode may be formed so as to be overlapped with the upper gate line. For example, after protruding the pixel electrode toward the outside of the closed region enclosed by the gate lines, the protruded portion of the pixel electrode may be overlapped with the upper gate line which does not form the closed region or a branch from the upper gate line may extend to be overlapped with the protruded portion of the pixel electrode. For the latter, a space should be enough to form the protruded portion therein.

Hereinafter, the first embodiment of the matrix-type display device will be described in detail with reference to FIGS. 16, 17A and 17B.

Figure 16:
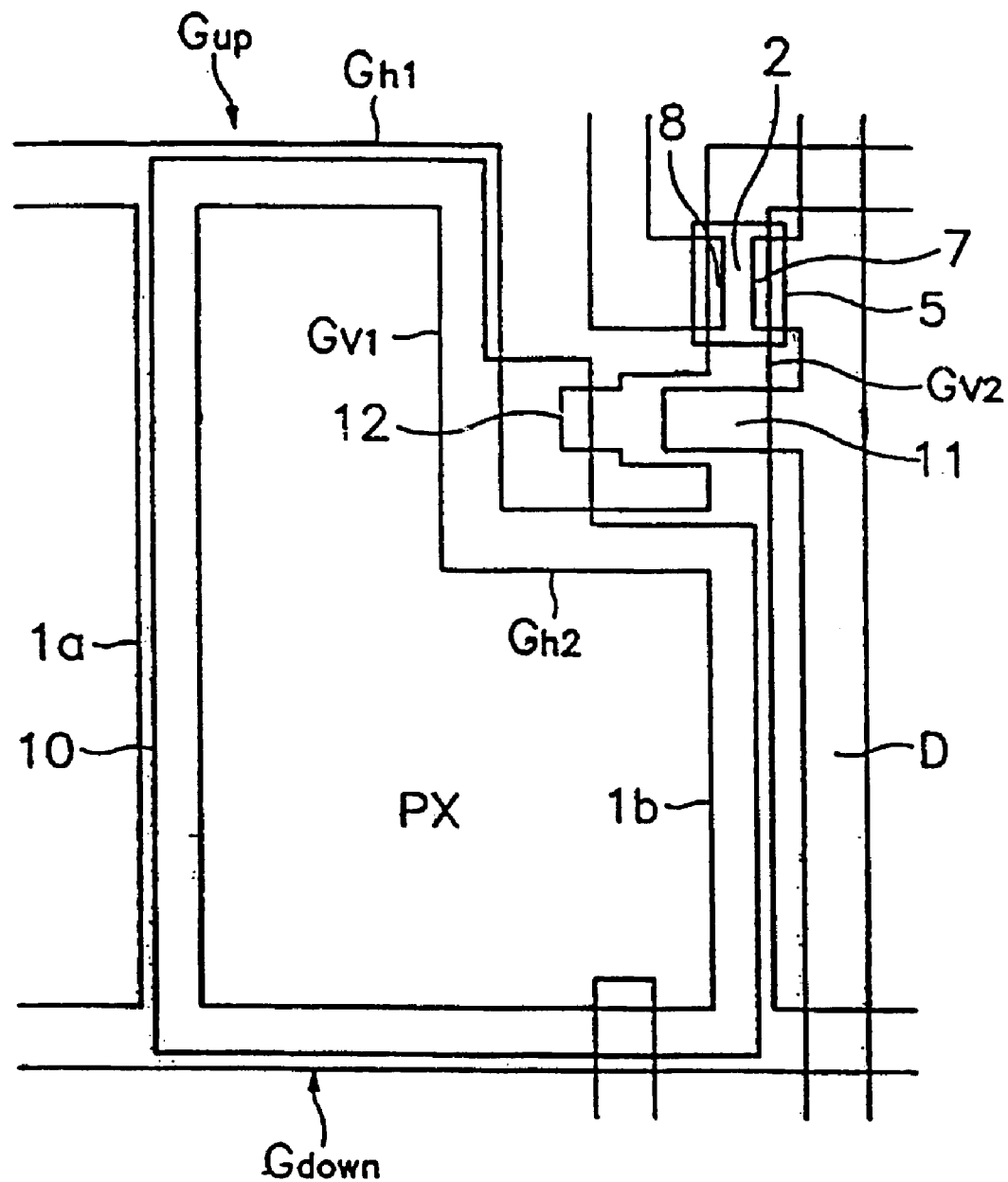
FIG. 16 is an arrangement plan of a first embodiment of a TFT substrate of a LCD according to the present invention.
Figure 17A:
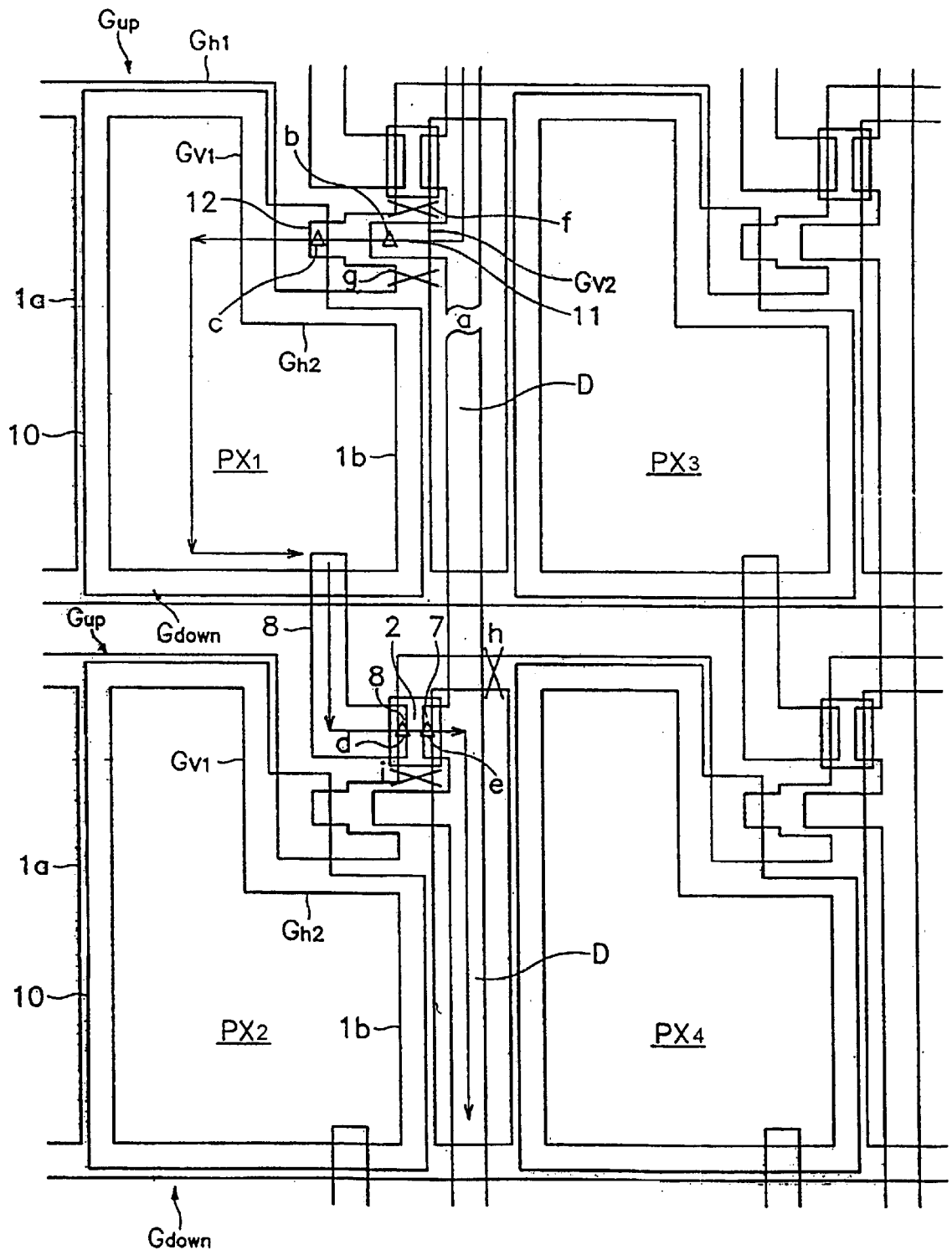
FIGS. 17A and 17B are diagrams illustrating a method of repairing a defect of the LCD shown in FIG. 16.
Figure 17B:
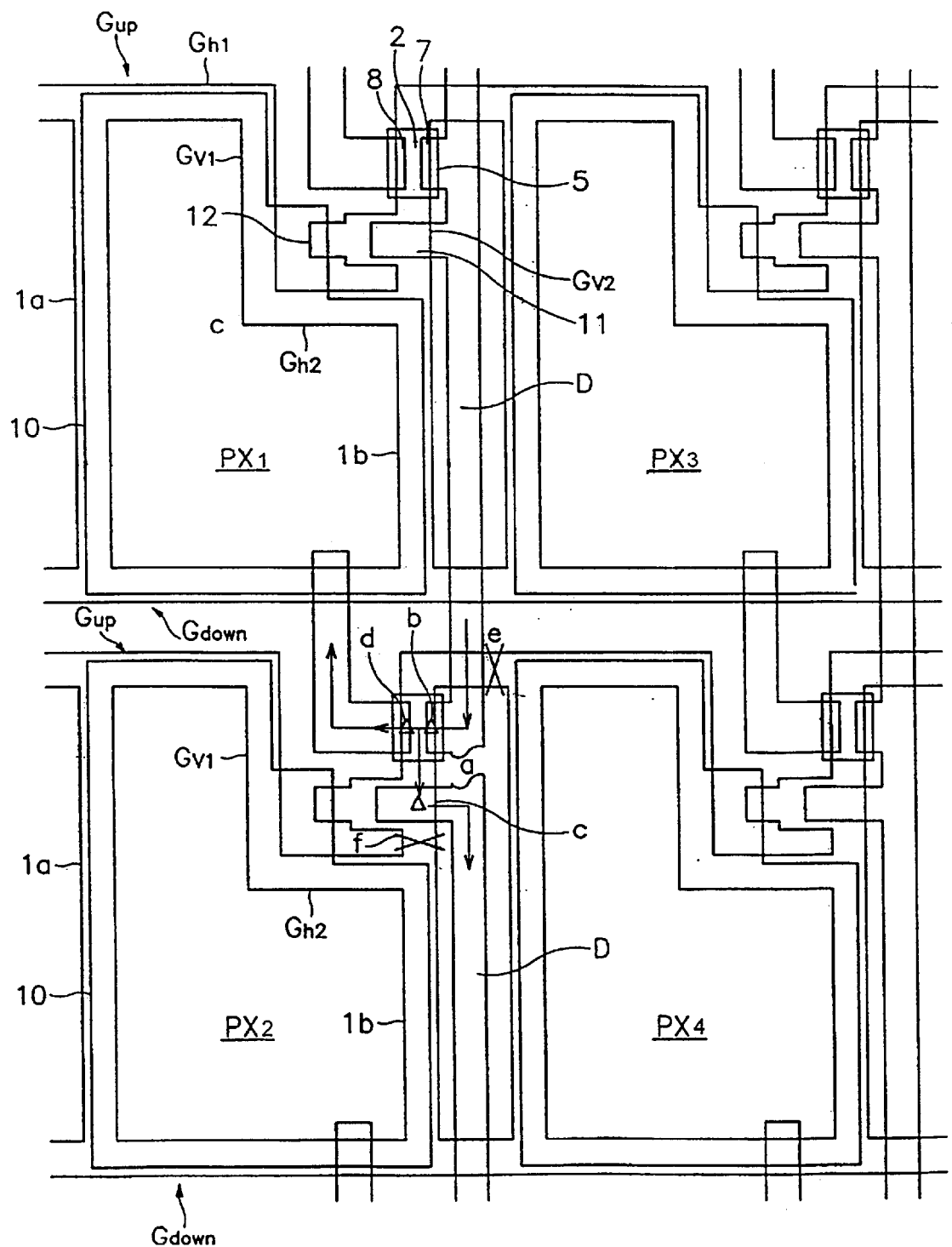

FIG. 16 is an arrangement plan showing a pixel layout of a first embodiment of a TFT substrate of the matrix-type LCD according to the present invention, and FIGS. 17A to 17B are diagrams illustrating a method of repairing the disconnection of a data line in the substrate of the LCD according to the first embodiment.

Figure 4:
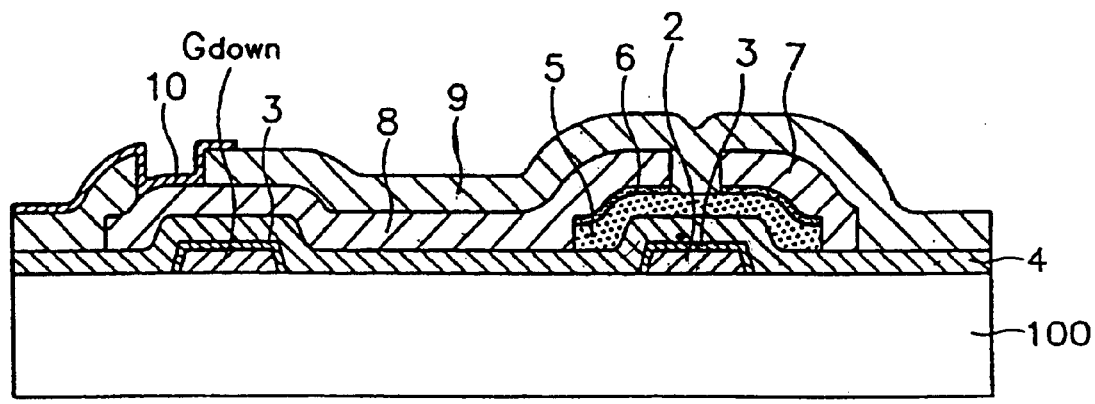
FIG. 4 is a sectional view of a portion cut along a line A—A shown in FIG. 3.
Figure 5:
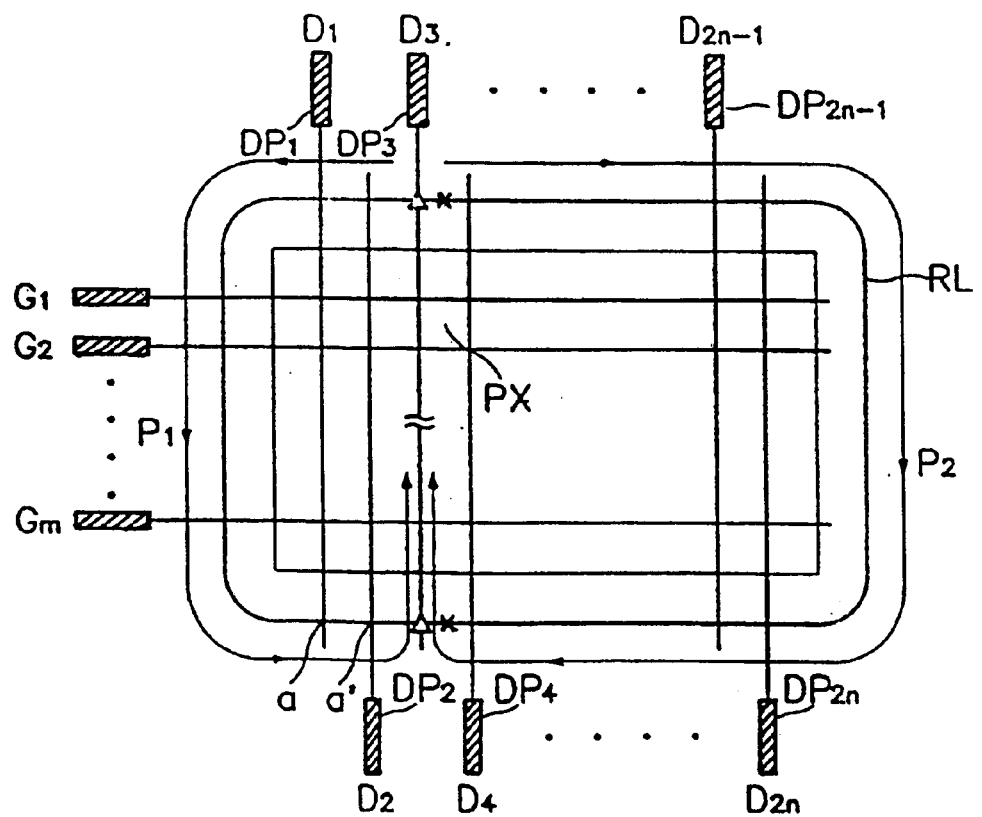
FIG. 5 is a plan view of the wiring of a conventional matrix-type display device having a repair line formed in a closed curve around a screen.

As shown in FIG. 16, in the substrate of the matrix-type LCD according to the first embodiment of the present invention, a first connect portion 11 as a branch of a data line D extends to a second vertical portion $G_{v2}$ of an upper gate line $G_{up}$ while being overlapped with the second vertical portion $G_{v2}$. Also, a portion of a pixel electrode is protruded from a concave portion formed with a first vertical portion $G_{v1}$, a second horizontal portion $G_{h1}$, and the second vertical portion $G_{v2}$ of the upper gate line $G_{up}$ while being free from a closed region formed by the upper and lower gate lines $G_{up}$ and $G_{down}$ and left and right auxiliary gate lines 1a and 1b. A second connect portion 12 as a branch from the second vertical portion $G_{v2}$ extends to the protruded portion of the pixel electrode 10 while being overlapped with the pixel electrode 10. Here, an overlap point between the first connect portion 11 and the second vertical portion $G_{v2}$ is located beneath a gate electrode 2. The gate oxide layer 3 and the gate insulating layer 4 shown in FIG. 4 are interposed between the first connect portion 11 and the second vertical portion $G_{v2}$, and the gate oxide layer 3, the gate insulating layer 4 and the protection layer 9 shown in FIG. 4 are interposed between the second connect portion 12 and the pixel electrode 10. Also, a source electrode 7 and the gate electrode, and the gate electrode 2 and a drain electrode 8 are formed while being overlapped respectively. In addition, the upper gate line $G_{up}$ and the lower gate line $G_{down}$, and the left and right auxiliary gate lines 1a and 1b are overlapped at the pixel electrode 10 and the periphery of the pixel electrode 10 via an insulation layer, thereby forming a ring-type capacitor. The remaining portions are similar with those of the layouts shown in FIGS. 3 and 4.

The inferiority of the data line in the above LCD can be repaired using the following methods one of which is selected in accordance with the locations of the disconnection.

First, as shown in FIG. 17A, supposing that the center of the data line D is disconnected, that is, the data line D placed between a diverging point of the first connect portion 11 in a pixel PX1 and a diverging point of the source electrode 7 of a pixel PX2 which is formed below the pixel PX1 is disconnected (a), so that a data signal cannot be transferred to a portion following the disconnected point. Here, the arrows shown in FIG. 17A represent the flow of the signal.

In this case, the pixel electrode 10 of the pixel PX1 with failure is used as a substitute route for the disconnected data line. A cross point between the first connect portion 11 located above the disconnect point a of the data line D and the second vertical portion $G_{v2}$ is shorted (b) using a laser, so that the data signal flowing along the data line D comes to flow along the second vertical portion $G_{v2}$ via the first connect portion 11 around the disconnect point a.

Subsequently, a cross point between the second connect portion 12 and the pixel electrode 10 is shorted (c) using a laser and then two points of the second vertical portion $G_{v2}$, above and below the second connect portion 12, are disconnected (f and g). As a result, the data signal flown into the second vertical portion $G_{v2}$ comes to flow along the pixel electrode 10 via the second connect portion 12 and flow toward the drain electrode 8 of the pixel PX2 which is below the pixel PX1 while being connected to the pixel electrode 10 of the pixel PX1.

Then, the drain electrode 8 and the gate electrode 2, and the gate electrode 2 and the source electrode 7 of the pixel PX2 are shorted respectively (d and e) and the two points of the upper gate line $G_{up}$ of the pixel PX2, above and below the gate electrode 2, are disconnected (h and i). As a result, the data signal comes to flow along the data line D via the drain electrode 8, the data electrode 2 and the source electrode 7 of the pixel PX2.

That is, the data signal flows via the first connect portion 11, the second vertical portion $G_{v2}$ and the second connect portion 12 and the pixel electrode of the disconnected pixel PX1 and returns to the data line D via the drain electrode 8, the gate electrode 2 and the source electrode 7 of the pixel PX2.

In the above case, a gate signal is applied to pixels PX3 and PX4 each located at the right of the disconnected pixel PX1 and the pixel PX2 via only the upper gate line GUP Also, the gate electrode 2 of the disconnected pixel PX1 receives the gate signal from the upper gate line $G_{up}$ of the pixel PX3. However, the gate signal is not applied to the gate electrode 2 of the pixel PX2.

Here, since the data signal is continuously applied to the pixel PX1 even if the pixel PX1 has a defect such as a disconnection, the defect thereof cannot be shown easily.

Next, as shown in FIG. 17B, supposing that the data line D placed between a diverging point of the source electrode 7 and a diverging point of the first connect portion 11 in a pixel PX2 is disconnected (a), so that a data signal cannot be transferred to a portion following the diverging point of the first connect portion 11. Here, the arrows shown in FIG. 17B represent the flow of the signal.

In this case, the defect can be repaired using only a TFT, the second vertical portion $G_{v2}$ and the first connect portion 11 compared with the above case described with reference to FIG. 17A. First, a cross point between the source electrode 7 and the gate electrode 2, located above the disconnect point a of the data line D, is shorted (b) using a laser, so that the data signal flowing along the data line D comes to flow the gate electrode 2 along the source electrode 7 around the disconnect point a. Also, the upper gate line $G_{up}$ located above the gate electrode 2 is disconnected (e) to prevent the flowing of the data signal along the gate line of a right pixel PX4.

Subsequently, a cross point between the second vertical portion $G_{v2}$ and the first connect portion 11 is shorted (c) and then the second vertical portion $G_{v2}$ of the upper gate line $G_{up}$, below the short point c, is disconnected, so that the data signal comes to flow along the data line D via the second vertical portion $G_{v2}$. As a result, the data signal flown along the data line D can flow again along the data line D via the source electrode 7, the gate electrode 2, the second vertical portion $G_{v2}$ and the first connect portion 1I1 of the disconnected pixel PX2.

Here, since a signal is not applied to a pixel PX1 located above the disconnected pixel PX2, it is regarded that the pixel PX1 has a defect. However, when the gate electrode 2 and the drain electrode 8 of the disconnected pixel PX2 are shorted, the data signal is continuously applied to the pixel electrode 10 of the pixel PX1, so that the defect thereof cannot be shown easily.

The second embodiment of the matrix-type display device in accordance with the present invention is based on the basic layouts shown in FIGS. 8 and 10A to 10C, where the defect of a data line is repaired using a means for connecting the data line to an auxiliary gate line and a means for connecting the date line to a pixel electrode. In order to connect the data line and the auxiliary gate line via an insulator, a branch from the data line may extend to the auxiliary gate line or a branch from the auxiliary gate line may extend to the data line. Here, this embodiment adopts the former case. Also, in order to connect the data line and the pixel electrode via an insulator, after protruding a branch from the pixel electrode toward the outside of the closed region enclosed by the gate lines, the protruded branch may be overlapped with the data line. Otherwise, a branch from the data line may be made to be overlapped with the pixel electrode. However, since resistance of the pixel electrode is greater than that of the data line, it is preferable to make a branch from the data line. However, in order that the branch of the data line overlaps the pixel electrode, it is inevitable that the branch overlaps spontaneously the gate lined defining the pixel electrode. Thus, it is preferable that the data line, the auxiliary gate line and the pixel electrode overlap each other through only one branch of the data line.

Hereinafter, the second embodiment of the matrix-type display device will be described in detail with reference to FIGS. 18, 19A to 19C.

Figure 18:
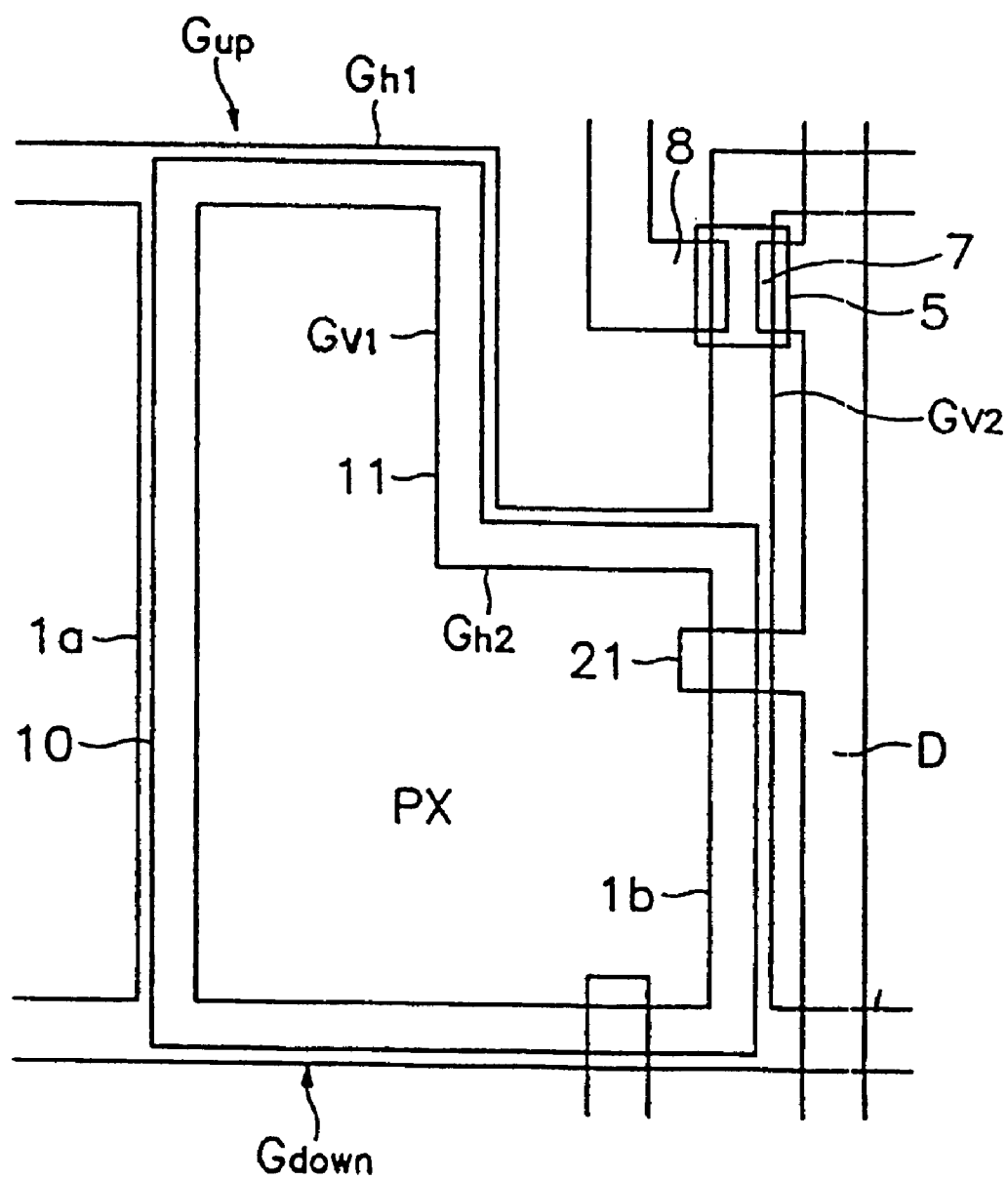
FIG. 18 is an arrangement plan of a second embodiment of the TFT substrate of the LCD according to the present invention.
Figure 19A:
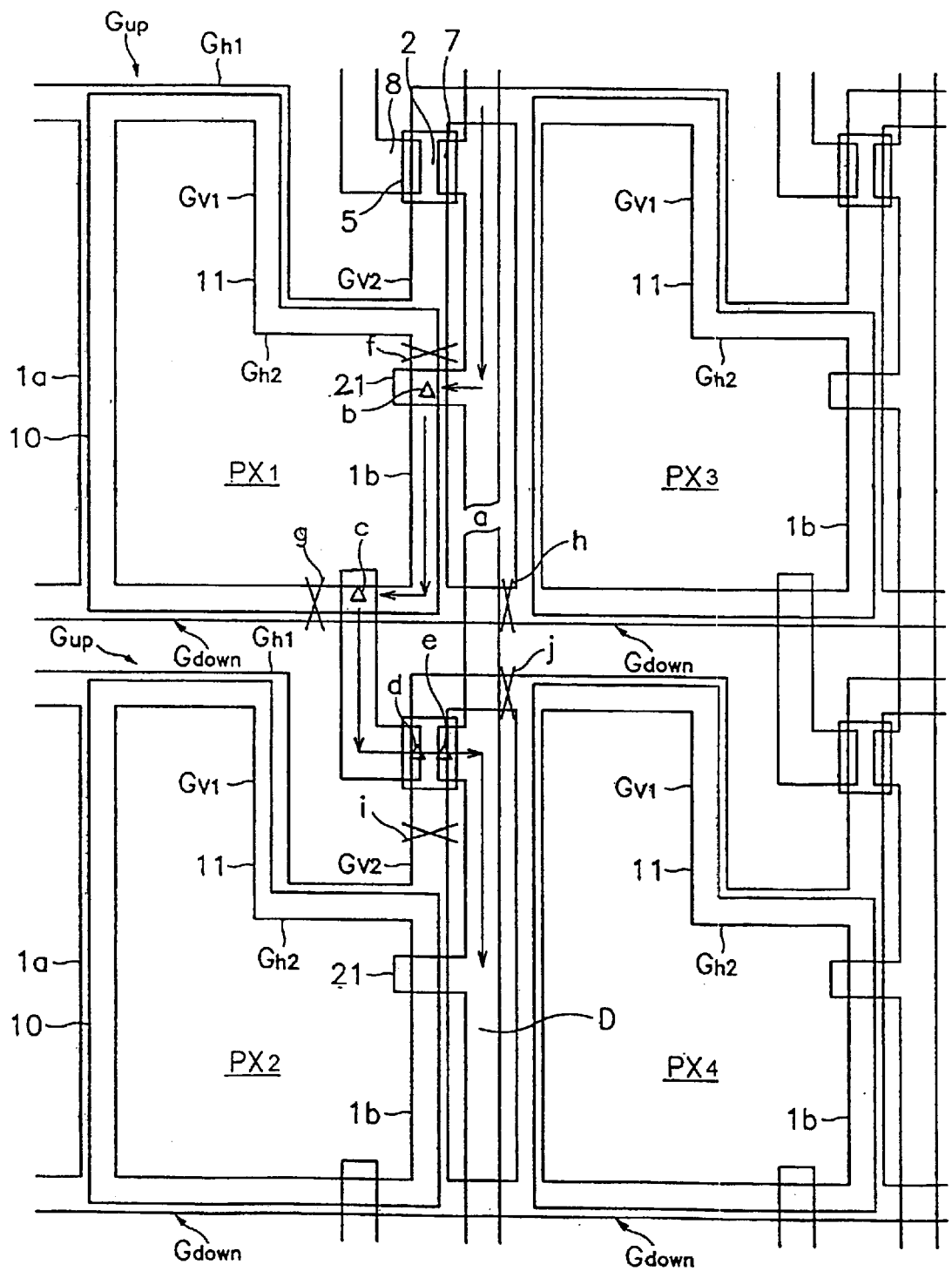
FIGS. 19A to 19C are diagrams illustrating a method of repairing a defect of the LCD shown in FIG. 18.
Figure 19B:
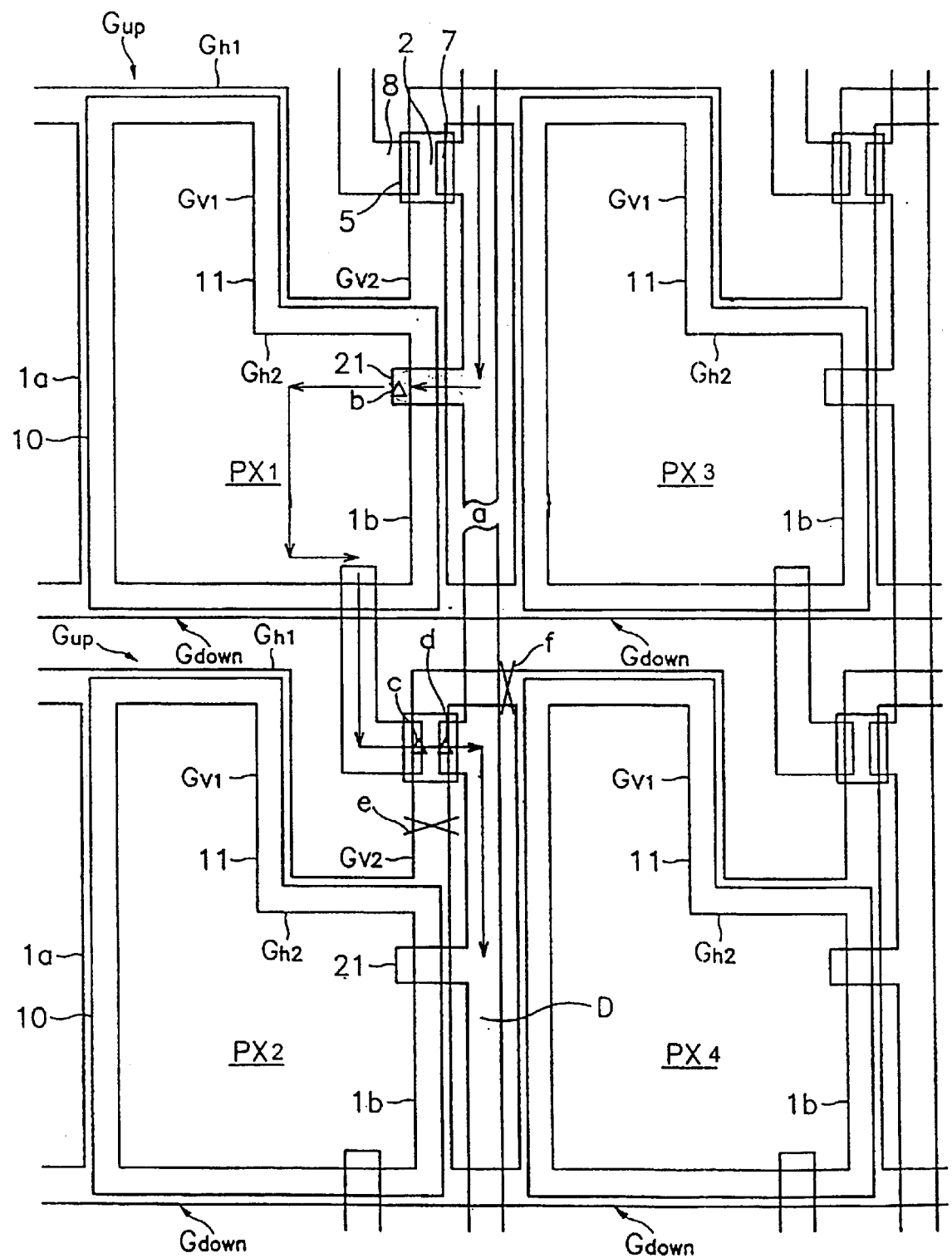
Figure 19C:
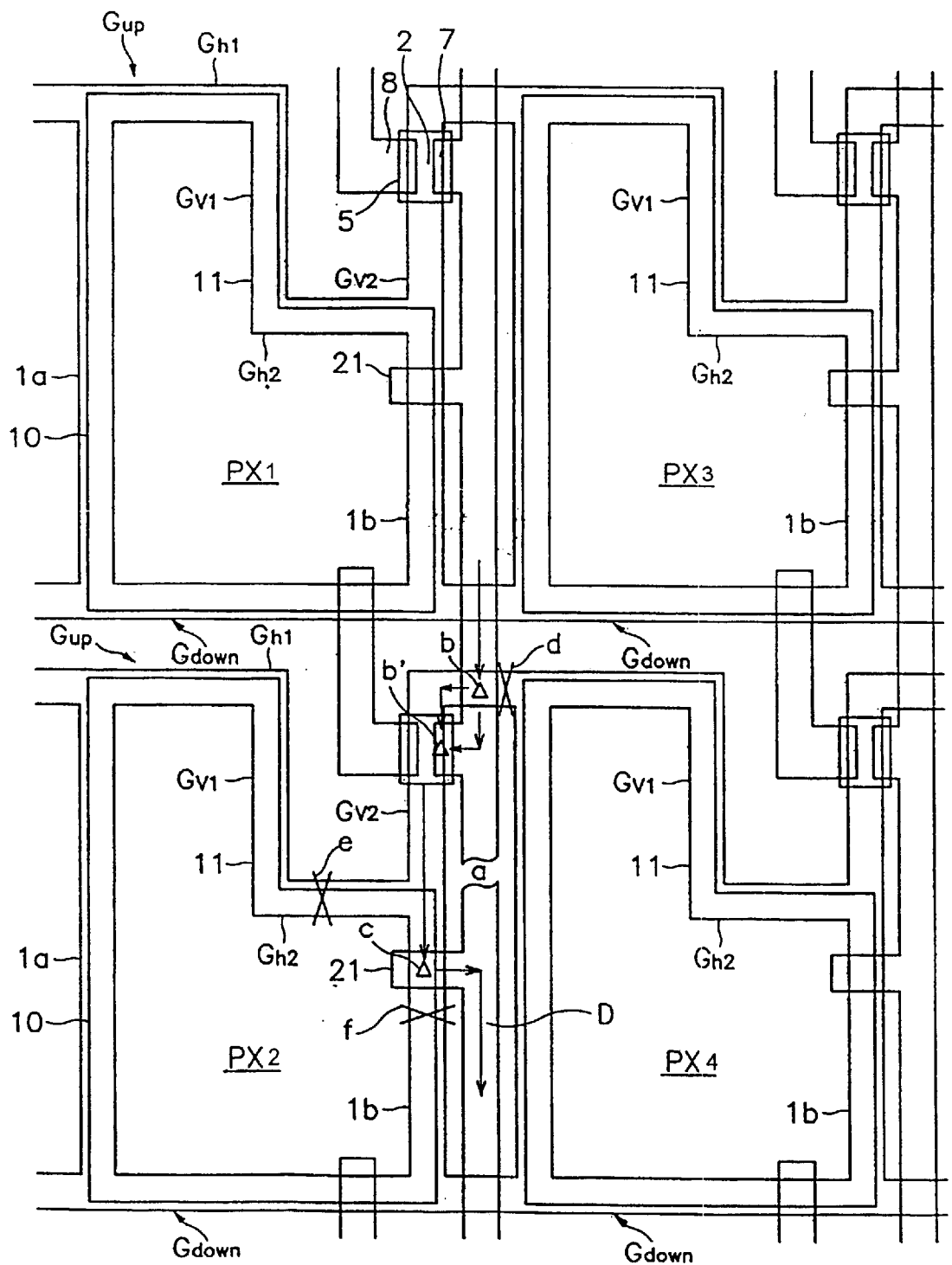

FIG. 18 is an arrangement plan of a pixel layout of a second embodiment of the TFT substrate of the matrix-type LCD according to the present invention, and FIGS. 19A to 19C are diagrams illustrating a method of repairing the disconnection of the data line in the LCD according to the second preferred embodiment of the present invention.

As shown in FIG. 18, in the substrate of the matrix-type LCD according to the second embodiment of the present invention, a connect portion 21 as a branch of a data line D extends to a pixel electrode 10 while being overlapped with a right auxiliary gate line 1b and the pixel electrode 10. Here, in order to form the overlapped portion between The connect portion 21 and the pixel electrode 10, the connect portion 21 should sufficiently extend toward the pixel electrode 10. Also, since the pixel electrode 10 is overlapped with the right auxiliary gate line 1b, a cross point between the connect portion 21 and the right auxiliary gate line 1b overlaps the pixel electrode 10. Here, the gate oxide layer 3 and the gate insulating layer 4 of FIG, 4 are interposed between the connect portion 21 and the right auxiliary gate line 1b, and the protection layer 9 is interposed between the connect portion 21 and the pixel electrode 10. In addition, the upper gate line $G_{up}$ and the lower gate line $G_{down}$, and the left and right auxiliary gate lines 1a and 1b are overlapped at the pixel electrode 10 and the periphery of the pixel electrode 10 via an insulation layers thereby forming a ring-type capacitor. The remaining portions are similar to those of the layouts shown in FIGS. 3 and 4.

The inferiority of the data line in the above matrix-type LCD can be repaired using the following methods one of which is selected in accordance with the locations of the disconnection.

First, as shown in FIGS. 19A and 19B, supposing that the data line D placed between a diverging point of the connect portion 21 in a pixel PX1 and a diverging point of the source electrode 7 of a pixel PX2 which is formed below the pixel PX1 is disconnected (a), so that a data signal cannot be transferred to a portion following the disconnected point. Here, the arrows shown in FIGS. 19A and 19B represent the flow of the signal.

In this case, the disconnection may be repaired using the right auxiliary gate line 1b of the pixel PX1 or the pixel electrode 10. First, a method of repairing the disconnection using the right auxiliary gate line 1b of the pixel PX1 will be described with reference to FIG. 19A.

A cross point between the connect portion 21 located above the disconnect point a of the data line D and the pixel electrode 10 and the right auxiliary gate line 1b is shorted (b) using a laser, and then the right auxiliary gate line 1b located above the short point b is disconnected (f). Here, the pixel electrode 10, the right auxiliary gate line 1b and the connect portion 21 are simultaneously shorted at the short point b, so that a defect may occur in the gate line and the data line D. However, in the case of employing Al or an Al composite as the material of the gate line, since the right auxiliary gate line is oxidized at the short point b by a battery effect between the right auxiliary gate line 1b and the pixel electrode 10, the right auxiliary gate line 1b and the pixel electrode 10 are spontaneously insulated from each other. In addition, the contact resistance of indium thin oxide (ITO) composing the pixel electrode 10 is greater than those of the right auxiliary gate line 1b and the data line D, a data signal is not transferred to the pixel electrode 10. Also, even if the pixel PX1 has the defects, it is difficult to detect the defects since the data signal is continuously applied.

Thus, the data signal that flows along the data line D comes to flow along the right auxiliary gate line 1b of the pixel PX1 via the connect portion 21, around the disconnect point a. Then, the data signal comes to flow along a lower gate line $G_{down}$ which is connected to the right auxiliary gate line 1b.

Subsequently, a cross point among the lower gate line $G_{down}$ and the pixel electrode 10 of the pixel PX1 and the drain electrode 8 of the pixel PX2 is shorted (c) using a laser and then the lower gate line $G_{down}$ located at the left of the short point c and the lower gate line $G_{down}$ located at the right of a cross point between the lower gate line $G_{down}$ and the right auxiliary gate line 1b are disconnected (g and h). Here, there is a possibility that a defect which is similar with that at the short point b occurs. However, the defect does not matter due to the above described reason. Thus, the signal flown along the lower gate line $G_{down}$ of the pixel PX1 comes to flow along the drain electrode 8 of the pixel PX2.

Then, the drain electrode 8 and the gate electrode 2, and the gate electrode 2 and the source electrode 7 of the pixel PX2 are shorted respectively (d and e) and the two points of the upper gate line $G_{up}$ of the pixel PX2, below and above the gate electrode 2, are disconnected (i and j). As a result, the data signal comes to flow along the data line D again.

That is, the data signal flows via the connect portion 21, the right auxiliary gate line 1b and the lower gate line $G_{down}$ of the pixel PX1 and returns to the data line D via the drain electrode 8, the gate electrode 2 and the source electrode 7 of the pixel PX2.

In the above case, a gate signal is applied to a pixel PX3 which is located at the right of the disconnected pixel PX1 via only the upper gate line $G_{up}$ and a gate signal is applied to a pixel PX4 which is located at the right of the pixel PX2 located below the disconnected pixel PX1 via only the down gate signal $G_{down}$. Here, the gate signal is not applied to the gate electrode 2 of the pixel PX2.

Next, referring to FIG. 19B, a method of repairing the defect which is the same as that of FIG. 19A using the pixel electrode 10 will be described. That is, in this case, the data line D placed between a diverging point of the connect portion 21 in a pixel PX1 and a diverging point of the source electrode 7 of a pixel PX2 which is formed below the pixel PX1 is disconnected (a), so that a data signal cannot be transferred to a portion following the disconnected point. Here, the arrows shown in FIG. 19B represent the flow of the signal.

When a cross point between the connect portion 21 located above the disconnect point a of the data line D and the pixel electrode 10 is shorted (b) using a laser, the data signal flowing along the data line D flows toward the pixel electrode 10 of the pixel PX1 via the connect portion 21, around the disconnect point a and continuously flows along the drain electrode 8 of the pixel PX2 which is connected to the pixel electrode 10.

Then, the drain electrode 8 and the gate electrode 2, and the gate electrode 2 and the source electrode 7 of the pixel PX2 are shorted respectively (c and d) and the two points of the upper gate line $G_{up}$ of the pixel PX2, above and below the gate electrode 2, are disconnected (e and j). As a result, the data signal comes to flow along the data line D again.

That is, the data signal flows via the connect portion 21 and the pixel electrode 10 of the pixel PX1 and returns to the data line D via the drain electrode 8, the gate electrode 2 and the source electrode 7 of the pixel PX2.

In the above case, a gate signal is applied to a pixel PX4 which is located at the right of the pixel PX2 via only the lower gate line $G_{down}$, and a gate signal is not applied to the gate electrode 2 of the pixel 2.

Here, the pixel PX1 has the defect. However, it is difficult to detect the defect since the data signal is continuously applied to the pixel electrode 10 of the pixel PX1.

Then, as shown in FIG. 19C, supposing that the data line D placed between a diverging point of the source electrode 7 of the pixel PX2 and a diverging point of the connect portion 21 of the pixel PX2 is disconnected (a), so that a data signal cannot be transferred to a portion following the disconnected point. Here, the arrows shown in FIG. 19C represent the flow of the signal.

A cross point between the data line D located above the disconnect point a of the data line D and the upper gate line $G_{up}$ is shorted (b) or the source electrode 7 and the gate electrode 2 are shorted (b'), and then the upper gate line $G_{up}$ located at the right of the short point b and the second horizontal portion $G_{h2}$ are disconnected (d and e). As a result, the data signal flows toward the right auxiliary gate line 1b from the second vertical portion $G_{v2}$.

Subsequently, a cross point between the connect portion 21 and the pixel electrode 10 is shorted (c) using a laser and then the right auxiliary gate line 1b located below the short point c is disconnected (f). As a result, the gate signal flown along the right auxiliary gate line 1b returns to the data line D. Here, like the above case, the pixel electrode 10, the lower gate line $G_{down}$ and the drain electrode 8 are simultaneously shorted at the short point c, so that a defect may occur in the gate line and the data line. However, the defect does not matter due to the above described reason. Thus, the data signal flows via the gate electrode 2, the second vertical portion $G_{v2}$ and the right auxiliary gate line 1b and returns to the data line D via the connect portion 21.

In the above case, a gate signal is applied to a pixel PX4 which is located at the right of the disconnected pixel PX2 via only the lower gate line $G_{down}$, and a gate signal is not applied to the gate electrode 2 of the disconnected pixel PX2.

Here, since the signal is not applied to the pixel PX1 located above the disconnected pixel PX2, the pixel PX1 is regarded as a pixel having a defect. However, when the gate electrode 2 and the drain electrode 8 of the disconnected pixel PX2 are shorted, the data signal is continuously applied to the pixel electrode 10 of the pixel PX1. Thus, the defect of the pixel PX1 is not shown easily.

The third embodiment of the matrix-type display device in accordance with the present invention is based on the basic layout shown in FIG. 8, where the defect of a data line is repaired using a means for connecting an auxiliary gate line to the data line and a means for connecting a drain electrode to the lower gate line. In order to connect the data line and the auxiliary gate line via an insulator, a branch from the data line may extend to the auxiliary gate line or a branch from the auxiliary gate line may extend to the data line. Here, this embodiment adopts the later case. Also, since the drain electrode is overlapped with the lower gate line, it is unnecessary to adopt another layout for overlapping therebetween. In addition, the upper gate line and the lower gate line, and the left and right auxiliary gate lines are overlapped at the pixel electrode and the periphery of the pixel electrode via an insulation layer, thereby forming a ring-type capacitor.

Hereinafter, the third embodiment of the present invention will be described in detail with reference to FIGS. 20, 21A and 21B.

Figure 20:
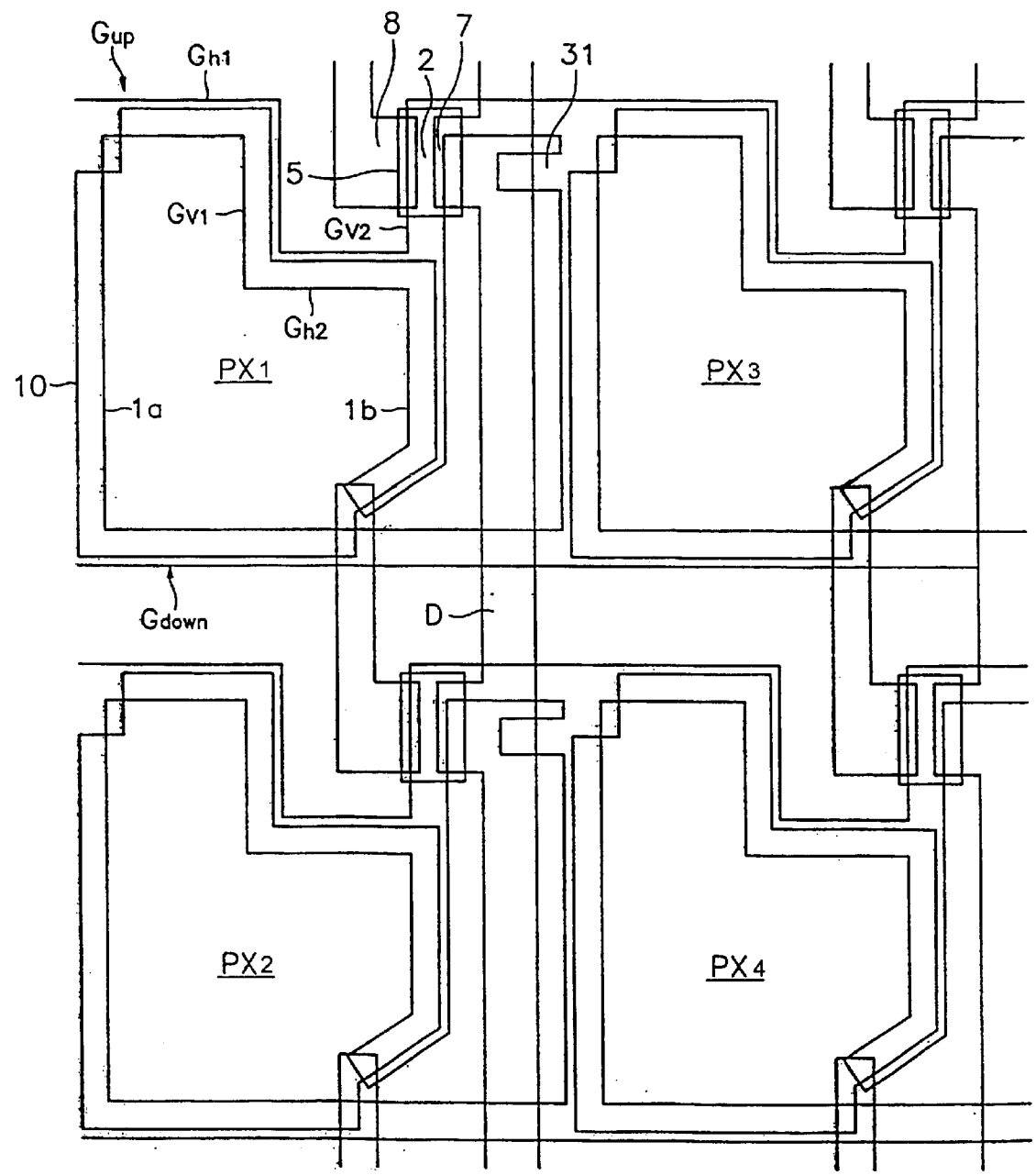
FIG. 20 is an arrangement plan of a third embodiment of the TFT substrate of the LCD according to the present invention.
Figure 21A:
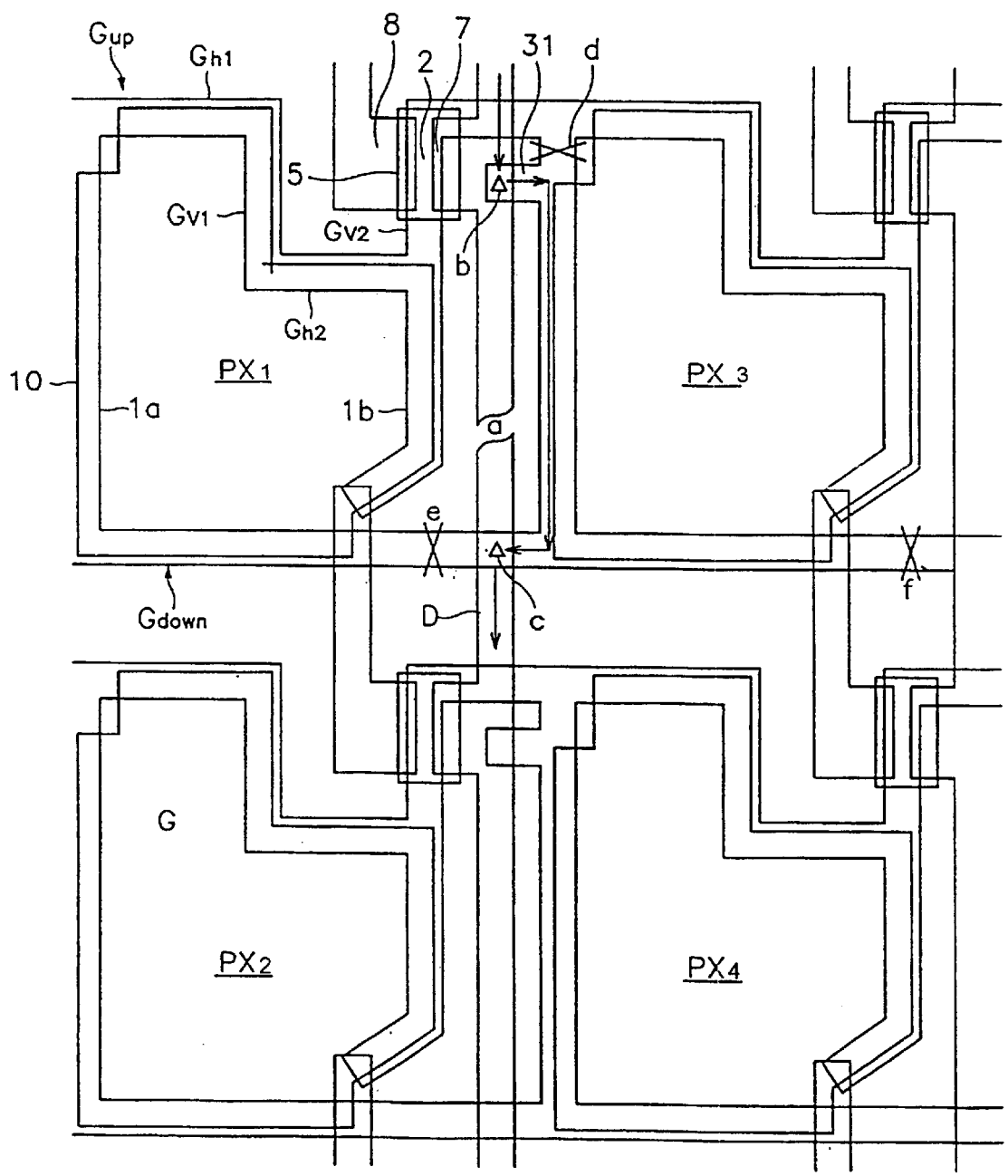
FIGS. 21A and 21B are diagrams illustrating a method of repairing a defect of the LCD shown in FIG. 20.
Figure 21B:
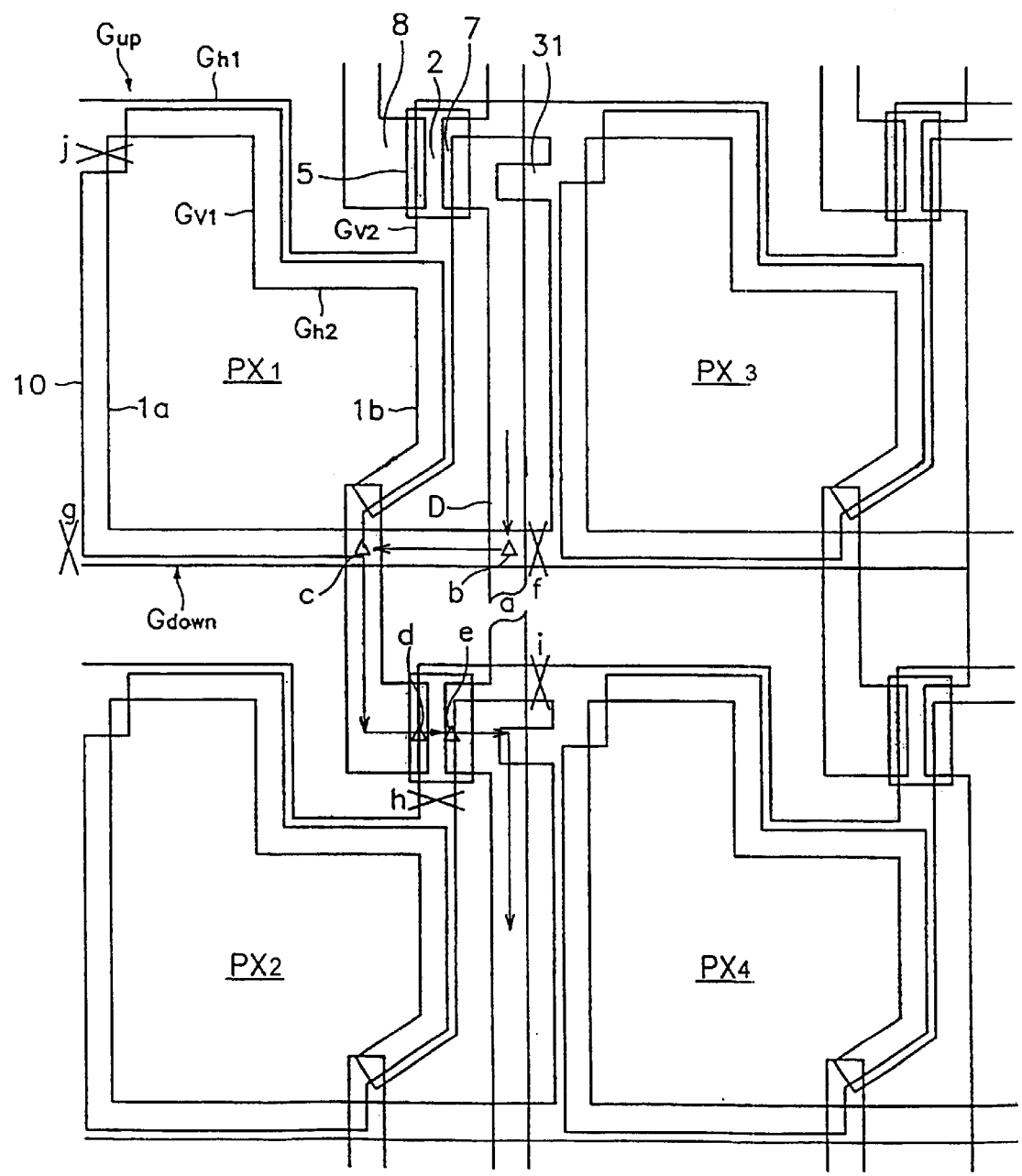

FIG. 20 is an arrangement plan of a pixel layout of a third embodiment of the TFT substrate of the matrix-type LCD according to the present invention, and FIGS. 21A and 21B are diagrams illustrating a method of repairing the disconnection of the data line in the LCD according to the third preferred embodiment of the present invention.

As shown in FIG. 20, in the substrate of the matrix-type LCD according to the third embodiment of the present invention, a connect portion 31 as a branch of a left auxiliary gate line 1a of a pixel PX3 extends toward the data line located at the left of the left auxiliary gate line 1a to be overlapped with a diverging point of the source electrode 7. Here, in order to repair all disconnection of the data line D, it is important that the connect portion 31 should overlap the source electrode 7 at the diverging point of the source electrode 7 or at above the diverging point. Also, the pixel electrode 10 overlaps the left auxiliary gate line 1a. However, a portion of the pixel electrode, being from the upper gate line $G_{up}$ to the diverging point of the connect portion 31, is not overlapped with the left auxiliary gate line 1a, so that the pixel electrode 10 is not damaged with respect to the disconnection. On the other hand, the data line D and the connect portion 31 have the gate oxide layer 3 and the gate insulating layer 4 of FIG. 4 therebetween. Also, a right auxiliary gate line 1b is not connected to a lower gate line $G_{down}$ and is bent toward a connect point between the drain electrode 8 and the pixel electrode 10 while being overlapped with the drain electrode 8. The remaining portions are similar with those of the layouts shown in FIGS. 3 and 4.

The inferiority of the data line in the above matrix-type LCD can be repaired using the following methods one of which is selected in accordance with the locations of the disconnection.

First, as shown in FIG. 21 A, supposing that the data line D placed between a cross point of the data line D and the connect portion 31 or the diverging point of the source electrode 7 and a cross point of the data line D and the lower gate line $G_{down}$ is disconnected (a), so that a data signal cannot be transferred to a portion following the disconnected point. Here, the arrows shown in FIG. 21A represent the flow of the signal.

The cross point between the data line D located above the disconnect point a of the data line D, and the connect portion 31 is shorted (b) using a laser, so that a data signal flows into the left auxiliary gate line 1a of the right pixel PX3. Then, a point located above a diverging point of the connect portion 31 from the left auxiliary gate line 1a is disconnected (d). Therefore, the data signal comes to flow into the lower gate line $G_{down}$ along the left auxiliary gate line 1a.

Subsequently, the cross point between the lower gate line $G_{down}$ and the disconnected data line D of the pixel PX1 is shorted (c) using a laser and then the lower gate line $G_{down}$ located at the left of the short point c and the lower gate line $G_{down}$ located at the right of the connect point between the right auxiliary gate line 1b and the lower gate line $G_{down}$ are disconnected (e and j). Thus, the data signal comes to flow into the data line D via the short point c.

As a result, the data signal flows along the data line D via the connect portion 31, the right auxiliary gate line 1a and the lower gate line $G_{down}$ of the right pixel PX3.

Next, as shown in FIG. 21B, supposing that the data line D placed between a cross point of the data line D and the lower gate line $G_{down}$ and a diverging point of the source electrode 7 of a pixel PX2 is disconnected (a), so that a data signal cannot be transferred to a portion following the disconnected point. Here, the arrows shown in FIG. 21B represent the flow of the signal.

The cross point between the data line D located above the disconnect point a of the data line D and the lower gate line Gdown is shorted (b) using a laser and then the lower gate line $G_{down}$ located at the right of the short point b is disconnected (f), so that a data signal flown into the data line D comes to flow along the lower gate line $G_{down}$ via the short point b in left direction, around the disconnect point a.

Subsequently, the cross point between the drain electrode 8 of the pixel PX2, connected to the pixel electrode 10 of the pixel PX1, and the lower gate line $G_{down}$ is shorted (c) and then the lower gate line $G_{down}$ and the auxiliary gate line 1a which are located at the left of the short point c are disconnected (g and j). Here, the pixel electrode 10, the lower gate line $G_{down}$ and the drain electrode 8 are simultaneously shorted at the short point c, so that the gate line and the data line may be defected. However, the defect does not matter due to the same reason described in the above second embodiment.

Then, the drain electrode 8 and the gate electrode 2, and the gate electrode 2 and the source electrode 7 of the pixel PX2 are shorted respectively (d and e) and two points of the upper gate line $G_{up}$ of the pixel PX2, located at both sides of a transistor thereof, are disconnected (h and i). As a result, the data signal comes to flow along the data line D again from the drain electrode 8 via the gate electrode 2 and the source electrode 7.

That is, the data signal comes to flow the data line D via the lower gate line $G_{down}$ of the pixel PX1, and the drain electrode 8, the gate electrode 2 and the source electrode 7 of the pixel PX2.

In the above case, a gate signal is applied to a pixel PX4 which is located at the right of the pixel PX2 via only the lower gate line $G_{down}$. However, the gate signal is not applied to the gate electrode 2 of the pixel PX2.

The fourth embodiment of the matrix-type display device in accordance with the present invention is based on the basic layout shown in FIG. 14, where the defect of a data line is repaired using upper and lower connect means for connecting upper and lower ends of an auxiliary gate line which is separated from the upper and lower gate lines via insulator, and a connect means for connecting each left auxiliary gate line of two upper and lower pixels which are in the same column. As described above, in order to connect the data line and both ends of the auxiliary gate line, a branch from the data line may extend to the auxiliary gate line or both ends of the auxiliary gate line may extend to the data line. Here, this embodiment adopts the later case. Also, in order to achieve means for connecting each auxiliary gate line of upper and lower pixels being adjacent each other, there is prepared a pattern of the connect means formed of material composing the data line or the pixel electrode. In addition, the upper gate line and the lower gate line, and the left and right auxiliary gate lines are overlapped at the pixel electrode and the periphery of the pixel electrode via an insulation layer, thereby forming a ring-type capacitor.

Hereinafter, the fourth embodiment will be described in detail with reference to FIGS. 22, 23A and 23B.

Figure 22:
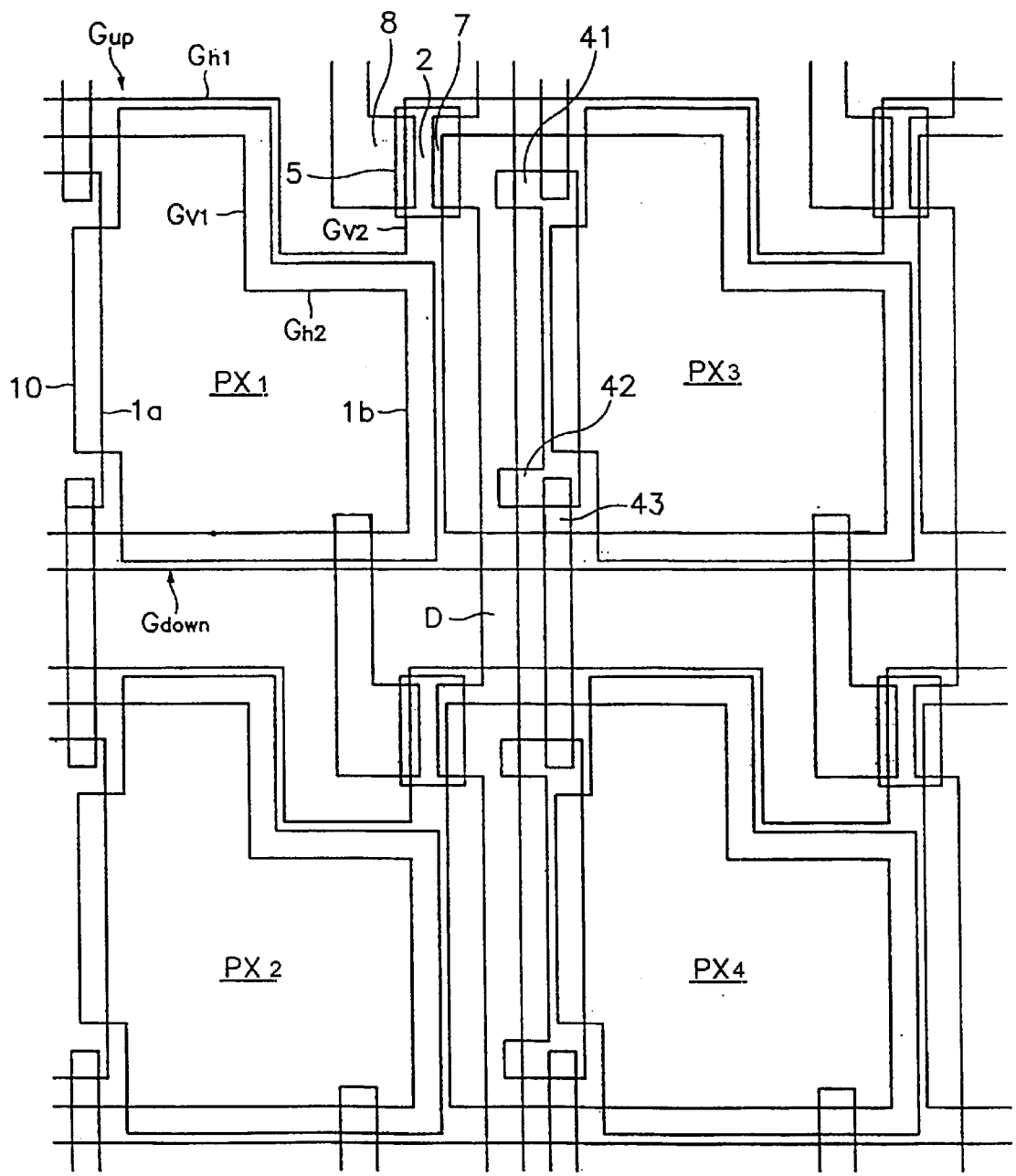
FIG. 22 is an arrangement plan of a fourth embodiment of the TFT substrate of the LCD according to the present invention.
Figure 23A:
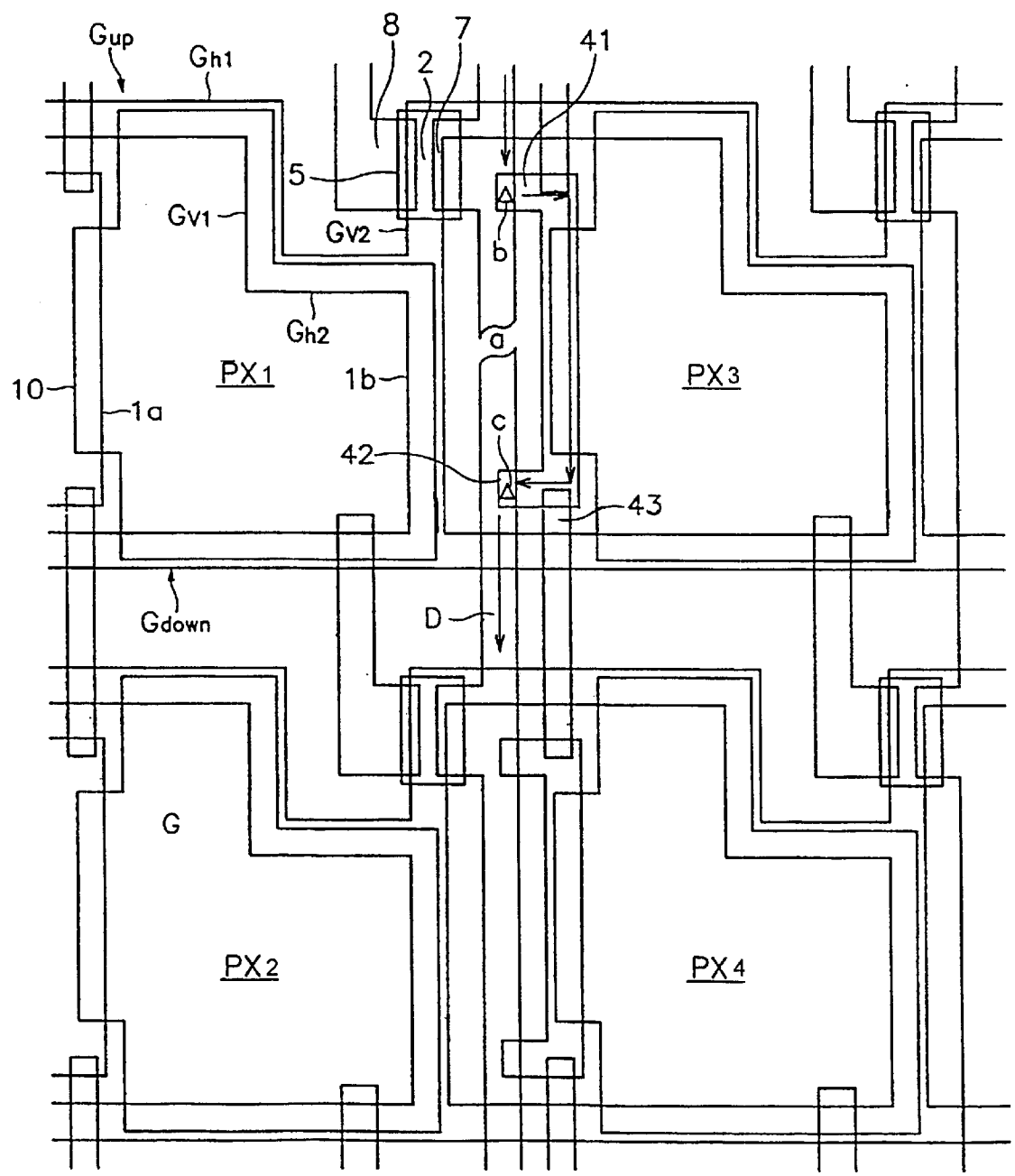
FIGS. 23A and 23B are diagrams illustrating a method of repairing a defect of the LCD shown in FIG. 22.
Figure 23B:
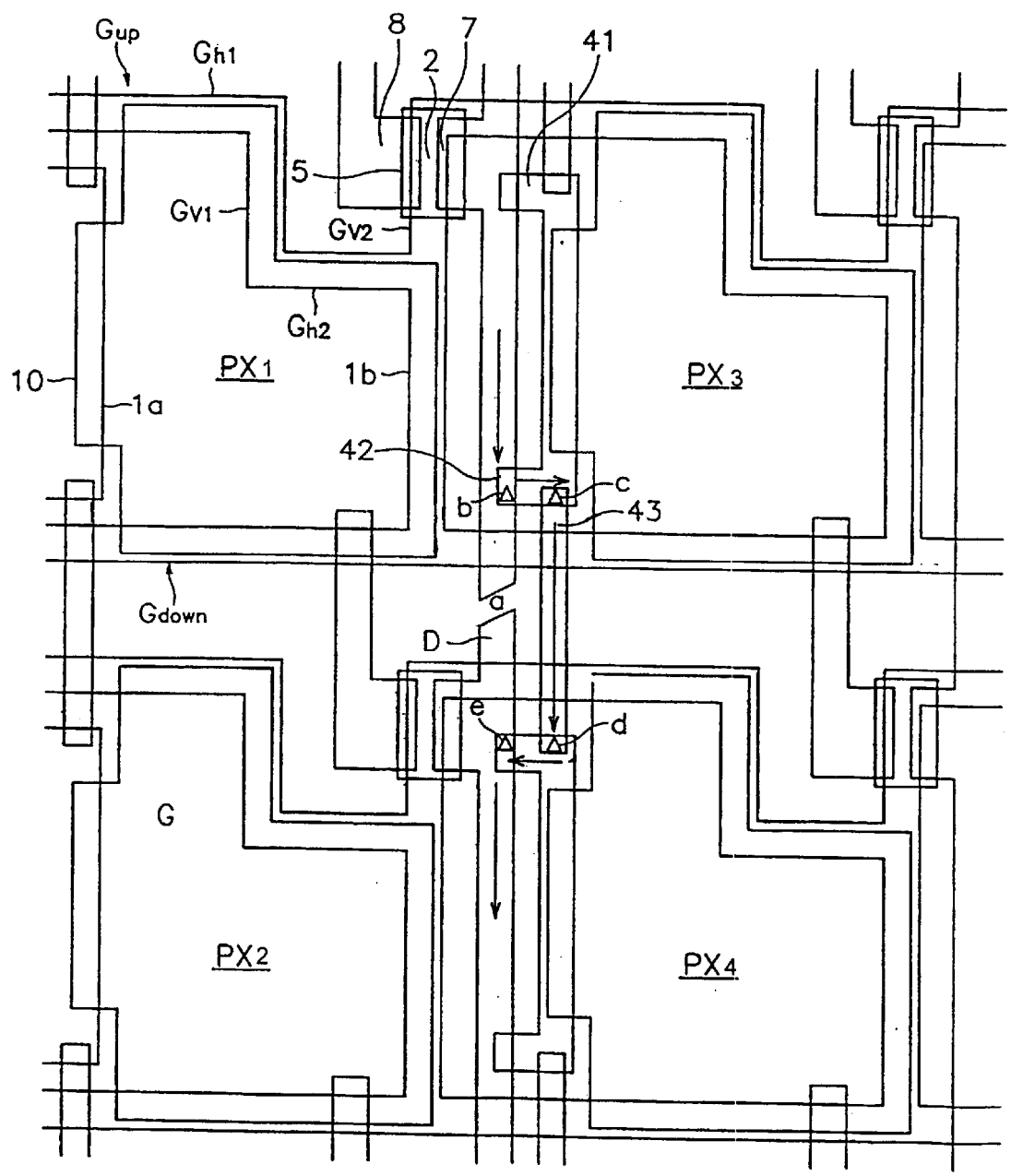

FIG. 22 is an arrangement plan of a pixel layout of a fourth embodiment of the TFT substrate of the matrix-type LCD according to the present invention and FIGS. 23A and 23B are diagrams illustrating a method of repairing the disconnection of the data line in the LCD according to the fourth embodiment.

As shown in FIG. 22, in the substrate of the matrix-type LCD according to the fourth embodiment of the present invention, a left auxiliary gate line 1a is formed while being separated from the upper and lower gate lines $G_{up}$ and $G_{down}$ and the upper and lower ends of the left auxiliary gate line 1a are bent in the left to form upper and lower first connect portions 41 and 42 which overlap the data line D of the pixel PX1 located at the left of the pixel PX3. Also, a second connect portion 43 is formed while being overlapped with the left auxiliary gate lines 1a of the upper pixel PX1 or PX3 and the lower pixel PX2 or PX4 which is located below the pixel PX1 or PX3, crossing the lower gate line $G_{down}$ of the upper pixel PX1 or PX3 and the upper gate line $G_{up}$ of the lower pixel PX2 or PX4. Also, the pattern of the pixel electrode 10 is not formed at the overlap portion between the second connect portion 43 and the left auxiliary gate line 1a to prevent the pixel electrode 10 from being shorted when the second connect portion 43 and the left auxiliary gate line 1a are shorted. Here, the data line D and the upper and lower first connect portions 41 and 42 are formed where the gate oxide layer 3 and the gate insulating layer 4 of FIG. 4 are interposed therebetween. The second connect portion 43 is formed of material composing the data line D or the pixel electrode 10, or a dual layer in which two kinds of material composing the data line D and the pixel electrode 10 are patterned. Here, the gate oxide layer 3 and the insulating layer 4 or the gate oxide layer 3, the insulating layer 4 and the protection layer 9 of FIG. 4 are interposed among the left auxiliary gate line 1a and the upper and lower gate lines $G_{up}$ and $G_{down}$. The remaining portions are similar with those of the layouts shown in FIGS. 3 and 4.

The inferiority of the data line in the above LCD can be repaired using the following methods one of which is selected in accordance with the locations of the disconnection.

First, as shown in FIG. 23A, supposing that the data line D placed between a cross point of the data line D and the upper first connect portion 41 and a cross point of the data line D and the lower first connect portion 42 is disconnected (a), so that a data signal cannot be transferred to a portion following the disconnected point. Here, the arrows shown in FIG. 23A represent the flow of the signal.

The cross point between the data line D located above the disconnect point a and the up connect portion 41 is shorted (b) using a laser, so that a data signal flows into the left auxiliary gate line 1a of the right pixel PX3. Then, the cross point between the data line D and the lower first connect portion 42 is shorted (c). As a result, the data signal comes to flow along the data line D again.

That is, the data signal comes to flow along the data line D via the upper first connect portion 41, the left auxiliary gate line 1a and the lower first connect portion 42 of the right pixel PX3.

Next, as shown in FIG. 23B, supposing that the data line D placed between a cross point of the data line D and the lower first connect portion 42 of the pixel PX3 and a cross point of the upper first connect portion 41 of a pixel PX4 located below the pixel PX3 and the data line D is disconnected (a), so that a data signal cannot be transferred to a portion following the disconnected point (a). Here, the arrows shown in FIG. 23B represent the flow of the signal.

The cross point between the data line D located above the disconnect point a of the data line D and the lower first connect portion 42 of the pixel PX3 is shorted (h) using a laser, so that a data signal flown along the data line D flows into the lower first connect portion 42 via the short point b, around the disconnect point a.

Subsequently, a cross point between the left auxiliary gate line 1a and the second connect portion 43 of the right pixel PX3 is shorted (c) and a cross point between the second connect portion 43 and a left auxiliary gate line 1a of a pixel PX4 located below the pixel PX3 is shorted (d). Then, the upper first connect portion 41 of the pixel PX4 and the data line D are shorted (e). As a result, the data signal returns to the data line D via the short point c, the second connect portion 43, the short point d, the upper first connect portion 41 of the pixel PX4, and the short point e in sequence.

The fifth embodiment of the matrix-type display device in accordance with the present invention is based on the basic layout shown in FIGS. 12 or 14, where the defect such as the disconnection of a data line or the loss of a gate electrode is repaired using a means for connecting the data line to an auxiliary gate line whose up end is separated from the upper gate line, and a means for connecting the data lines of two upper and lower pixels in the same column. As described above, in order to connect the data line and the both ends of the auxiliary gate line, a branch from the data line may extend to the auxiliary gate line or the both ends of the auxiliary gate line may extend to the data line. Here, this embodiment adopts the later case. Also, in order to connect each data line of upper and lower pixels being adjacent each other, there is prepared a pattern formed of material composing the pixel electrode. In addition, the upper gate line and the lower gate line, and the left and right auxiliary gate lines are overlapped at the pixel electrode and the periphery of the pixel electrode via an insulation layer, thereby forming a ring type capacitor.

Hereinafter, the fifth embodiment will be described in detail with reference to FIGS. 24, 25A to 25C.

Figure 24:
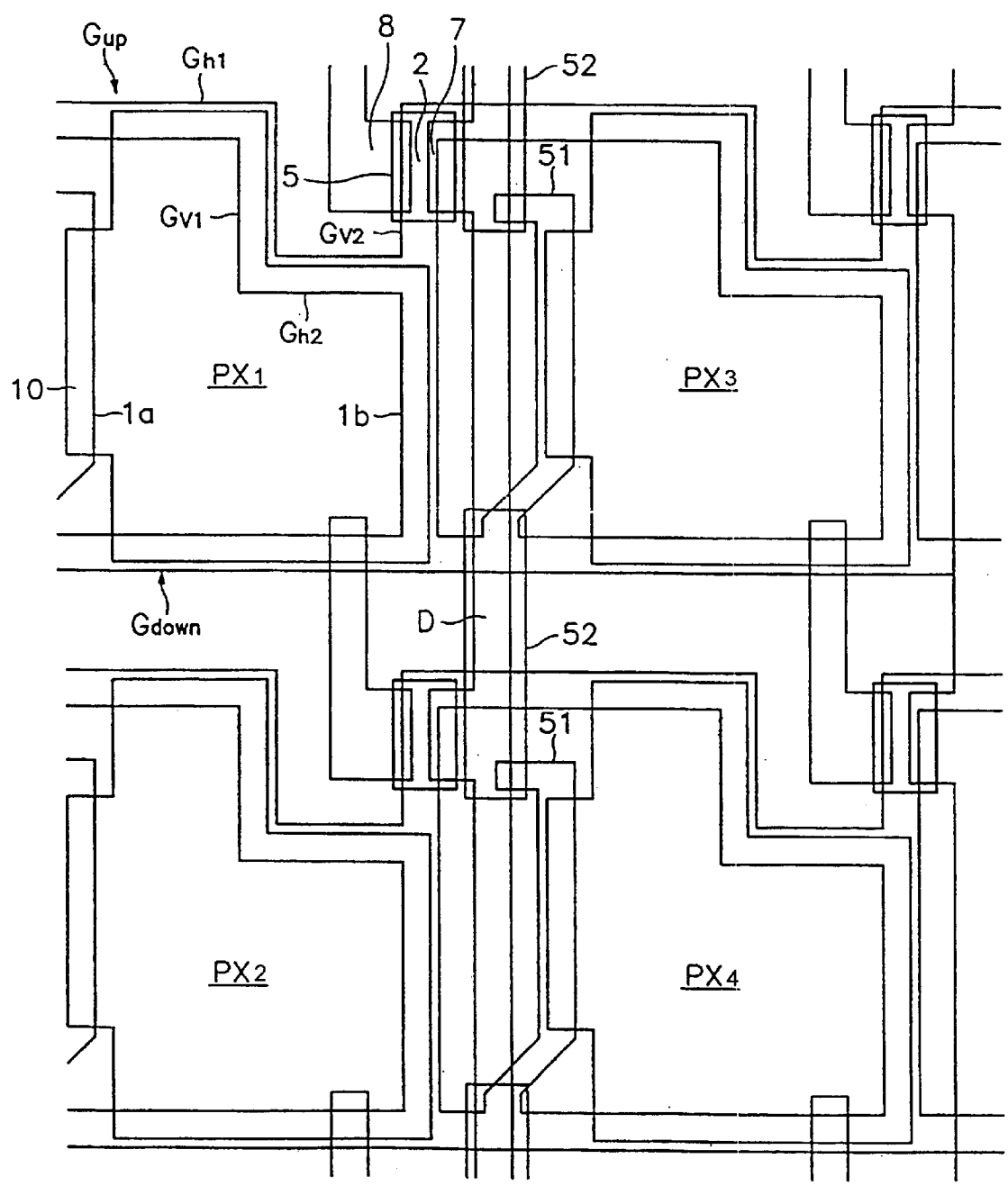
FIG. 24 is an arrangement diagram of a fifth embodiment of the TFT substrate of the LCD according to the present invention.
Figure 25A:
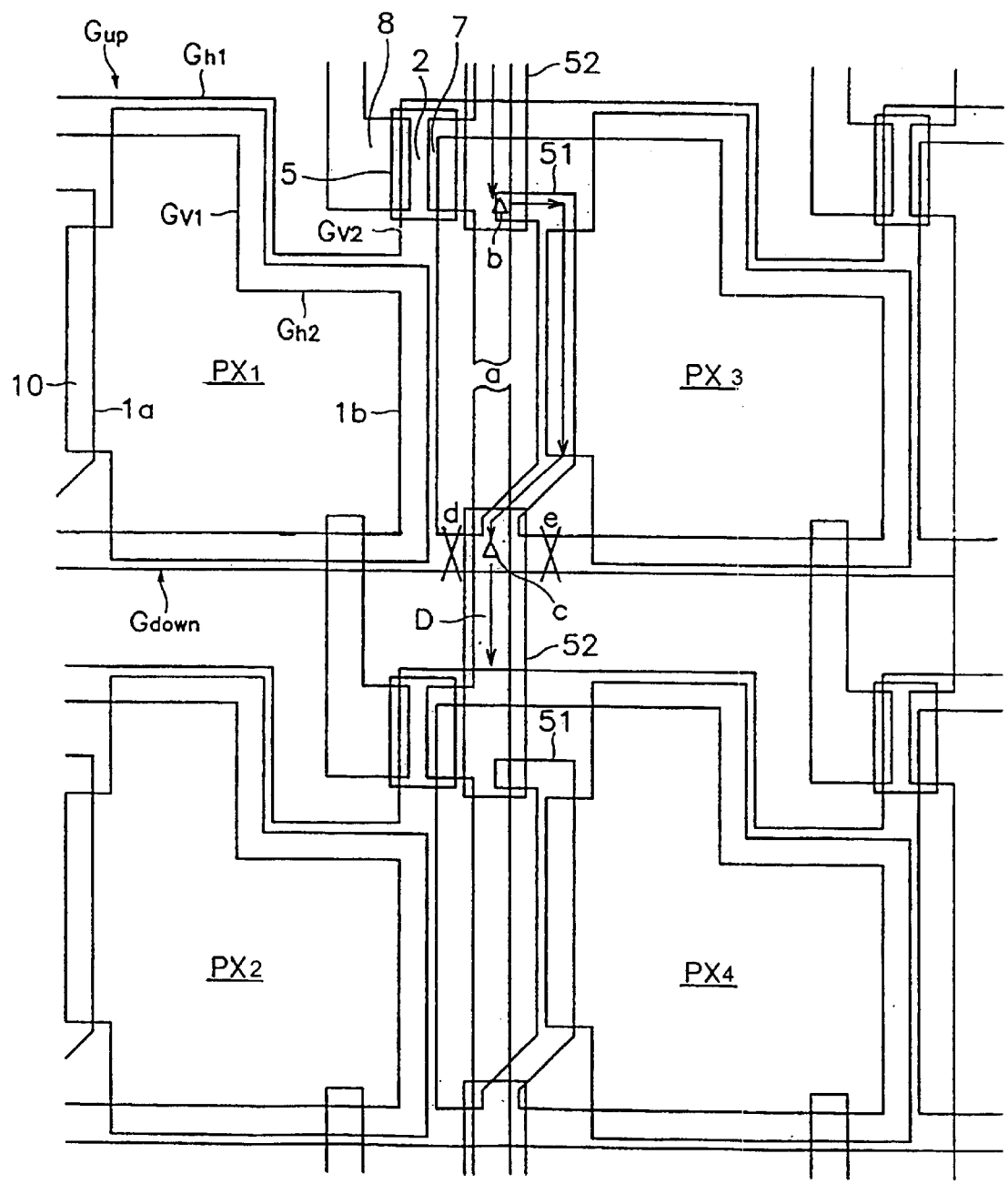
FIGS. 25A to 25C are diagrams illustrating a method of repairing a defect of the LCD shown in FIG. 24.
Figure 25B:
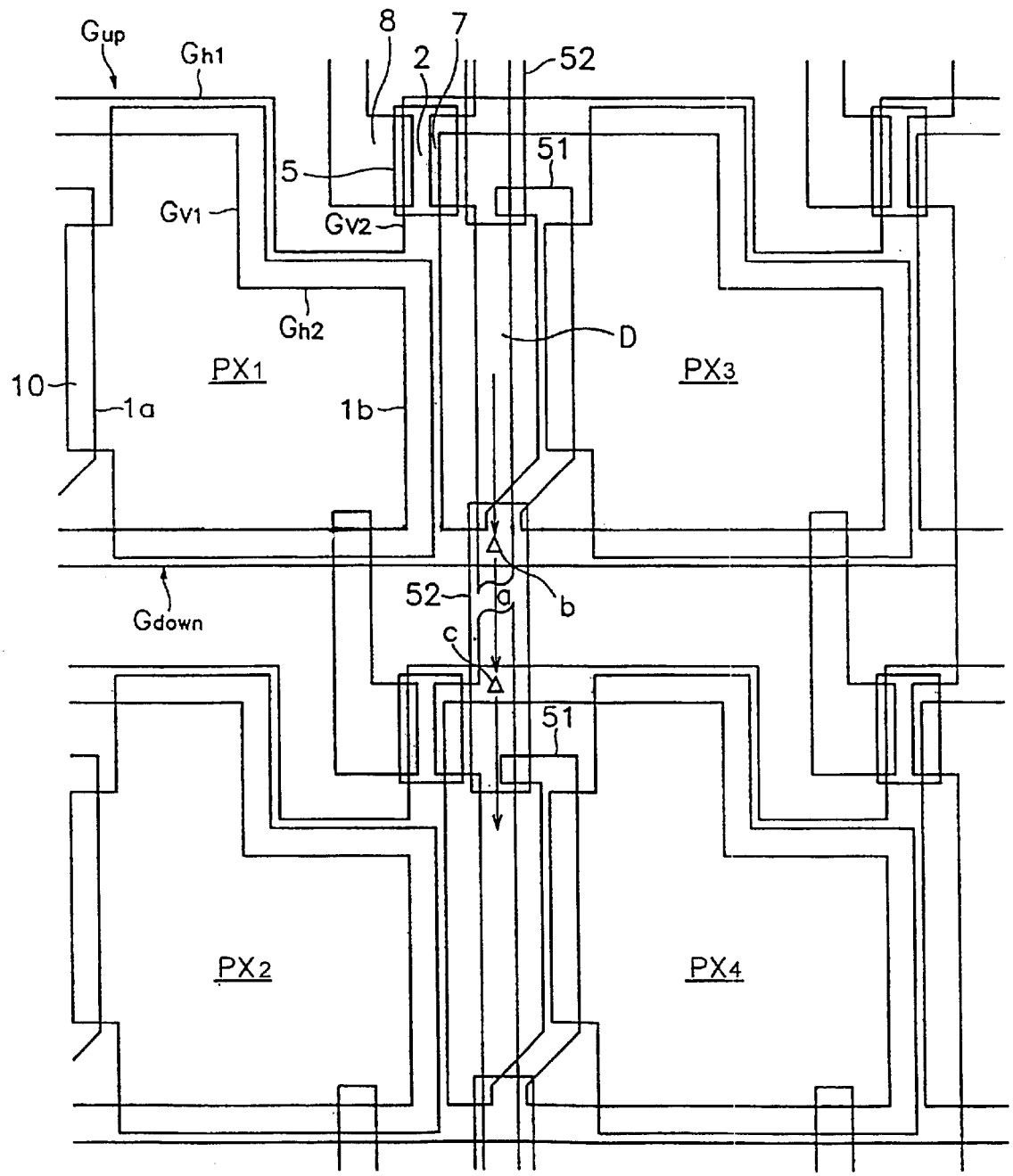
Figure 25C:
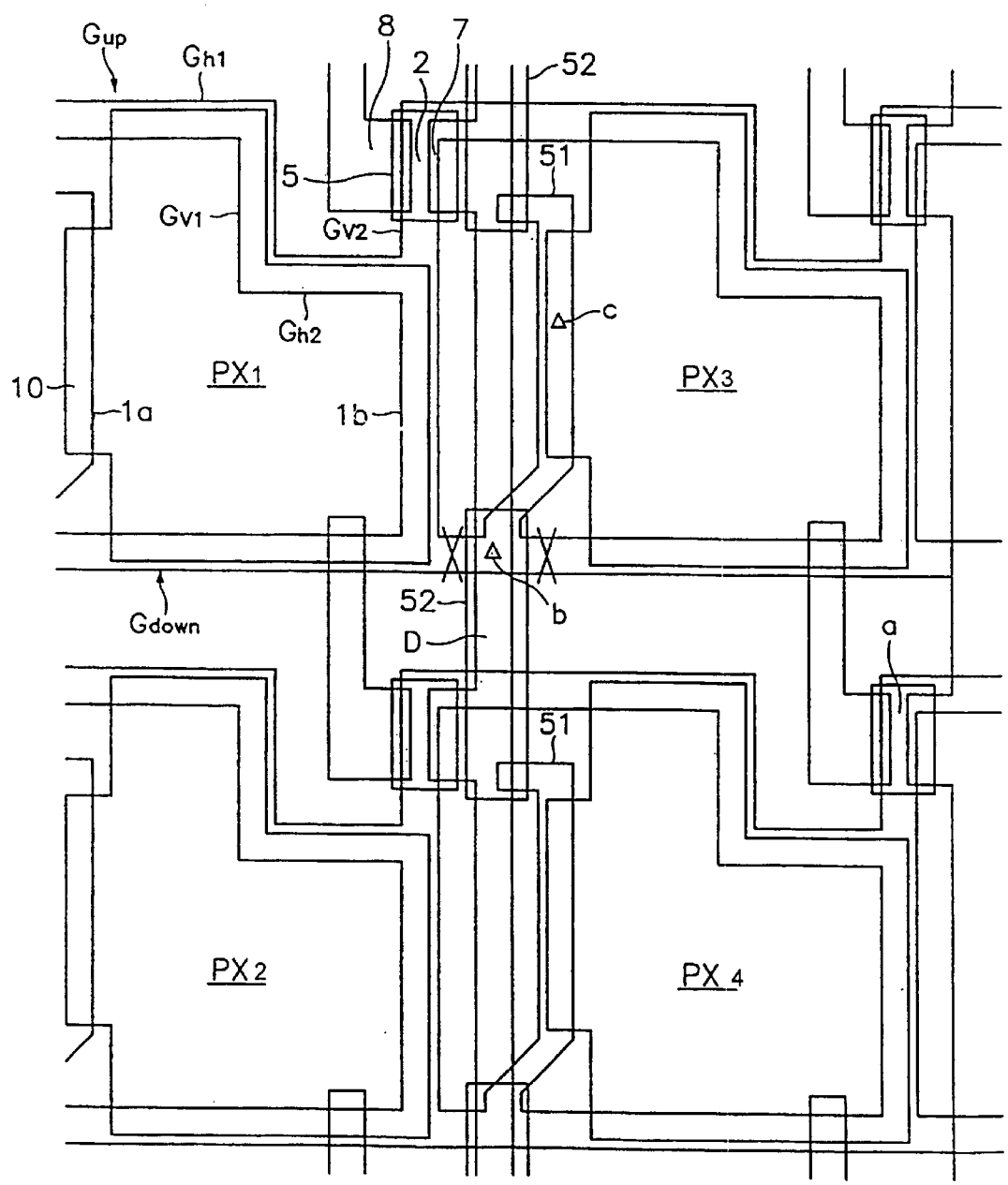

FIG. 24 is an arrangement diagram of a pixel layout of a fifth embodiment of the TFT substrate of the matrix-type LCD according to the present invention, and FIGS. 25A and 25B are diagrams illustrating a method of repairing the disconnection of the data line in the LCD substrate according to the fifth embodiment, and FIG. 25C is a diagram illustrating a method of repairing a defect in that the gate electrode is lost.

As shown in FIG. 24, in the substrate of the matrix-type LCD according to the fifth embodiment of the present invention, a left auxiliary gate line 1a of a pixel PX3 is formed while being separated from the upper gate line $G_{up}$ and a first connect portion 51 is formed by bending the upper end of the left auxiliary gate line 1a to the left while being overlapped with the data line D of the left pixel PX1. Also, the lower end of the left auxiliary gate line 1a is slantingly bent in the left to be connected with the lower gate line $G_{down}$ while being overlapped with the data line D. A second connect portion 52 is formed covering the data line D ranged from the cross point among the lower gate line $G_{down}$, the left auxiliary gate line 1a and the data line of the pixel PX3 to a cross point between the data line D and the first connect portion 51 of the lower pixel PX4. The pixel electrode 10 overlaps the left auxiliary gate line 1a, however, a corner of the pixel electrode 10 is indented away from the data line at both ends of the auxiliary gate line 1a to prevent the pixel electrode 10 from being overlapped with the left auxiliary gate line 1a. Here, the data line D and the first connect portion 51 are formed while the gate oxide layer 3 and the gate insulating layer 4 of FIG. 4 are interposed therebetween. The second connect portion 52 is formed of transparent conductive material composing the pixel electrode 10 while the protection layer 9 is interposed between the second connect portion 52 and the data line D. The remaining portions are similar with those of the layouts shown in FIGS. 3 and 4.

The inferiority of the data line in the above LCD can be repaired using the following methods one of which is selected in accordance with the locations of the disconnection.

First, as shown in FIG. 25A, supposing that the data line D placed between a cross point of the data line D and the first connect portion 51 and a cross point among the data line D, the lower gate line $G_{down}$ and the left auxiliary gate line 1a of the right pixel PX3 is disconnected (a), so that a data signal cannot be transferred to a portion following the disconnected point. Here, the arrows shown in FIG. 25A represent the flow of the signal.

The cross point between the data line D located above the disconnect point a and the first connect portion 51 is shorted (b) using a laser, so that a data signal flows into the left auxiliary gate line 1a of the right pixel PX3. Then, the cross point among the left auxiliary gate line 1a, the lower gate line $G_{down}$ and the data line D is shorted (c), and then two points of the lower gate line $G_{down}$, respectively located at the left and right sides of the short point c, are disconnected (d and e). As a result, the data signal comes to flow into the data line D again.

That is, the data signal comes to flow along the data line D via the first connect portion 51 and the left auxiliary gate line 1a of the right pixel PX3. Here, the gate signal is applied to the right pixel PX3 via only the upper gate line $G_{up}$.

Next, referring to FIG. 25B, supposing that the data line D placed between a cross point of the left auxiliary gate line 1a of the right pixel PX3 and the lower gate line $G_{down}$ and a cross point of the first connect portion 51 of a pixel PX4 located below the pixel PX3 and the data line D is disconnected (a), so that a data signal cannot be transferred to a portion following the disconnected point. Here, the arrows shown in FIG. 25B represent the flow of the signal.

The data line D between the cross point of the lower gate line $G_{down}$ and the left auxiliary gate line 1a of the right pixel PX3, and the disconnect point (a), and the second connect portion 52 are shorted (b) using a laser, and the data line D located below the disconnect point (b) and the second connect portion 52 are shorted (c). Thus, the data signal flown along the data line D flows into the second connect portion 52 via the short point b, around the disconnect point a, and then comes to flow along the data line D via the short point c.

As a result the data signal flown along the data line D comes to flow into the data line D via the second connect portion 52.

As a third repairing method of this fifth embodiment, the method of repairing a defect in that a gate electrode is lost or damaged will be described. For example, as shown in FIG. 25C, supposing that a gate electrode 2 of a pixel PX4 located below the pixel Px3 is lost (a).

When the gate electrode 2 is lost, a data signal cannot be transferred to the pixel electrode 10 of the pixel PX3 located above the pixel PX4, which is connected to the drain electrode 8 of pixel PX4. Thus, in order to continuously apply the data signal to the pixel electrode 10, a data line D should be connected to the pixel electrode 10. For this purpose, the cross point between the data line D and the lower gate line $G_{down}$, which simultaneously corresponds to the cross point between the data line D and the left auxiliary gate line 1a of the right pixel PX3, is shorted (b) using a laser. Then, two points of the lower gate line $G_{down}$ located at the left and right of the short point b, are disconnected (d and e), and then the left auxiliary gate line 1a and the pixel electrode 10 are shorted (c). As a result, a data signal comes to flow into the pixel electrode 10 via the left auxiliary gate line 1a. Here, the gate signal is applied to the right pixel PX3 via only the upper gate line $G_{up}$.

The sixth embodiment of the matrix-type display device in accordance with the present invention is based on the basic layout shown in FIG. 8, where two auxiliary gate lines are separated from the upper gate line and two auxiliary gate lines are connected together with the down data line to form a closed region. Then, there are provided a bridge for connecting the connected auxiliary gate line and the gate line and a means for connecting the auxiliary gate line of the lower pixel and the lower gate line of the upper pixel to repair the defect such as the disconnection of a gate line, the short between the auxiliary gate line or the lower gate line and the pixel electrode, and the loss of a gate electrode.

Hereinafter, the sixth embodiment will be described in detail with reference to FIGS. 26, 27A to 27D.

Figure 26:
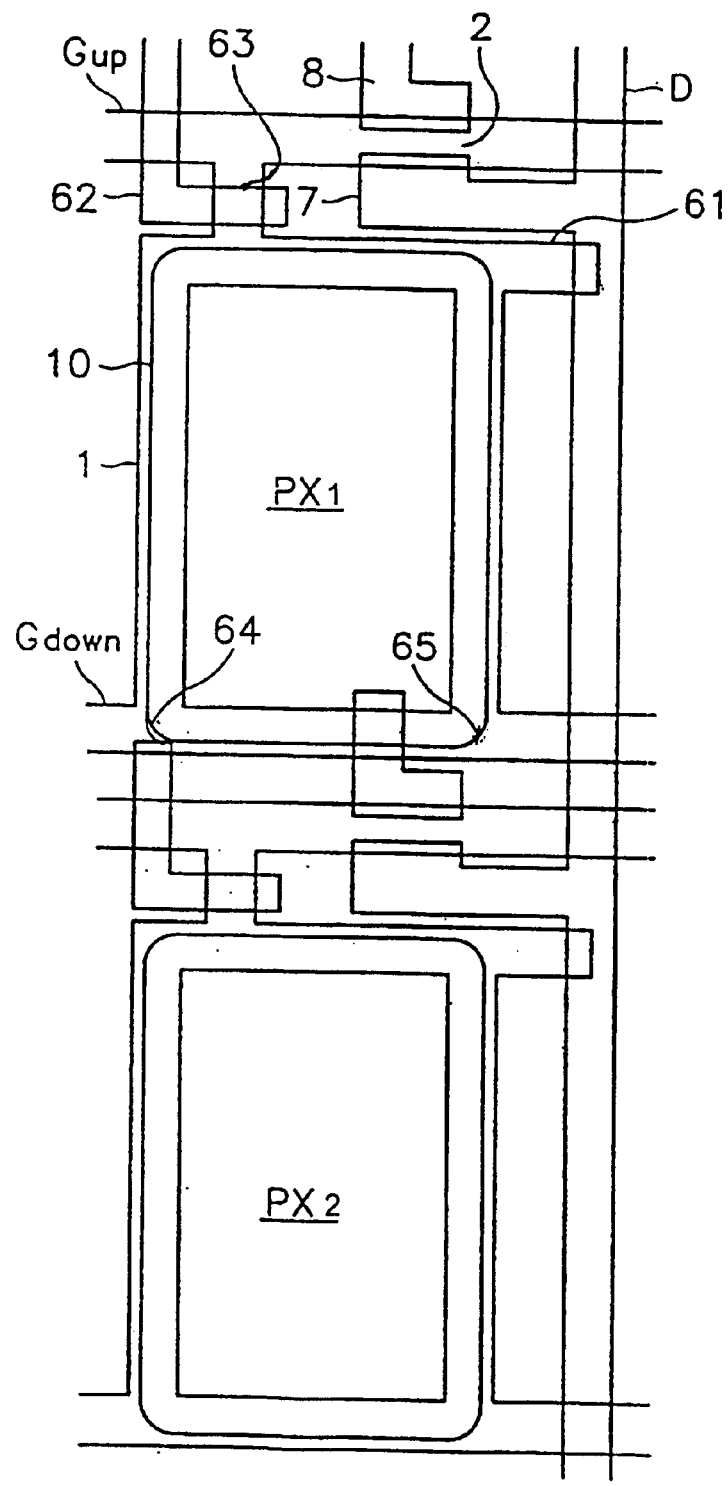
FIG. 26 is an arrangement plan of a sixth embodiment of the TFT substrate of the LCD according to the present invention.

FIG. 26 is an arrangement plan of a pixel layout of a sixth embodiment of the TFT substrate of the LCD according to the present invention, and FIGS. 27A to 27D are diagrams illustrating a method of repairing the disconnection of the data line of the LCD according to the sixth embodiment.

As shown in FIG. 26, in the substrate of the matrix-type LCD according to the sixth embodiment of the present invention, an upper gate line $G_{up}$ extends straight in the horizontal direction, differently from the above described upper gate line $G_{up}$ which is bent with the horizontal and vertical portions. Also, the layout of the TFT is also different from that of the conventional LCD. An auxiliary gate line 1 is formed by connecting the above described left and right auxiliary gate lines and connected to the upper gate line $G_{up}$ via a bridge 63. Also, the auxiliary gate line 1 is connected to the lower gate line $G_{down}$ at left and right connect points 64 and 65, thereby forming a closed region. A first connect portion 61 as a branch of the auxiliary gate line 1 extends to the data line D while being overlapped with the data line D, and a second connect portion 62 is formed while being overlapped with the lower gate line $G_{down}$ of pixel PX1 and the bridge 63 (here, the second connect portion 62 may overlap the auxiliary gate line 1 instead of the bridge 63), crossing the upper gate line $G_{up}$ of pixel PX2 located below the lower gate line $G_{down}$ of pixel PX1. Here, the data line D and the first connect portion 61 are formed while the gate oxide layer 3 and the gate insulating layer 4 of FIG. 4 are interposed therebetween. The second connect portion 62 is formed of material composing the data line D or the pixel electrode 10 while being separated from the upper and lower gate lines $G_{up}$ of pixel PX2 and $G_{down}$ of pixel PX1 and the bridge 63, wherein the gate oxide layer 3 and the gate insulating layer 4 or the gate oxide layer 3, the gate insulating layer 4 and the protection layer 9 are interposed between the second connect portion 62, and the upper and lower gate lines $G_{up}$ and $G_{down}$ and the bridge 63. In addition, the upper gate line $G_{up}$ and the lower gate line $G_{down}$ and the left and right auxiliary gate lines 1a and 1b are overlapped at the pixel electrode 10 and the periphery of the pixel electrode 10 via an insulation layer, thereby forming a ring-type capacitor. The remaining portions are similar with those of the layouts shown in FIGS. 3 and 4.

The inferiority of the data line in the above LCD can be repaired using the following methods one of which is selected in accordance with the locations of the disconnection.

First, as shown in FIG. 27A, supposing that the data line D placed between a cross point of the data line D and the first connect portion 61 and a cross point of the data line D and the lower gate line Gdown is disconnected (a), so that a data signal cannot be transferred to a portion following the disconnected point. Here, the arrows shown in FIG. 27A represent the flow of the signal.

The cross point between the data line D located above the disconnect point a and the first connect portion 61 is shorted (b) using a laser, so that a data signal flows into the left auxiliary gate line 1 and then comes to flow left and further right. Then, the data line D and the lower gate line $G_{down}$ are shorted (c) and then the bridge 63, the lower gate line $G_{down}$ located at the left of the left connect point 64 and the lower gate line $G_{down}$ located at the right of the short point c are disconnected (d, e, f). Thus, the data signal flows into the data line D again via the auxiliary gate line 1.

That is, the data signal comes to flow along the data line D again via the first connect portion 61, the auxiliary gate line 1 and the lower gate line $G_{down}$. Here, the gate signal of the pixel PX1 is transferred to a left pixel via only the upper gate line $G_{up}$.

Next, referring to FIG. 27B, supposing that the data line D placed between a cross point of the data line D and the down gate lint $G_{down}$ and a cross point of the data line D and the first connect portion 61 of a pixel PX2 located below the pixel PX1 is disconnected (a), so that a data signal cannot be transferred to a portion following the disconnected point. Here, the arrows shown in FIG. 27B represent the flow of the signal.

The cross point between the data line located above the data line D and the lower gate line $G_{down}$ is shorted (b), so that the signal flown along the data line D comes to flow the auxiliary gate line 1 around the disconnect point a. Then, the lower gate line $G_{down}$ located at the right of the short point b and the bridge 63 are disconnected (g and h), and the second connect portion 62 and the lower gate line $G_{down}$ are shorted (c), and the lower gate line $G_{down}$ located at the left of the short point c is disconnected (f) As a result, the data signal comes to flow along the second connect portion 62. Then, the second connect portion 62 and the bridge 63 of the pixel PX2 are shorted (d) using a laser, so that the data signal flows along the auxiliary gate line 1. Also, two points of the lower gate line $G_{down}$, located at the left of the left connect point 64 and the right of the right connect point 65, are disconnected (j and k) and the first connect portion 61 and the data line D are shorted (e). Thus, the flow of the data signal returns to the data line D.

That is, the data signal comes to flow along the data line D again via the lower gate line $G_{down}$, the second connect portion 62 of the pixel PX1, and the auxiliary gate line 1 of the pixel PX2. Here, the gate signal of the pixel PX1 is transferred to a right pixel via only the upper gate line $G_{up}$ and the gate signal of the pixel PX2 is also transferred to a right pixel via only the upper gate line $G_{up}$.

In the pixel layout according to the sixth preferred embodiment, when the pixel electrode 10 and the auxiliary gate line are shorted, and the gate electrode 2 of the transistor is damaged or lost, the defect can be repaired.

Figure 27C:
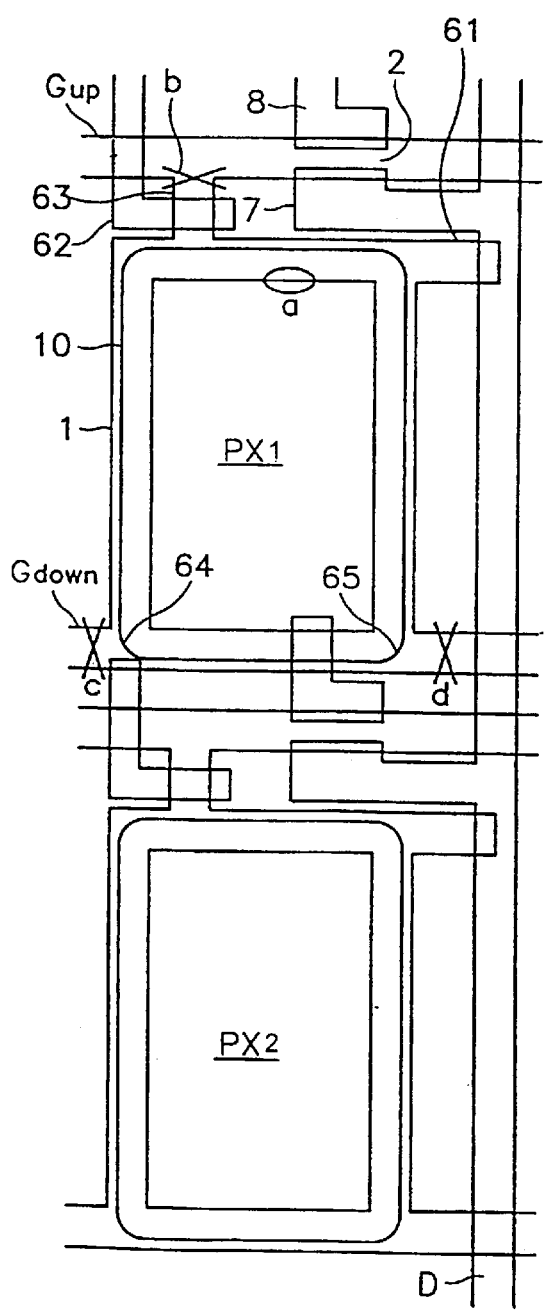

As shown in FIG. 27C, supposing that the auxiliary gate line 1 and the pixel electrode 10 are shorted (a). In this case, the bridge 63 which connects the auxiliary gate line 1 and the upper gate line $G_{up}$, and two points of the lower gate line $G_{down}$, located at the left of the left connect point 64 and the right of the right connect point 65, are disconnected (b, c and d) to separate the auxiliary gate line 1 and the lower gate line $G_{down}$ connected to the auxiliary gate line 1 from the surroundings thereof As a result, the gate signal flows along only the upper gate line $G_{up}$.

Figure 27D:
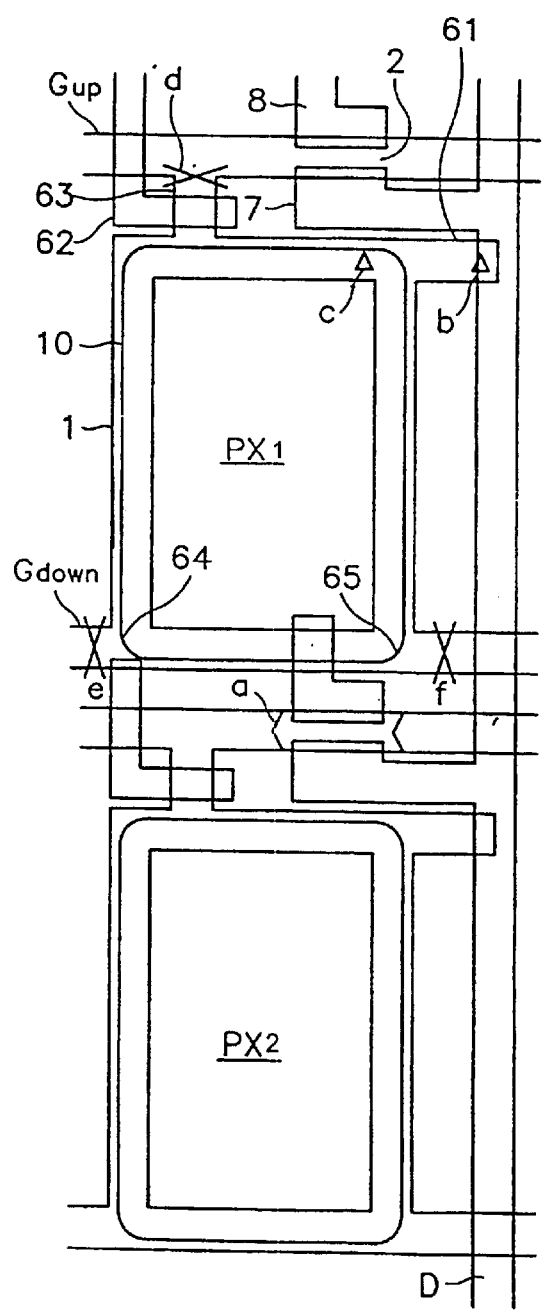

Also, as shown in FIG. 27D, supposing that the gate electrode 2 of the pixel PX2 is damaged or lost. In this case, the data line D and the first connect portion 61 are shorted (b) using a laser and the auxiliary gate line 1 and the pixel electrode 10 are shorted (c) to flow the data signal into the pixel electrode 10. Then, the bridge 63 and two points of the lower gate line $G_{down}$, located at the left of the left connect point 64 and at the right of the right connect point 65, are disconnected (d, e and j) to prevent the data signal and the gate signal from being mixed each other.

Figure 28:
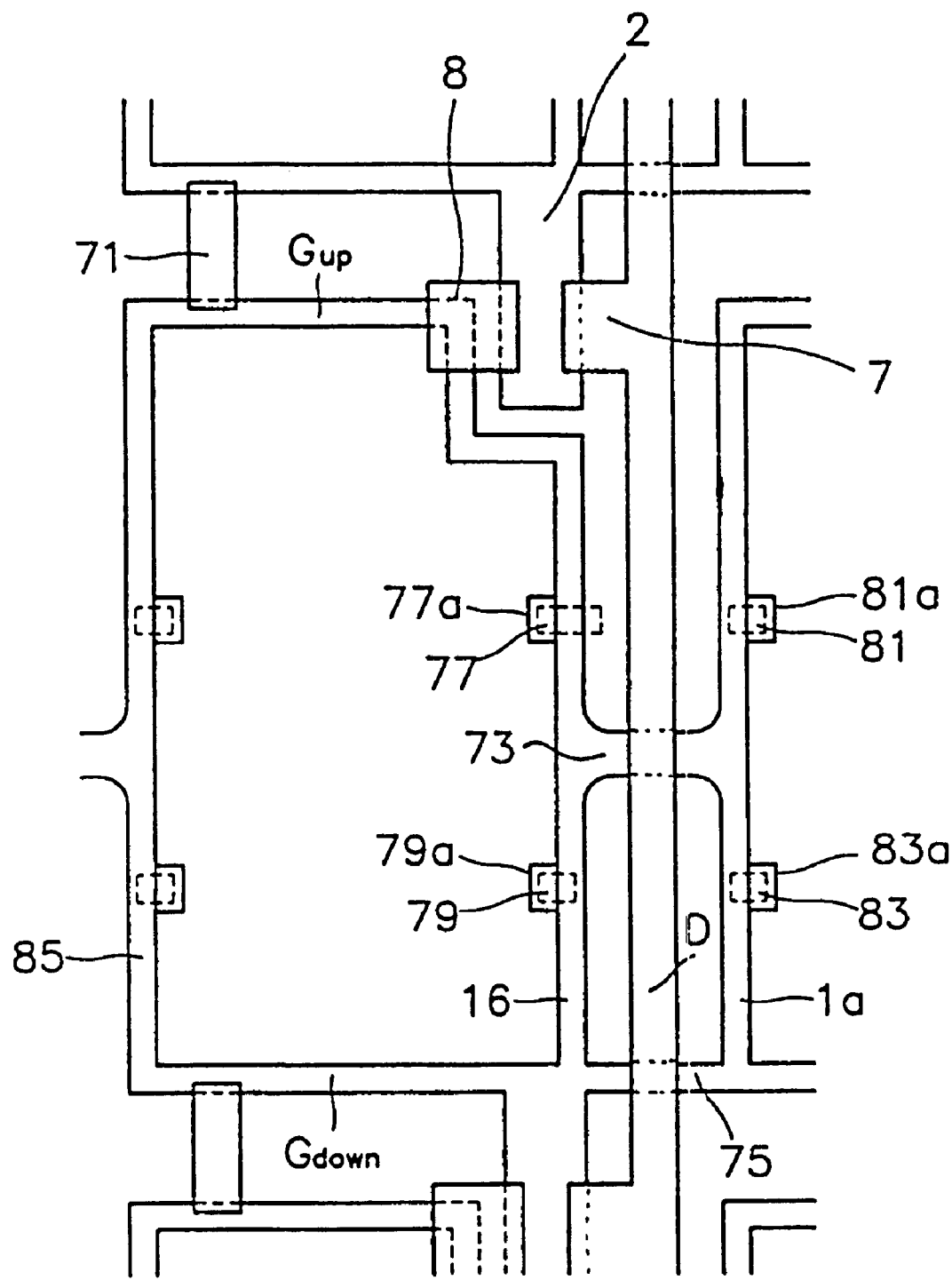
FIG. 28 is an arrangement plan of a seventh embodiment of the TFT substrate of the LCD according to the present invention.
Figure 29A:
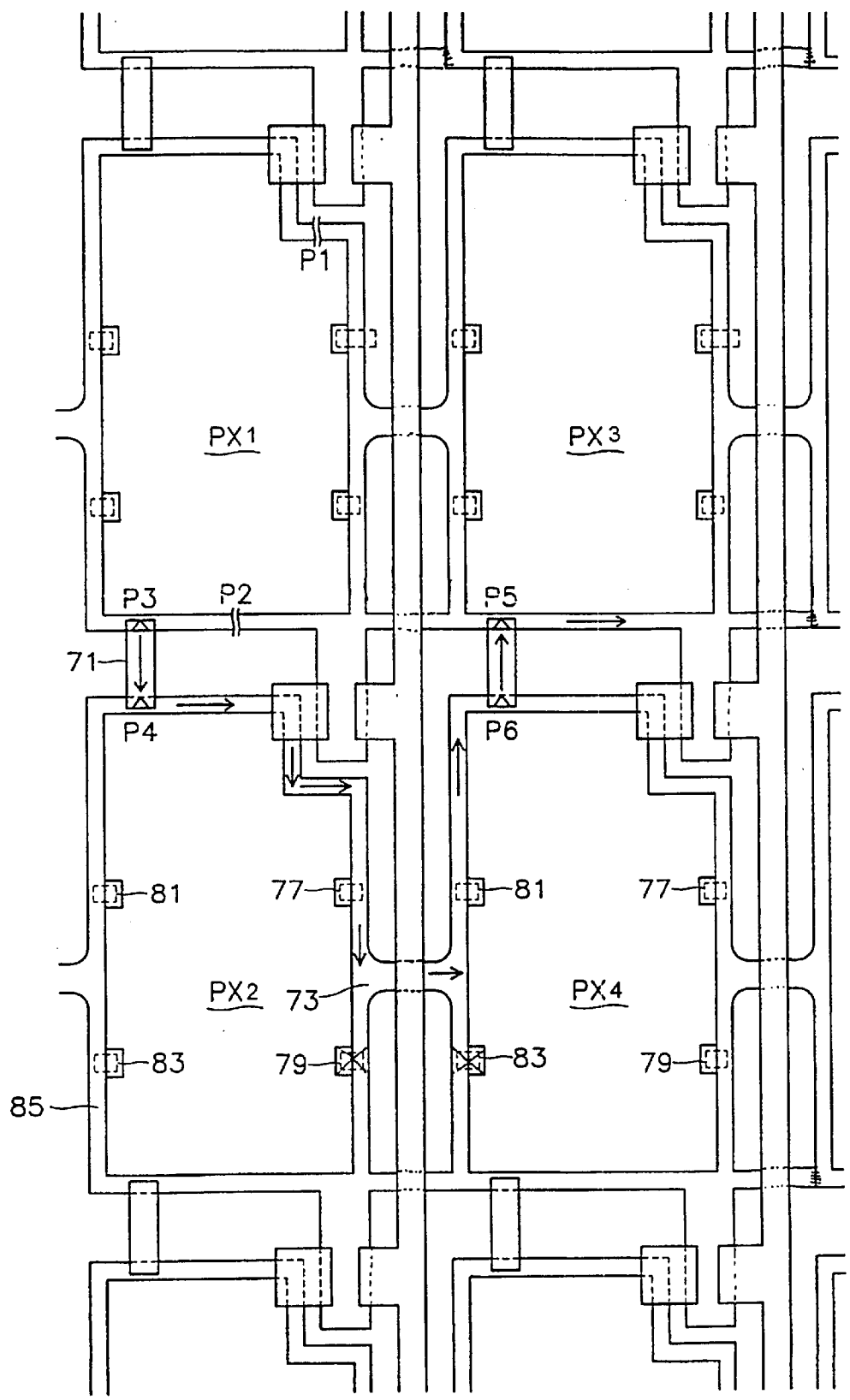
FIGS. 29A to 29C are diagrams illustrating a method of reparing defects of the gate line and data line of the TFT substrate of the LCD according to the present invention.
Figure 29B:
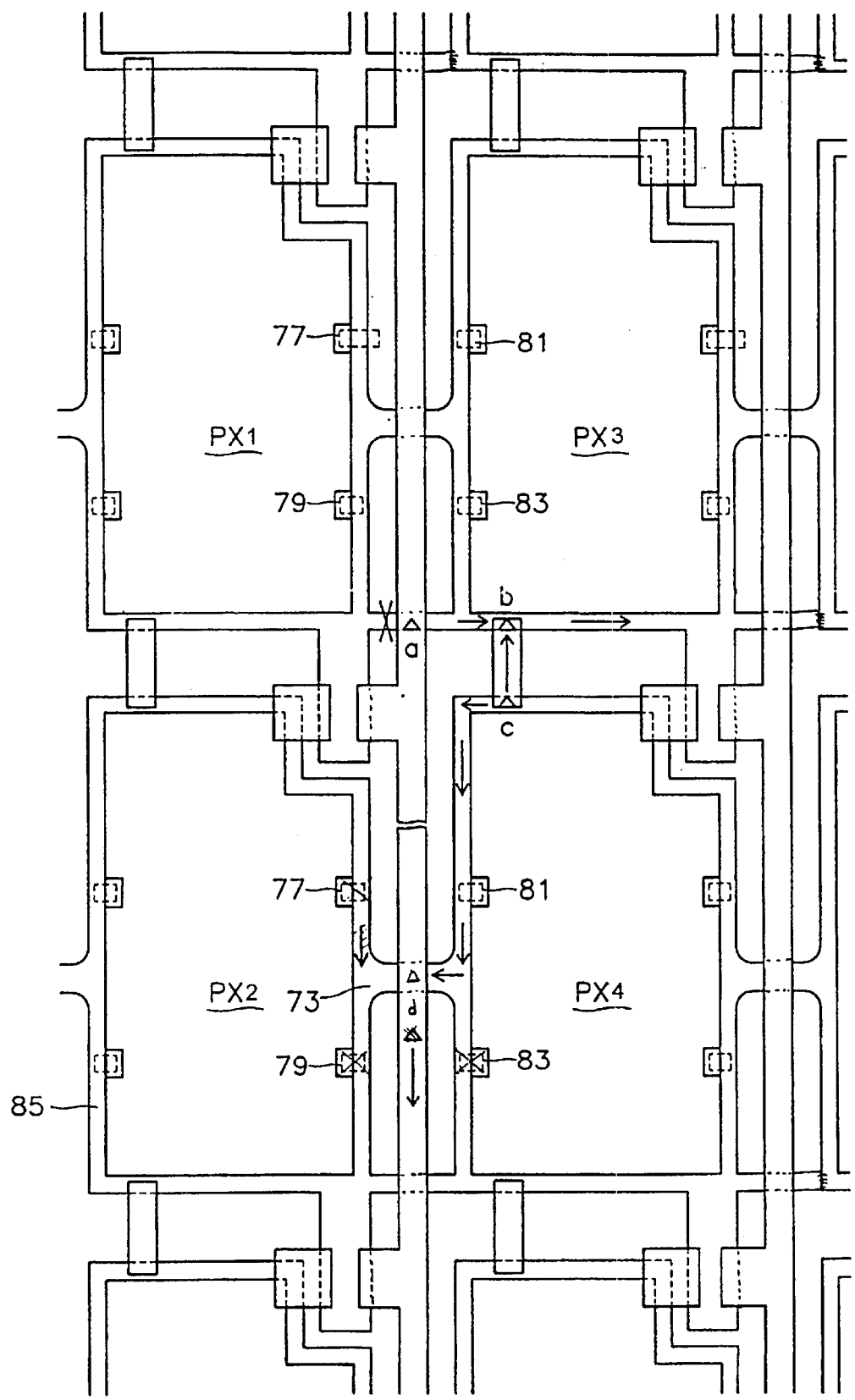
Figure 29C:
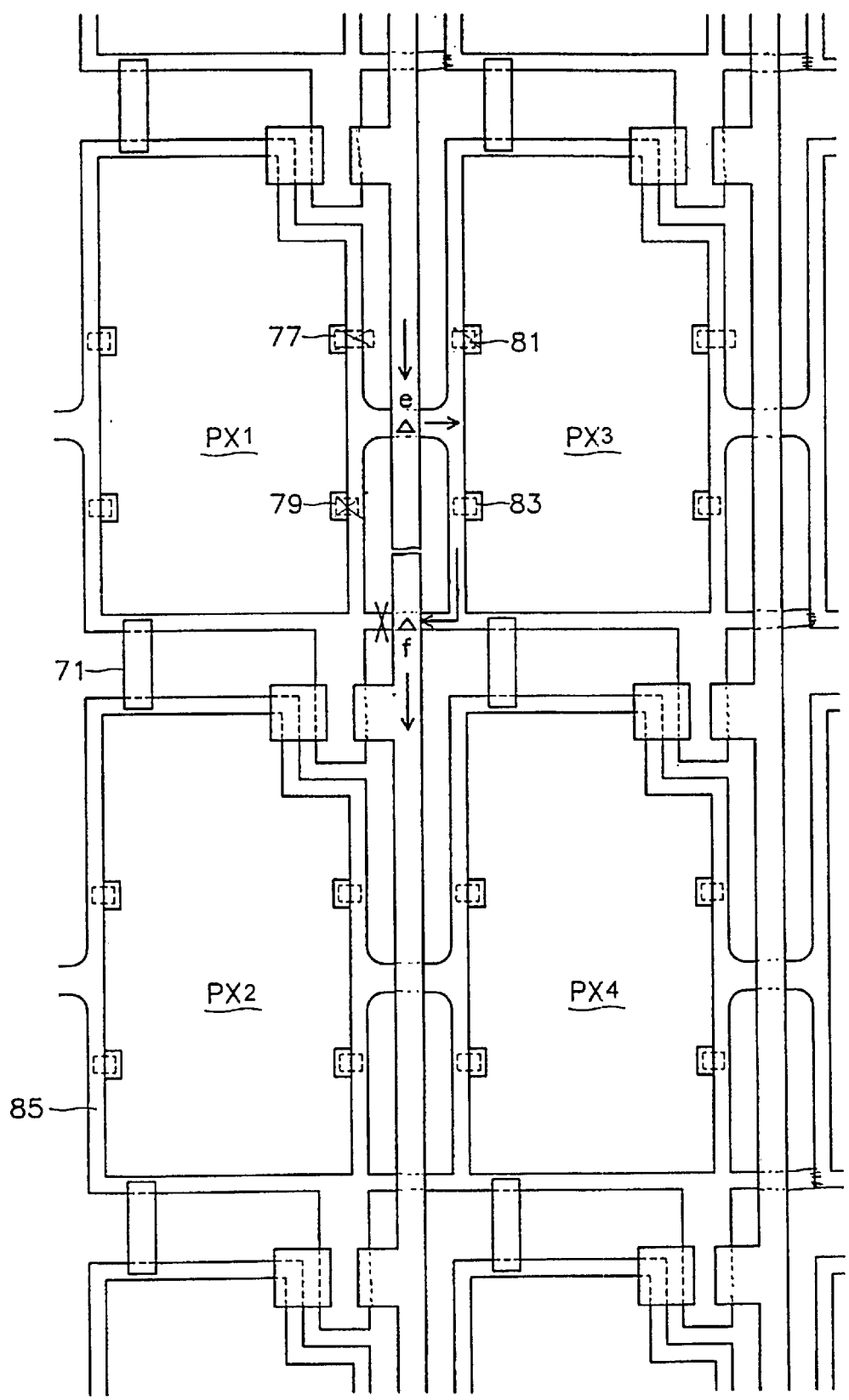

FIG. 28 is an arrangement plan of a seventh embodiment of the TFT substrate of the LCD according to the present invention, and FIGS. 29A to 29C are diagrams illustrating a method of repairing the disconnection of the gate line and data line of the TFT substrate of the LCD according to the present invention.

As shown in FIG. 28, the TFT substrate of the LCD includes a conductive pad 71 for connecting the upper and lower gate lines of the adjacent pixels which are in the same pixel column, a first connect portion 73 as a portion extended from an auxiliary gate line, for connecting the auxiliary gate lines of the adjacent pixels which are in the same pixel row, and a second connect portion 75 as a portion extended from the lower gate line, for connecting the lower gate lines of adjacent left and right pixels, thereby repairing the defects of the gate line and data line. However, differently from the above-described LCDs, the upper gate line of this embodiment is comprised of a first horizontal portion and a first vertical portion without a second vertical portion. Also, a source 7 of the transistor is connected to the data line D, a drain is connected to the lower gate line of the upper pixel and a pixel electrode. Also, the upper and lower gate lines, and the right and left auxiliary gate lines partially cross with the pixel electrode along the periphery of the pixel electrode via an insulation layer, thereby forming a first electrode 85 as an additional capacitance. Also, cutting portions 77, 79, 81 and 83 and protection grooves 77a, 79a, 81a and 83a are formed at the periphery of the first connect portion, wherein the cutting portions are for disconnecting the first electrode as the additional capacitance so as to prevent the disconnection of the gate line when the conductive pad is connected to the gate line adjacent to the additional capacitance, and the protection grooves are for preventing the damage of the pixel electrode when the cutting portions are cut.

First, a method of repairing the inferiority of the gate line will be described with reference to FIG. 29A.

Supposing that the gate line of the pixel PX1 is disconnected at two points P1 and P2, two conductive pads adjacent to the pixel having the defects are shorted (P3, P4, P5 and P6), thereby connecting the lower gate line of the upper pixels PX1 and PX3 and the upper gate line of the lower pixels PX2 and PX4. Thus, a gate signal whose flowing is blocked by the P1 and P2 comes to flow along the upper gate line, right auxiliary gate line and the first connect portion of the pixel PX2 via P3 and P4 of the conductive pad, and then be transferred to the lower gate line of the pixel PX3 via the left auxiliary gate line of the pixel PX4, and P6 and PS of the conductive pad.

Then, a method of repairing the inferiority of the data line will be described with reference to FIG. 29B.

As shown in FIG. 29B, supposing that the data line between the upper gate line and the first connect portion 73 is disconnected, a cross point of the lower gate line of the pixel PX1 and the data line is shorted (a) using a laser and then the lower gate line located at the left of the short point a is disconnected. Thus, the signal of the data line passes the short point a to flow along the lower gate line of the pixel PX3. Then, both ends of the conductive pad connecting the gate lines of the pixels PX3 and PX4 are shorted (h and c) to transfer the data signal to the up gate of the pixel PX4. Then, a cross point of the first connect portion which connects the pixels PX2 and PX4, and the data line is shorted (d) using a laser, and the cutting portions 77 and 79 of the pixel PX2, and the cutting portion 83 of the pixel PX4 are then disconnected, so that the data signal of the pixel PX4 comes to return to the data line. Here, the lower gate line of the pixel PX1 is disconnected. However, the signal is transferred to the lower gate line of the pixel PX3 via the right auxiliary gate line of the pixel PX1, the first connect portion of the pixels PX1 and PX3, and the left auxiliary gate line of the pixel PX3, by disconnecting the cutting portion 77 of the pixel PX1 and the cutting portion 81 of the pixel PX3.

FIG. 29C is a diagram illustrating a method of repairing a defect of the data line between the first and second connect portions which connect the gate lines of the adjacent left and right pixels.

The data line on the first connect portion of the pixels PX1 and PX3 and the data line on the second connect portion are shorted (e and j) using a laser, and the cutting portions 77 and 79 of the pixel PX1, the cutting portion 81 of the pixel PX3 and the lower gate line located at the left of the second connect portion are then disconnected. As a result, the data signal returns to the data line via the first connect portion, the left auxiliary gate line and the lower gate line of the pixel PX3, and the second connect portion. Here, the lower gate line of the pixel PX1 is disconnected. However, if both ends of the conductive pad 71 connecting the pixels PX1 and PX2, and both ends of the pixels PX1 and PX3 are shorted, and the cutting portions 79 and 83 of the pixels PX2 and PX4 are disconnected, the signal of the gate line comes to be transferred to the down gate of the pixel PX3.

As described above, the upper and lower gate lines cross with the data line at above three points together with the auxiliary gate line according to the pixel layouts of the TFT substrate of the first to sixth preferred embodiments while the pixel layout of the TFT substrate of the seventh preferred embodiment has only two cross points. Also, when the data line has defects, the cross points are shorted using a laser and the auxiliary signal line is separated from the up or lower gate line, thereby repairing the defective data line.

Therefore, according to the matrix-type LCD of the present invention, nearly all disconnection of the signal lines is effectively repaired while preventing decrease of an aperture ratio and delay of RC time, and the defects caused by a short between pixel electrodes and signal lines and loss in an electrode of a switching element can be repaired in a pixel unit.

What is claimed is:

1. A matrix-type display device in which a plurality of pixel regions are arranged in a matrix-type, comprising:
    upper and lower first signal lines stretching in the horizontal direction to form upper and lower boundaries of each pixel region, respectively;
    left and right auxiliary signal lines connecting upper and lower first signal lines to form left and right boundaries of each pixel region, respectively;
    a second signal line stretching in the vertical direction between pixel regions, crossing the upper and lower first signal lines while being insulated from the upper and lower first signal lines;
    a pixel electrode formed in each pixel region and comprised of a transparent conductive material;
    a switching element formed in each pixel region, having a first terminal connected to the lower first signal line of an upper adjacent pixel region, a second terminal connected to the pixel electrode, and a third terminal connected to the second signal line;
    a first connect means stretching from the upper first signal line to a lower first signal line of the upper adjacent pixel;
    a second connect means stretching from the right auxiliary signal line to a left auxiliary signal line of a right adjacent pixel region; and
    a third connect means stretching from the lower first signal line to a lower first signal line of the right adjacent pixel region.

2. A matrix-type display device as claimed in claim 1, wherein the upper and lower first signal lines and the right and left auxiliary signal lines are overlapped at the periphery of the pixel electrode, separated via an insulation layer, to form a capacitance electrode.

3. A matrix-type display device as claimed in claim 2, wherein cutting portions, which can prevent the pixel electrode from overlapping the right and left auxiliary signal lines are formed adjacent to the second connect means.

4. A matrix-type display device in which a plurality of pixel regions are arranged in a matrix-type, comprising:
    upper and lower first signal lines stretching in the horizontal direction to form upper and lower boundaries of each pixel region;
    a second signal line stretching in the vertical direction between pixel regions, crossing the upper and lower first signal lines while being insulated from the upper and lower first signal lines;
    left and right auxiliary signal lines formed in parallel to the second signal line, adjacent to the second signal line, to form left and right boundaries of each pixel region;
    a pixel electrode formed in each pixel region and comprised of a transparent conductive material; and
    a switching element having a first terminal connected to the upper first signal line, a second terminal connected to an adjacent pixel electrode, and a third terminal connected to the second signal line,
    wherein the left and right auxiliary signal lines together with the upper and lower first signal lines have at least three cross points with the second signal line.

5. A matrix-type display device as claimed in claim 4, wherein the auxiliary signal lines are connected to the upper first signal line or the lower first signal line.

6. A matrix-type display device as claimed in claim 4, wherein the upper and lower first signal lines and the auxiliary signal lines are used as a capacitance electrode.

7. A matrix-type display device as claimed in claim 4, further comprising a connect means which is formed over the upper first signal line and an adjacent lower first signal line of an adjacent upper pixel, with an insulation layer formed between the connect means and the upper first signal line and both the adjacent lower first signal line.

8. A matrix-type display device as claimed in claim 7, wherein the connect means is made of the same material as the pixel electrode.

9. A matrix-type display device as claimed in claim 7, wherein the connect means is made of the same material as the second signal line.

10. A matrix-type display device as claimed in claim 4, further comprising a connect means which is formed over at least one of the left and right auxiliary signal lines and an adjacent auxiliary signal line of an adjacent upper pixel with an insulation layer formed between the connect means and both the at least one of the left and right auxiliary signal lines and the adjacent auxiliary signal line.

11. A matrix-type display device as claimed in claim 10, wherein the connect means is made of the same material as the pixel electrode.

12. A matrix-type display device as claimed in claim 10, wherein the connect means is made of the same material as the third terminal.

13. A matrix-type display device as claimed in claim 4, wherein the auxiliary signal lines are made of an opaque metal layer to block the periphery of the pixel electrode from light.

14. A method of repairing a disconnection of a data line in a matrix-type display device in which a plurality of pixel regions are arranged in a matrix-type and which includes:
    a first signal line stretching in the horizontal direction to form a boundary of each pixel region, for applying a gate signal;
    a second signal line stretching in the vertical direction between pixel regions, crossing the first signal line while being insulated from the first signal line, for applying a data signal;
    a pixel electrode formed in each pixel region and comprised of a transparent conductive material;
    a switching element having a first terminal connected to the first signal line, a second terminal connected to the second signal line, and a third terminal connected to an adjacent pixel electrode; and an auxiliary signal line extended from a branch of the first signal line, being an adjacent to the second signal line, wherein together the first signal line and the auxiliary signal line have at least two cross points or overlapping points with the second signal line, the repairing method comprising shorting adjacent cross points or overlapping points chosen from the at least two cross points or overlapping points using a laser when the second signal line is disconnected, and said auxiliary signal line is separated from said second signal line.

15. A method of repairing a disconnection of a data line as claimed in claim 14, wherein the first signal line comprises two signal lines to form upper and lower boundaries of each pixel region.

16. A method of repairing a disconnection of a data line as claimed in claim 15, wherein the auxiliary signal lines are partially overlapped with the pixel electrode to be used as an auxiliary capacitance electrode.

17. A method of repairing a disconnection of a data line as claimed in claim 14, wherein the auxiliary signal lines are partially overlapped with the pixel electrode to be used as an auxiliary capacitance electrode.

18. A method of repairing disconnection of a data line in a matrix-type display device in which a plurality of pixel regions are arranged in a matrix-type and which includes:

upper and lower first signal lines stretching in the horizontal direction to form upper and lower boundaries of each pixel region, for applying a gate signal;

a second signal line stretching in the vertical direction between pixel regions, crossing the upper and lower first signal lines while being insulated from the upper and lower first signal lines, for applying a data signal;

a pixel electrode formed in each pixel region and comprised of transparent conductive material;

a switching element having a first terminal connected to the upper first signal line, a second terminal connected to the second signal line, and a third terminal connected to an adjacent pixel electrode; and an auxiliary capacitance electrode partially overlapped with the pixel electrode, wherein the auxiliary capacitance electrode has at least two cross points or overlapping points with the second signal line, the repairing method comprising shorting adjacent cross points or overlapping points chosen from the at least two cross points or overlapping points using a laser when the second signal line is disconnected, and the auxiliary capacitance electrode is separated to form a bypass of the data line.

* * * * *